US005559867A

United States Patent [19]
Langsenkamp et al.

[11] Patent Number: 5,559,867
[45] Date of Patent: Sep. 24, 1996

[54] AUTOMATED CALLING SYSTEM WITH DATABASE UPDATING

[75] Inventors: Al Langsenkamp; William D. Arnold; Scott Arnold, all of Indianapolis, Ind.

[73] Assignee: Sigma/Micro Corporation, Indianapolis, Ind.

[21] Appl. No.: 262,923

[22] Filed: Jun. 20, 1994

[51] Int. Cl.$^6$ .............................. H04M 3/02; H04M 3/44
[52] U.S. Cl. .................. 379/69; 379/51; 379/88; 379/92; 379/355
[58] Field of Search .................. 379/67, 69, 85, 379/88, 89, 266, 309, 201, 92, 355, 37, 40, 41, 51, 265, 267

[56] References Cited

U.S. PATENT DOCUMENTS

| | | | |
|---|---|---|---|
| Re. 34,587 | 4/1994 | Crane et al. | 379/92 |
| 4,054,756 | 10/1977 | Comella et al. | 379/89 |
| 4,071,698 | 1/1978 | Barger, Jr. et al. | 379/84 |
| 4,160,125 | 7/1979 | Bower et al. | 379/69 |
| 4,320,256 | 3/1982 | Freeman | 379/92 |
| 4,406,925 | 9/1983 | Jordan et al. | 379/69 |
| 4,438,296 | 3/1984 | Smith | 379/69 |
| 4,446,336 | 5/1984 | Bethel et al. | 379/76 |
| 4,554,418 | 11/1985 | Toy | 379/88 |
| 4,599,493 | 7/1986 | Cave | 379/92 |
| 4,761,807 | 8/1988 | Matthews et al. | 379/89 |
| 4,792,968 | 12/1988 | Katz | 379/92 |
| 4,797,911 | 1/1989 | Szlam et al. | 379/67 |
| 4,894,857 | 1/1990 | Szlam et al. | 379/67 |
| 4,922,520 | 5/1990 | Bernard et al. | 379/88 |
| 4,930,150 | 5/1990 | Katz | 379/92 |
| 4,942,616 | 7/1990 | Linstroth et al. | 381/51 |
| 4,996,705 | 2/1991 | Entenmann et al. | 379/91 |
| 4,998,272 | 3/1991 | Hawkins, Jr. et al. | 379/69 |
| 5,040,208 | 8/1991 | Jolissoint | 379/209 |
| 5,056,086 | 10/1991 | Libonati | 370/62 |
| 5,058,152 | 10/1991 | Solomon et al. | 379/67 |
| 5,179,589 | 1/1993 | Syu | 379/265 |
| 5,185,787 | 2/1993 | Katz | 379/92 |
| 5,218,631 | 6/1993 | Katz | 379/88 |
| 5,311,507 | 5/1994 | Bedrossian | 379/92 |
| 5,341,412 | 8/1994 | Ramot et al. | 379/92 |
| 5,343,518 | 8/1994 | Kneipp | 379/355 |
| 5,436,965 | 7/1995 | Grossman et al. | 379/266 |
| 5,463,685 | 10/1995 | Gaechter et al. | 379/92 X |

FOREIGN PATENT DOCUMENTS

| | | | |
|---|---|---|---|
| 2661301 | 10/1991 | France | 379/92 |
| 2717137 | 11/1978 | Germany | 379/37 |
| 01-010383 | 1/1989 | Japan . | |
| 0241997 | 9/1989 | Japan | 379/92 |
| 04-131847 | 4/1992 | Japan . | |
| 05-327852 | 12/1993 | Japan | 379/85 |
| 9208309 | 5/1992 | WIPO | 379/92 |

OTHER PUBLICATIONS

"Stok Offers Applications Generator Voice Response Systems", Audiotex Update, Sep. 1989, vol. 1, No. 9.
"Stok Software: Builds System on Dialogic Board", Voice Technology News, Jan. 2, 1990, vol. 2, No. 1.
"Intelligent Automated Outdialing Offered", Audiotex Update, Aug. 1990, vol. 2, No. 8.
"Method for Performing Phone Call to Unknown Callees", IBM Technical Disclosure Bulletin, vol. 36, No. 10 Oct. 1993.

*Primary Examiner*—Krista M. Zele
*Assistant Examiner*—Scott L. Weaver
*Attorney, Agent, or Firm*—Ice Miller Donadio & Ryan; Paul B. Overhauser; Doreen J. Gridley

[57] ABSTRACT

An automated phone calling system includes a database comprising phone numbers and one or more data fields associated with each phone number. Phone numbers (callees) in the database are selected based on the data fields associated therewith. A recorded voice message is transmitted to callees through a plurality of outgoing phone lines, and callees are prompted to enter one of several TOUCH TONE codes, which is recorded. The database record for the callee is automatically updated based on the TOUCH TONE response code, so that the updated field may be used to select whether to send a future call to the callee.

16 Claims, 49 Drawing Sheets

Telecas   ABC COMPANY CARROLLTON KY   Serial #: 000123  11:23:02 am Fri
Geo/List Calling  Bulletin Board  Scheduled Calling  System Maint.  Exit

```
┌─────────────────────────────┐
│ Make Calls              │
│ Stop Calls                  │
│ Calling Log                 │
│ Geo Message Maintenance     │
│ Geo Address Maintenance     │
│ Geo Zone Maintenance        │
│ Geo Criteria Maintenance    │
│ Geo Schedule Maintenance    │
│ Numbered List Maintenance   │
│ Change Criteria             │
└─────────────────────────────┘
```

FIG. 2

Select Lists To Be Called                                   11:53:12 am Fri

Entry List # Description                                Priority Message 1
2
3
4
5
6
7
8
9
10

Display Starting at List Number
      1    5700                          1    301COMMUNITY TEST MESSAGE
      2    S&LP                          1    302ABC COMPANY, RESPONSE MESSAGE
  >>  3    SITE SUPERVISOR               1    302ABC COMPANY, RESPONSE MESSAGE
      4    KEY STAFF MEMBERS             1    302ABC COMPANY, RESPONSE MESSAGE
      5    INCIDENT COMMAND              1    302ABC COMPANY, RESPONSE MESSAGE
      6    STAFF MEMBERS(ALL)            1    302ABC COMPANY, RESPONSE MESSAGE F1-Select List, F2-Change Messages, F3-Delete Entry F6-Toggle Search,
F7-Change Priority, F9-Zones, PgUp/Dn To Scroll, Esc-Exit

FIG. 4

```
Select Lists To Be Called                              11:53:29 am Fri
Entry List # Description                    Priority Message
  1
  2
  3
  4
  5
  6
  7
  8
  9
 10

Display Starting at Description
         5   INCIDENT COMMAND            1   302ABC COMPANY, RESPONSE MESSAGE
         4   KEY STAFF MEMBERS           1   302ABC COMPANY, RESPONSE MESSAGE
         2   S&LP                        1   302ABC COMPANY, RESPONSE MESSAGE
         7   S&LP EMERG COVERAGE         1   303S&LP COVERAGE
        >> 3 SITE SUPERVISOR             1   302ABC COMPANY, RESPONSE MESSAGE
         6   STAFF MEMBERS (ALL)         1   302ABC COMPANY, RESPONSE MESSAGE F1-Select List, F2-Change Messages, F3-Delete Entry F6-Toggle Search,
F7-Change Priority, F9-Zones, PgUp/Dn To Scroll, Esc-Exit

FIG. 5
```

Select Lists To Be Called					11:54:54 am Fri

Entry List # Description					Priority Message
1
2
3
4

```
┌─────────────────────── Select Message to Use ───────────────────────┐
│ Msg #─Description─────────────Length─Valid─Date──────Time──Response │
│   301 COMMUNITY TEST MESSAGE    57.84  YES  08/31/93  20:27  YES    │
│>> 302 ABC COMPANY, RESPONSE MESSAGE 52.26 YES 08/31/93 20:39 YES    │
│   303 S&LP COVERAGE             53.64  YES  08/31/93  21:25  YES    │
│   304 DRILL ANNOUNCEMENT        57.31  YES  08/31/93  21:15  YES    │
│   305 ZONE ALERT                57.37  YES  08/31/93  21:00  YES    │
│   306 UNAFFECTED ZONES          57.42  YES  08/31/93  21:07  YES    │
│   307 ALL CLEAR                 57.21  YES  08/31/93  20:48  NO     │
│   308 *                          0.00  NO                    NO     │
│   309 *                          0.00  NO                    NO     │
│   310 *                          0.00  NO                    NO     │
└─────────────────────────────────────────────────────────────────────┘
```

F1-Select, F2-Change Description, F3-Change Text, F4-Record Message
F5-Toggle Required Response, F6-Play Message, F7-Clear Line, F8-Copy
Line, Esc-Exit, PgUp, PgDn

FIG. 6

```
Select Lists To Be Called                            12:19:08 pm Fri
Entry List # Description           Priority Message
  1
  2
  3
  4
    ┌──────────────────── Select Message to Use ─────────────────────┐
    │ ─Msg #─Description──────────────Length─Valid─Date─────Time─Response │
    │   301 COMMUNITY TEST MESSAGE    57.84  YES  08/31/93 20:27 YES │
    │   302 ABC COMPANY, RESPONSE MESSAGE 52.26 YES 08/31/93 20:39 YES │
    │   303 S&LP COVERAGE             53.64  YES  08/31/93 21:25 YES │
    │   304 DRILL ANNOUNCEMENT        57.31  YES  08/31/93 21:15 YES │
    │   305 ZONE ALERT                57.37  YES  08/31/93 21:00 YES │
    │   306 UNAFFECTED ZONES          57.42  YES  08/31/93 21:07 YES │
    │   307 ALL CLEAR                 57.21  YES  08/31/93 20:48 NO  │
    │>> 308 EXAMPLE MESSAGE            0.00  NO                  NO  │
    │   309 *                          0.00  NO                  NO  │
    │   310 *                          0.00  NO                  NO  │
    │                                                                │
    │ F1-Select, F2-Change Description, F3-Change Text, F4-Record Message │
    │ F5-Toggle Required Response, F6-Play Message, F7-Clear Line, F8-Copy │
    │ Line, Esc-Exit, PgUp, PgDn                                     │
    └────────────────────────────────────────────────────────────────┘

FIG. 7
```

```
                                                    12:24:19 pm Fri
──── RECORD #  308: EXAMPLE MESSAGE ────
THIS IS A SAMPLE SCRIPT TO ILLUSTRATE YOUR ABILITY TO COMPOSE A MESSAGE
BEFORE YOU RECORD IT.  IT'S MUCH EASIER TO READ FROM THE SCREEN RATHER
THAN TO RECITE FROM MEMORY.

YOU HAVE UP TO FIFTEEN LINES FOR EACH MESSAGE IF YOU NEED THEM.

F2-Save Changes, F3-Insert, F4-Delete, ESC-Quit Without Saving Changes
```

FIG. 8

─── RECORD # 308: EXAMPLE MESSAGE ─── 12:24:57 pm Fri

THIS IS A SAMPLE SCRIPT TO ILLUSTRATE YOUR ABILITY TO COMPOSE A MESSAGE BEFORE YOU RECORD IT. IT'S MUCH EASIER TO READ FROM THE SCREEN RATHER ORY.

RECORD UPDATED
Press Return

YOU HAVE UP TO FIFTEEN LINES FOR EACH MESSAGE IF YOU NEED THEM.

F2-Save Changes, F3-Insert, F4-Delete, ESC-Quit Without Saving Changes

FIG. 9

```
─────────────MESSAGE RECORDING─────────────                    12:26:01 pm Fri

Recording Message # 308 EXAMPLE MESSAGE
Press Enter to Transfer Control to Keyboard
Answer phone when it rings and say 'Hello'
PHONE SET IN CONTROL-RECORDING!!!

─────────────Message Text─────────────
THIS IS A SAMPLE SCRIPT TO ILLUSTRATE YOUR ABILITY TO COMPOSE A MESSAGE
BEFORE YOU RECORD IT.  IT'S MUCH EASIER TO READ FROM THE SCREEN RATHER
THAN TO RECITE FROM MEMORY.

YOU HAVE UP TO FIFTEEN LINES FOR EACH MESSAGE IF YOU NEED THEM.
```

FIG. 10

```
                                            MESSAGE RECORDING
Recording Message # 308 EXAMPLE MESSAGE RECORDING COMPLETED!!
Message Length = 13.15 Seconds

PRESS ENTER TO CONTINUE
```

12:28:12 pm Fri

FIG. 11

Select Lists To Be Called                          12:31:59 pm Fri

Entry List # Description                    Priority  Message
1
2
3
4

```
 ─────────────Select Message to Use─────────────
 ─Msg #─Description──────────────Length─Valid─Date────────Time──Response
   301 COMMUNITY TEST MESSAGE         57.84  YES   08/31/93 20:27  YES
   302 ABC COMPANY, RESPONSE MESSAGE  52.26  YES   08/31/93 20:39  YES
   303 S&LP COVERAGE                  53.64  YES   08/31/93 21:25  YES
   304 DRILL ANNOUNCEMENT             57.31  YES   08/31/93 21:15  YES
   305 ZONE ALERT                     57.37  YES   08/31/93 21:00  YES
   306 UNAFFECTED ZONES               57.42  YES   08/31/93 21:07  YES
   307 ALL CLEAR                      57.21  YES   08/31/93 20:48  NO
>> 308 EXAMPLE MESSAGE                14.32  YES   09/10/93 12:30  YES
   309 *                               0.00  NO                    NO
   310 *                               0.00  NO                    NO
```

F1-Select, F2-Change Description, F3-Change Text, F4-Record Message
F5-Toggle Required Response, F6-Play Message, F7-Clear Line, F8-Copy
Line, Esc-Exit, PgUp, PgDn

FIG. 12

```
┌─────────────────────────────────────────────────────────────────┐
│────────────────────────Play Message────────────────────────────│
│                                                    12:32:22 pm Fri│
│ Now Playing Message#:308   EXAMPLE MESSAGE                      │
│────────────────────────Message Text────────────────────────────│
│ THIS IS A SAMPLE SCRIPT TO ILLUSTRATE YOUR ABILITY TO COMPOSE A MESSAGE │
│ BEFORE YOU RECORD IT.  IT'S MUCH EASIER TO READ FROM THE SCREEN RATHER │
│ THAN TO RECITE FROM MEMORY.                                     │
│                                                                 │
│ YOU HAVE UP TO FIFTEEN LINES FOR EACH MESSAGE IF YOU NEED THEM. │
└─────────────────────────────────────────────────────────────────┘
```

FIG. 13

```
┌─────────────────────────────────────────────────────────────┐
│ ─────── Play Message ───────            12:33:04 pm Fri     │
│                                                             │
│ Now Playing Message#:308  EXAMPLE MESSAGE                   │
│ Place Phone on Hook And Press Enter                         │
│                                                             │
│ ─────── Message Text ───────                                │
│ THIS IS A SAMPLE SCRIPT TO ILLUSTRATE YOUR ABILITY TO       │
│ COMPOSE A MESSAGE BEFORE YOU RECORD IT.  IT'S MUCH EASIER   │
│ TO READ FROM THE SCREEN RATHER THAN TO RECITE FROM MEMORY.  │
│                                                             │
│                                                             │
│                                                             │
│                                                             │
│ YOU HAVE UP TO FIFTEEN LINES FO  EACH MESSAGE IF YOU NEED THEM.│
└─────────────────────────────────────────────────────────────┘
```

FIG. 14

```
                                                    12:34:04 pm Fri

Select Lists To Be Called
Entry List # Description              Priority    Message
    1
    2
    3
    4
                    ┌──────────── Select Message to Use ────────────┐
                    │ Msg #─Description─────────Length─Valid─Date─────Time─Response │
                    │  301 COMMUNITY TEST MESSAGE  57.84  YES  08/31/93 20:27  YES │
                    │  302 ABC COMPANY, RESPONSE MESSAGE 52.26 YES 08/31/93 20:39 YES │
                    │  303 S&LP COV         ┌── COPY A MENU LINE ──┐  :25  YES │
                    │  304 DRILL AN         │                       │   15  YES │
                    │  305 ZONE ALE         │  Copy to Line #: 319  │   00  YES │
                    │  306 UNAFFECT         │                       │   07  YES │
                    │  307 ALL CLEA         │                       │   48  NO  │
                    │  308 EXAMPLE          │                       │   30  YES │
                 >> 309  *              ENTER-Continue, ESC-Exit         NO  │
                    310  *                                                NO  │
                    └───────────────────────────────────────────────┘

F1-Select, F2-Change Description, F3-Change Text, F4-Record Message
F5-Toggle Required Response, F6-Play Message, F7-Clear Line, F8-Copy
Line, Esc-Exit, PgUp, PgDn

FIG. 15
```

```
Select Lists To Be Called                          12:34:47 pm Fri
Entry List # Description          Priority Message
  1
  2
  3
  4

┌─────────────────────Select Message to Use─────────────────────┐
     │ ─Msg #─Description────────Length──Valid─Date────Time──Response│
     │   311 *                     0.00    NO                     NO │
     │   312 *                     0.00    NO                     NO │
     │   313 *                     0.00    NO                     NO │
     │   314 *                     0.00    NO                     NO │
     │   315 *                     0.00    NO                     NO │
     │   316 *                     0.00    NO                     NO │
     │   317 *                     0.00    NO                     NO │
     │   318 *                     0.00    NO                     NO │
     │>> 319 EXAMPLE MESSAGE       0.00    NO                     NO │
     │   320 *                     0.00    NO                     NO │
     └───────────────────────────────────────────────────────────────┘

F1-Select, F2-Change Description, F3-Change Text, F4-Record Message
F5-Toggle Required Response, F6-Play Message, F7-Clear Line, F8-Copy
Line, Esc-Exit, PgUp, PgDn
```

FIG. 16

```
Select Lists To Be Called                                    12:37:29 pm Fri
Entry List # Description              Priority  Message
    1      3   SITE SUPERVISOR            1      308EXAMPLE MESSAGE
    2
    3
    4
    5
    6
    7
    8
    9
   10

Display Starting at List Number
    1       5700                          1      301COMMUNITY TEST MESSAGE
    2       S&LP                          1      302ABC COMPANY, RESPONSE MESSAGE
 >> 3       SITE SUPERVISOR               1      302ABC COMPANY, RESPONSE MESSAGE
    4       KEY STAFF MEMBERS             1      302ABC COMPANY, RESPONSE MESSAGE
    5       INCIDENT COMMAND              1      302ABC COMPANY, RESPONSE MESSAGE
    6       STAFF MEMBERS (ALL)           1      302ABC COMPANY, RESPONSE MESSAGE F1-Select List, F2-Change Messages, F3-Delete Entry F6-Toggle Search,
F7-Change Priority, F9-Zones, PgUp/Dn To Scroll, Esc-Exit
```

FIG. 17

```
                                                       12:42:11 pm Fri
Select Lists To Be Called
Entry List # Description          Priority  Message
  1      3    SITE SUPERVISOR          1    308EXAMPLE MESSAGE
  2      4    KEY STAFF MEMBERS        1    302ABC COMPANY, RESPONSE MESSAGE
  3      8    FIRE BRIGADE             1    302ABC COMPANY, RESPONSE MESSAGE
  4     13    DAILY TEST CALL          2    301COMMUNITY TEST MESSAGE
  5
  6
  7
  8
  9
 10
Display Starting ┌──── CHANGE MESSAGE ────┐
          7   S&LP │ Entry To Change: 1     │  3S&LP COVERAGE
          8   FIRE │ F1-Change, Esc-Exit    │  2ABC COMPANY, RESPONSE MESSAGE
          9   CARR └────────────────────────┘  4DRILL ANNOUNCEMENT
         10   SWIT                             4DRILL ANNOUNCEMENT
         11   DAYTO                            4DRILL ANNOUNCEMENT
 >>     13    DAILY TEST CALL          2    301COMMUNITY TEST MESSAGE F1-Select List, F2-Change Messages, F3-Delete Entry F6-Toggle Search,
F7-Change Priority, F9-Zones, PgUp/Dn To Scroll, Esc-Exit

FIG. 18
```

```
Select Lists To Be Called                                    12:45:06 pm Fri
Entry List # Description       Priority Message
  1      3    SITE SUPERVISOR      1    308EXAMPLE MESSAGE
  2      4    KEY STAFF MEMBERS    1    302ABC COMPANY, RESPONSE MESSAGE
  3      8    FIRE BRIGADE         1    302ABC COMPANY, RESPONSE MESSAGE
  4     13    DAILY TEST CALL      2    301COMMUNITY TEST MESSAGE
                              Maintain Messages
 -Msg #-Description------------------------Length--Valid--Date------Time---Response
   301 COMMUNITY TEST MESSAGE                57.84    YES  08/31/93 20:27   YES
   302 ABC COMPANY, RESPONSE MESSAGE         52.26    YES  08/31/93 20:39   YES
   303 S&LP COVERAGE                         53.64    YES  08/31/93 21:25   YES
   304 DRILL ANNOUNCEMENT                    57.31    YES  08/31/93 21:15   YES
   305 ZONE ALERT                            57.37    YES  08/31/93 21:00   YES
   306 UNAFFECTED ZONES                      57.42    YES  08/31/93 21:07   YES
   307 ALL CLEAR                             57.21    YES  08/31/93 20:48   NO
>> 308 EXAMPLE MESSAGE                       13.46    YES  09/10/93 12:44   YES
   309 *                                      0.00    NO                    NO
   310 *                                      0.00    NO                    NO F1-Select, F2-Change Description, F3-Change Text, F4-Record Message
F5-Toggle Required Response, F6-Play Message, F7-Clear Line, F8-Copy
Line, Esc-Exit, PgUp, PgDn
```

FIG. 19

Select Lists To Be Called                                    12:45:42 pm Fri

| Entry | List # | Description        | Priority | Message                            |
|-------|--------|--------------------|----------|------------------------------------|
| 1     | 3      | SITE SUPERVISOR    | 1        | 308EXAMPLE MESSAGE                 |
| 2     | 4      | KEY STAFF MEMBERS  | 1        | 302ABC COMPANY, RESPONSE MESSAGE   |
| 3     | 8      | FIRE BRIGADE       | 1        | 302ABC COMPANY, RESPONSE MESSAGE   |
| 4     | 13     | DAILY TEST CALL    | 2        | 301COMMUNITY TEST MESSAGE          |
| 5     |        |                    |          |                                    |
| 6     |        |                    |          |                                    |
| 7     |        |                    |          |                                    |
| 8     |        |                    |          |                                    |
| 9     |        |                    |          |                                    |
| 10    |        |                    |          |                                    |

Display Starting
```
              ┌──── DELETE LIST ENTRY ────┐
         7    │ S&LP                       │   3S&LP COVERAGE
         8    │ FIRE  Entry To Delete: 1   │   2ABC COMPANY, RESPONSE MESSAGE
         9    │ CARR  F1-Change, Esc-Exit  │   4DRILL ANNOUNCEMENT
        10    │ SWIT                       │   4DRILL ANNOUNCEMENT
        11    │ DAYTO                      │   4DRILL ANNOUNCEMENT
              └────────────────────────────┘
>>      13      DAILY TEST CALL        2       301COMMUNITY TEST MESSAGE
```

F1-Select List, F2-Change Messages, F3-Delete Entry F6-Toggle Search,
F7-Change Priority, F9-Zones, PgUp/Dn To Scroll, Esc-Exit

FIG. 20

```
Select Lists To Be Called                              12:46:05 pm Fri
Entry List # Description              Priority Message
  1       4   KEY STAFF MEMBERS            1    302ABC COMPANY, RESPONSE MESSAGE
  2       8   FIRE BRIGADE                 1    302ABC COMPANY, RESPONSE MESSAGE
  3      13   DAILY TEST CALL              2    301COMMUNITY TEST MESSAGE
  4
  5
  6
  7
  8
  9
 10

Display Starting at List Number
          7  S&LP EMERG COVERAGE           1    303S&LP COVERAGE
          8  FIRE BRIGADE                  1    302ABC COMPANY, RESPONSE MESSAGE
          9  CARROLL CO DISPATCH           1    304DRILL ANNOUNCEMENT
         10  SWITZERLAND DISPATCH          1    304DRILL ANNOUNCEMENT
         11  DAYTON WALTHER                1    304DRILL ANNOUNCEMENT
 >>      13  DAILY TEST CALL               2    301COMMUNITY TEST MESSAGE F1-Select List, F2-Change Messages, F3-Delete Entry F6-Toggle Search,
F7-Change Priority, F9-Zones, PgUp/Dn To Scroll, Esc-Exit

FIG. 21
```

Select Lists To Be Called                                    12:49:37 pm Fri

| Entry | List # | Description      | Priority | Message |
|-------|--------|------------------|----------|---------|
| 1     | 4      | KEY STAFF MEMBERS | 1       | 302ABC COMPANY, RESPONSE MESSAGE |
| 2     | 8      | FIRE BRIGADE     | 1        | 302ABC COMPANY, RESPONSE MESSAGE |
| 3     | 13     | DAILY TEST CALL  | 2        | 301COMMUNITY TEST MESSAGE |
| 4     |        |                  |          |         |
| 5     |        |                  |          |         |
| 6     |        |                  |          |         |
| 7     |        |                  |          |         |
| 8     |        |                  |          |         |
| 9     |        |                  |          |         |
| 10    |        |                  |          |         |

```
Display Starting ┌──── CHANGE LIST ENTRY ────┐
         7    S&LP │ Entry To Change: 2        │     3S&LP COVERAGE
         8    FIRE │ F1-Change, Esc-Exit       │     2ABC COMPANY, RESPONSE MESSAGE
         9    CARR └───────────────────────────┘     4DRILL ANNOUNCEMENT
        10    SWIT                                    4DRILL ANNOUNCEMENT
        11    DAYTO                                   4DRILL ANNOUNCEMENT
        >>    13   DAILY TEST CALL        2          301COMMUNITY TEST MESSAGE
```

F1-Select List, F2-Change Messages, F3-Delete Entry F6-Toggle Search,
F7-Change Priority, F9-Zones, PgUp/Dn To Scroll, Esc-Exit

FIG. 22

```
Select Lists To Be Called                          12:51:50 pm Fri
Entry List # Description            Priority Message
  1     4    KEY STAFF MEMBERS          1    302ABC COMPANY, RESPONSE MESSAGE
  2     8    FIRE BRIGADE               1    302ABC COMPANY, RESPONSE MESSAGE
  3    13    DAILY TEST CALL            2    301COMMUNITY TEST MESSAGE
  4
  5
  6
  7
  8
  9
 10
─────────────────────────── Change Entry:  2 ──────────────────────────
List Number:        8
List Description:   FIRE BRIGADE
List Priority:      2
List Message #:       302 ABC COMPANY, RESPONSE MESSAGE
F1-Update Entry, F2-Message Maintenance, Esc-Exit F7-Change Priority, F9-Zones, PgUp/Dn To Scroll, Esc-Exit

FIG. 23
```

12:52:04 pm Fri

Select Lists To Be Called

| Entry | List # | Description | Priority | Message |
|---|---|---|---|---|
| 1 | 4 | KEY STAFF MEMBERS | 1 | 302 ABC COMPANY, RESPONSE MESSAGE |
| 2 | 8 | FIRE BRIGADE | 2 | 302 ABC COMPANY, RESPONSE MESSAGE |
| 3 | 13 | DAILY TEST CALL | 2 | 301 COMMUNITY TEST MESSAGE |
| 4 | | | | |
| 5 | | | | |
| 6 | | | | |
| 7 | | | | |
| 8 | | | | |
| 9 | | | | |
| 10 | | | | |

Display Starting at List Number 8

| | | | | |
|---|---|---|---|---|
| | 7 | S&LP EMERG COVERAGE | 1 | 303 S&LP COVERAGE |
| | 8 | FIRE BRIGADE | 1 | 302 ABC COMPANY, RESPONSE MESSAGE |
| | 9 | CARROLL CO DISPATCH | 1 | 304 DRILL ANNOUNCEMENT |
| | 10 | SWITZERLAND DISPATCH | 1 | 304 DRILL ANNOUNCEMENT |
| | 11 | DAYTON WALTHER | 1 | 304 DRILL ANNOUNCEMENT |
| >> | 13 | DAILY TEST CALL | 2 | 301 COMMUNITY TEST MESSAGE |

F1-Select List, F2-Change Messages, F3-Delete Entry F6-Toggle Search,
F7-Change Priority, F9-Zones, PgUp/Dn To Scroll, Esc-Exit

FIG. 24

12:56:04 pm Fri

Select Geo Zones To Be Called

Entry Zone Description                    Priority Message
  1.  NORTH-WEST OFPLANT                  301COMMUNITY TEST MESSAGE
  2
  3
  4
  5
  6
  7
  8
  9
 10

Display Starting at Geo Zone Number
>>  1  NORTH-WEST OFPLANT                 301COMMUNITY TEST MESSAGE
    2  NORTH-EAST OF PLANT                301COMMUNITY TEST MESSAGE
    3  SOUTH-WEST OF PLANT                301COMMUNITY TEST MESSAGE
    4  SOUTH-EAST OF PLANT                301COMMUNITY TEST MESSAGE
    5  ALL AREAS AROUND PLANT             301COMMUNITY TEST MESSAGE
    6  TEST ZONE                          301COMMUNITY TEST MESSAGE F1-Select Geo Zones, F2-Change Messages, F3-Delete Entry, F6-Toggle
Search, F7-Change Zone, F8-Lists, F9-Accept, PgUp/Dn To Scroll,
Esc-Exit

FIG. 25

Select Geo Zones To Be Called                              1:00:29 pm Fri

Entry Zone Description                 Priority Message
  1    1  NORTH-WEST OFPLANT              301COMMUNITY TEST MESSAGE
  2
  3
  4
  5
  6
  7
  8
  9
 10

Display Starting     ┌─── CHANGE ZONE ENTRY ───┐
  >>                 │ Entry To Change: 1      │
   1  NORTH-         │ F1-Change, Esc-Exit     │   1COMMUNITY TEST MESSAGE
   2  NORTH-         └─────────────────────────┘   1COMMUNITY TEST MESSAGE
   3  SOUTH-                                       1COMMUNITY TEST MESSAGE
   4  SOUTH-                                       1COMMUNITY TEST MESSAGE
   5  ALL ARE                                      1COMMUNITY TEST MESSAGE
   6  TEST ZONE                                  301COMMUNITY TEST MESSAGE F1-Select Geo Zones, F2-Change Messages, F3-Delete Entry, F6-Toggle
Search, F7-Change Zone, F8-Lists, F9-Accept, PgUp/Dn To Scroll, Esc-Exit

FIG. 26

Select Geo Zones To Be Called

1:01:14 pm Fri

Change Entry: 1

Geo Zone: 1
Descrp.: NORTH-WEST OFPLANT
Message: 301 COMMUNITY TEST MESSA  Red:
Unlisted: N Coordinates
Upper Left   Lower Right
.00          5.00
.00          5.00
Green:

Call Criteria

1 I BUSINESSES
2 I RESIDENTIAL
3   TEST ZONE MEMBERS
4
5
6
7
8
9
10
11
12
13
14
15
16
17
18
19
20
21
22
23
24
25
26
27
28
29
30
31
32
33
34
35
36
37
38
39

F1-Update Entry, F2-Message Maintenance, Esc-Exit

FIG. 27

```
Messages Used By This Calling                          1:12:33 pm Fri
Msg#:  301 COMMUNITY TEST MESSAGE
Msg#:  302 ABC COMPANY, RESPONSE MESSAGE F1-To Play Messages, F2-Record Messages, F9-Continue, Esc-Exit

FIG. 28
```

Call Generation Results        1:13:05 pm Fri

| | Message | Calls |
|---|---|---|
| LIST: 4 KEY STAFF MEMBERS | 302ABC COMPANY, RESPONSE MES | 7 |
| LIST: 8 FIRE BRIGADE | 302ABC COMPANY, RESPONSE MES | 37 |
| LIST: 13 DAILY TEST CALL | 301COMMUNITY TEST MESSAGE | 24 |
| ZONE: 1 NORTH-WEST OFPLANT | 301COMMUNITY TEST MESSAGE | 16 |

CALLS TO BE MADE:    84

Press F9 To Continue, Esc-Exit

FIG. 29

```
Telecas    ABC COMPANY CARROLLTON KY    Serial #:  000123    1:13:47 pm Fri
─────────────────────────────── ACTIVE ───────────────────────────────

Start Call
Calling Level:2    (1=Low, 2= Med, 3=High)
Retries:        3  (0-99)
F1-Process, Esc-Exit.
```

FIG. 30

```
Telecas    ABC COMPANY CARROLLTON KY    Serial #:  000123    1:15:14 pm Fri
─────────────────────────────── ACTIVE ───────────────────────────────

Start Call
Calling Level:2    (1=Low, 2= Med, 3=High)
Retries:        3  (0-99)
F1-Process, Esc-   ┌──────── PASSWORD REQUIRED ────────┐
                   │ Enter Password:                   │
                   │ RETURN-Continue, Esc-Exit         │
                   └───────────────────────────────────┘
```

FIG. 31

```
Telecas    ABC COMPANY CARROLLTON KY    Serial #: 000123    1:15:48 pm Fri
                              ─── ACTIVE ───
Start Call
Calling Level:2      (1=Low, 2= Med, 3=High)
Retries:       3 (0-99)
Press Enter To Continue
Calls Queued =    84      Calling Session Number =   17
```

FIG. 32

Telecas   ABC COMPANY CARROLLTON KY   Serial #: 000123   1:18:13 pm Fri
Geo/List Calling  Bulletin Board  Scheduled Calling  System Maint.  Exit

```
Make Calls
Stop Calls
Calling Log
Geo Message Maintenance
Geo Address Maintenance
Geo Zone Maintenance
Geo Criteria Maintenance
Geo Schedule Maintenance
Numbered List Maintenance
Change Criteria
```

FIG. 33

```
TELECAS Warning System          Select Session              1:18:43 pm Fri
                              Sort by: Session Number
Start at:  17
 Session   Date     Time   Status    % Completed  Calls   Complete
    16   09/10/93  11:03   Calling      100        10        10
 >  17   09/10/93  13:01   Calling        0        84         0

F1-Select Record, Arrows, Page Down, Page Up, Esc-Exit
```

FIG. 34

```
TELECAS Warning System ──── Cancel Sessions ────        1:19:45 pm Fri

This Session Contained   84   Total Calls
                          0   Calls Were Completed
                          0   % Completion (press <RETURN> to continue)
```

FIG. 35

```
TELECAS Warning System                                          01:35:04 pm Fri ─── Select Session ───
                        Sort by: Session Number
Start at:   16
─Session──Date────Time──Status────%Completed──Calls────Complete
>  16   09/10/93  11:03  Calling      100       10        10

F1-Select Record, Arrows, Page Down, Page Up, Esc-Exit
```

FIG. 36

```
Telecas    ABC COMPANY CARROLLTON KY    Serial #: 000123  01:37:06 pm Fri
Calling Logs
                        ─── Calling Logs ───
Session Number:   17
Date:             09/10/93
Time:             13:01
F1-Display Sessions, F2-Display Log, F4-Print Log, Esc-Exit.
```

FIG. 38

Telecas   ABC COMPANY CARROLLTON KY   Serial #: 000123  01:40:36 pm Fri
Calling Logs ──────────────── Calling Logs ────────────────

Session Number:  17
Date:            09/10/93
Time:            13:01
F1-Display Sessions, F2-Display Log, F4-Print Log, Esc-Exit.

──────────────── Select Session ────────────────
Start at:                        Sort by: Session Number
──Session──Date────Time────Status────%Completed──
      8    09/07/93  15:11   Called        0
      7    09/07/93  15:08   Called        0
  >   6    09/03/93  19:46   Called       17
      5    09/03/93  19:38   Called       26
      4    09/03/93  19:32   Called       23
      3    09/03/93  19:31   Called        0
      2    09/03/93  19:18   Called       25
      1    09/03/93  19:11   Called       24

F1-Select Record, Arrows, Page Down, Page Up, Esc-Exit

FIG. 39

```
Telecas    ABC COMPANY CARROLLTON KY    Serial #: 000123  01:41:01 pm Fri
Calling Logs
                     ─── Calling Logs ───
Session Number:    6
Date:              09/03/93
Time:              19:46
F1-Display Sessions, F2-Display Log, F4-Print Log, Esc-Exit.
```

FIG. 40

Telecas    ABC COMPANY CARROLLTON KY    Serial #: 000123  01:41:33 pm Fri
Calling Logs Session #:    6    Date:09/03/93    Time: 19:46
Seq:                Status: Called

| Type | Address # | Phone # | Status | DTMF | Date | Time |
|---|---|---|---|---|---|---|
| List | ^L 014-00007 | 18126675899 | Busy | | 09/03/93 | 19:50 |
| List | ^L 014-00006 | 7325700 | Message Played | | 09/03/93 | 19:49 |
| List | ^L 014-00005 | 7325023 | Message Played | | 09/03/93 | 19:49 |
| List | ^L 014-00004 | 7328292 | Message Played | | 09/03/93 | 19:49 |
| List | ^L 014-00003 | 7329328 | Message Played | | 09/03/93 | 19:49 |
| List | ^L 014-00002 | 7328554 | Message Played | | 09/03/93 | 19:50 |
| List | ^L 014-00001 | 7325700 | Message Played | | 09/03/93 | 19:49 |
| List | ^L 014-00007 | 18126675899 | Message Played | | 09/03/93 | 19:48 |
| List | ^L 014-00006 | 7325700 | Message Played | | 09/03/93 | 19:50 |
| List | ^L 014-00005 | 7325023 | Message Played | | 09/03/93 | 19:48 |
| List | ^L 014-00004 | 7328292 | Message Played | | 09/03/93 | 19:48 |
| List | ^L 014-00003 | 7329328 | Message Played | | 09/03/93 | 19:48 |
| List | ^L 014-00002 | 7328554 | Busy | | 09/03/93 | 19:49 |
| List | ^L 014-00001 | 7325700 | Message Played | | 09/03/93 | 19:48 |

Page Down, Page Up, Esc-Exit

FIG. 41

```
Telecas    ABC COMPANY CARROLLTON KY    Serial #: 000123  01:44:56 pm Fri
Calling Logs                    Calling Logs
┌─────────────────────────────────────┬──────────────────────────────────────┐
│ Session Number:    6                │                                      │
│ Date:              09/03/93         │                                      │
│ Time:              19:46            │                                      │
                                  PRINT LOG
┌─────────────────────────────────────────────────────────────────────────────┐
│ Log Printout                                                                │
│ ─────────────                                                               │
│ Session:                  6                                                 │
│ Geo Zone/List Detail:     Y (Y/N)                                           │
│ Include Calls:            A  (A)ll Calls, (D)elivered, (N)on-Devlivered     │
│ Include Responese:           ( )All Respones, (0-9)Response                 │
│                                                                             │
│ F1-Print, Esc-Exit.                                                         │
└─────────────────────────────────────────────────────────────────────────────┘
```

FIG. 42

```
Telecas    ABC COMPANY CARROLLTON KY    Serial #: 000123  01:45:34 pm Fri
Calling Logs ─────────────────── Calling Logs ───────────────────────────

Session Number:     6
Date:           09/03/93
Time:             19:46
                          ─────────── PRINT LOG ────────────
Log Printout      |                                                    |
------------------|                                                    |
Session:          |  6                                                 |
Geo Zone/List Detail: Y (Y/N)
Include Calls:      A   (A)ll Calls, (D)elivered, (N)on-Devlivered
Include Responese:      ( )All Respones, (0-9)Response F1-Print, Esc-Exit.
Please Wait - Printing In Progress
```

FIG. 43

Telecas    TEST            Serial #: 000123    Version:1.0
Change Criteria as a Result of a Calling Session
                       Calling Session 1

Criteria:
Response Key    # Description              New Value (*/S/ )

"1"         0
    "2"         0
    "3"         0
    "4"         0
    "5"         0
    "6"         0
    "7"         0
    "8"         0
    "9"         0
    "0"         0

F1-Display Sessions, F2-Save Changes, Esc-Exit.

FIG. 44

```
Telecas    TEST         Serial #: 000123  Version:1.0
Change Criteria as a Result of a Calling Session
                    Calling Session 1

Criteria:
Response Key  #   Description         New Value (*/S/ )

"1"         3   NEIGHBORHOOD WATCH       *
  "2"         5   BLOCK CAPTAINS           S
  "3"         1   BUSINESSES               *
  "4"         2   RESIDENTIAL              *
  "5"        10   MEDIA                    S
  "6"         4   BUSINESS WATCH           S
  "7"         7   OTHER                    *
  "8"         8   TEST SITES               *
  "9"         6   HANES OPEN
  "0"         9   NON-PARTICPANTS

F1-Display Sessions, F2-Save Changes, Esc-Exit.
```

FIG. 45

```
Telecas    TEST         Serial #: 000123   Version:1.0
Change Criteria as a Result of a Calling Session
                 Calling Session 1
         Criteria:
                    Select Session
                      Sort by: Session Number
 Session——Date——Time——Status——% Completed——Calls——Complete
Start at: 0
> 1  02/28/94 16:29  Called    100         971      971

F1-Select Record, Arrows, Page Down, Page Up, Esc-Exit
```

FIG. 46

```
Telecas    TEST              Serial #: 000123    Version: 1.0
Change Criteria as a Result of a Calling Session
                     Calling Session 1

Criteria:
Response Key  # Description                        New Value (*/S/ )

─┐ > WARNING <  ┌─
                         │                                    │
                         │ Once the Criteria Have Been Changed │
                         │ the Original Values are GONE FOREVER.│
                         │ Be Sure You Want to Save These       │
                         │ Changes BEFORE You Continue.         │
                         │                                      │
                         │      ENTER-Continue, ESC-Exit        │
                         └──────────────────────────────────────┘

"1"
"2"
"3"
"4"
"5"
"6"
"7"
"8"
"9"           9  NON-PARTICPANTS                           *
"0"

F1-Display Sessions, F2-Save Changes, Esc-Exit.

FIG. 47
```

Telecas    TEST            Serial #: 000123   Version:1.0
Change Criteria as a Result of a Calling Session
                    Calling Session 1

Response Key    Criteria:
                # Description              New Value (*/S/ )

"1"             3  NEIGHBORHOOD WATCH         *
"2"             5  BLOCK CAPTAINS             S
"3"             1  BUSINESSES                 *
"4"             2  RESIDENTIAL                S
"5"            10  MEDIA                      *
"6"             4  BUSINESS WATCH             S
"7"             7  OTHER                      S
"8"             8  TEST SITES                 *
"9"             6  HANES OPEN                 *
"0"             9  NON-PARTICPANTS            *

Calls Read:    841   Changes Made:     12

F1-Display Sessions, F2-Save Changes, Esc-Exit.

FIG. 48

SAMPLE DATA RECORD

LAST CALL
    DATE
    TIME
    TIME-DISP
        TIME-HRS
        TIME-MINS
LAST CALL STATUS
CURRENT STATUS
DAY NIGHT SCHEDULE
PHONE NUMBER
BOX
    BOX DEF
    BOX NUMBER
PHONE
    AREA CODE
    EXCHANGE
    LOCAL NUMBER
FAX NUMBER
    AREA CODE
    EXCHANGE
    LOCAL NUMBER
ADDRESS
    NAME
    ADDR1
    ADDR2
    CITY
    ZIP
CHANGE ID
LAST CHANGE DATE
DELIVERED CHECK SUM
GEO DATA
    COORDINATES
        LONG
        LAT
    FLAGS
    DAY PRIORITY
    NIGHT PRIORITY
    UNLISTED
    BUSINESS

LIST DATA
    LIST STATE
    LIST COMMENT 1
    LIST COMMENT 2
OK DATA
    OK COMMENT 1
    OK COMMENT 2
OK PHONE 1
    OK AREA CODE 1
    OK EXCHANGE 1
    OK LOCAL 1
OK PHONE 2
    OK AREA CODE 2
    OK EXCHANGE 2
    OK LOCAL 2
OK TIME 1
    OK TIME 1 HRS
    OK TIME 1 MINS
OK TIME 2
    OK TIME 2 HRS
    OK TIME 2 MINS
OK TIME 3
    OK TIME 3 HRS
    OK TIME 3 MINS
OK RETRIES
OK ALARM
OK MESSAGE NUMBER
OK CALLED 1
OK CALLED 2
OK CALLED 3
OK STATE
RESP DATA
    RESP FLAGS
RESP ROTATION
RESP AVAILABLE
RESP ACTIVE SCENARIO
RESP ACTIVE SESSION
RESP TIME
RESP DATE
RESP ARRIVE

FIG. 50

AUTOMATED CALLING SYSTEM WITH DATABASE UPDATING

FIELD OF THE INVENTION

This invention relates to telecommunications systems, and, in particular, to a system which initiates phone calls to phone numbers in a database and is interactive to thereby permit the callee to enter TOUCH TONE (DTMF, or dual tone modulated frequency) responses in response to prompts from the system.

BACKGROUND OF THE INVENTION

Technological advances in telecommunications systems have automated activities that had required human intervention. For example, in U.S. Pat. No. 4,054,756, processing of special services calls, such as person-to-person, collect, credit card and bill to third party calls, are automated to eliminate the need for a human operator to handle such calls. U.S. Pat. No. 4,761,807 discloses a system for transmitting audio messages between parties, thereby eliminating the need for a human receptionist. In another example, the automated system of U.S. Pat. No. 5,058,152 may serve as an intermediary between a subscriber to the system and the subscriber's potential customers, again eliminating the need for the subscriber to employ a receptionist.

Advances in technology have also resulted in the use of telecommunications systems for a myriad of purposes probably not contemplated by Mr. Alexander Graham Bell. Telemarketing is one such use. A telemarketing system in which an operator can view the response of the individuals called by the system is disclosed in U.S. Pat. No. 4,160,125. In addition to telemarketing, callers are able to play interactive games via the telephone interface game control system disclosed in U.S. Pat. No. 5,218,631. Goods and services can be marketed by telephone when using the invention disclosed in U.S. Pat. No. 4,071,698. Stock brokers can automatically notify their customers of changes in the market via the mass announcement systems disclosed in U.S. Pat. Nos. 4,554,418 and 4,942,616. Also, pre-recorded messages can be transmitted in the announcement systems of U.S. Pat. No. 4,446,336.

Another attractive use of the telecommunications system is a mass communication system for communicating important messages to the public. For example, it may be desirable to provide an automated system which can inform the public of an impending emergency or a disaster, or to provide a public service message. For mass communication purposes, the system must retain a database containing the telephone numbers of the public to be serviced by the system. Also, since it is unlikely that all members of the public need to be provided with the informative message, a means must be provided, and data must be accessible, for selecting certain criteria associated with the system's subscribers. For example, information about an impending emergency, such as a tornado warning, need only be transmitted to those in a particular locality. Therefore, emergency alert systems have been developed, such as the MINUTEMAN public alert system offered by United Signal of America in Indianapolis, Ind., which allows one to select a particular geographic area to be informed of an alert or emergency situation.

When selecting a geographical area, various methods are known in the art for associating a telephone number with the corresponding location. One simple method involves associating the telephone number with a predetermined zone designated by an alphanumeric such as A-1 or B-2 which corresponds to sections on a map. In the aforementioned MINUTEMAN public alert system, X–Y coordinates are associated with each phone number in the system's database. The operator may prepare a map showing geographic zones associated with each coordinate area.

One shortcoming of prior art systems using geographic zones selection as a criteria for determining to whom the message is to be sent occurs when the zone to be selected is of a size significantly different from the size of the grid employed by the system. Though the MINUTEMAN system described above allows a grid size to be redefined, when operating in an interactive mode, if a large geographical area is to be contacted by the system, prior art systems require the operator to enter a list of grids to encompass a large enough area. The size of the grid in prior art systems is therefore critical. To avoid encountering an unacceptable time delay by entering such a list (for example, it may be imperative that the message be communicated within a very short period of time due to the nature of the message), the grids are likely to be sized to err by reaching those who need not be informed rather than risk the inability to reach anyone. Therefore, it is desirable to provide a system providing greater flexibility to the system's operator for the selection of the Geographic Zone.

One of the shortcomings associated with many mass communication announcement systems such as public alert system is the inability of the public to control its participation in the service. Given the increased frequency for which the telephone is being used for telemarketing and solicitations, many people are resistant to participate in an automated service over which they have no control, particularly if such a service is to be provided by an organization, such as the police department, which is funded, at least in part, by taxes they have paid in the community. Thus, even though the service may be beneficial to the community, an individual may wish not to participate or to limit its participation. For example, the individual may only wish to participate during certain times or days, or to only be informed of certain occurrences. If, for example, the system is used by a law enforcement agency for informing the public of a recurring problem in the area, such as the theft of children's bicycles, not every individual or residence in the designated geographical area are interested in receiving such a message. There is also the possibility that the members of the household may wish to screen certain members of the residence from receiving such calls. A parent, for example, may not want the message to be transmitted to a six-year old child in the home. Therefore, it is desirable to provide a mass communication announcement system which permits the public to individually control its level of participation in a service implementing the system.

OBJECTS OF THE INVENTION

One object of the invention is to provide a system that allows callees to be selected for transmission of a prerecorded message based on the callees response to a previously transmitted prerecorded message, and to automatically update a callee database based on such a response.

Another object of the invention is to allow callees to be selected by their geographic location.

BRIEF DESCRIPTION OF THE DRAWINGS

FIG. 2 shows a computer generated screen of the Main Menu of one embodiment of the automated calling system of the present invention.

FIG. 4 shows a computer generated screen displayed to permit the operator to select callees for a calling session.

FIG. 5 shows a computer generated screen displayed to permit the operator to select callees for a calling session, and wherein the entries are viewed in description order rather than in list order as is shown in FIG. 4.

FIG. 6 shows a computer generated screen displaying the default message for the SITE SUPERVISOR Numbered List.

FIG. 7 shows a computer generated screen displaying a list of messages that may be executed or modified.

FIG. 8 shows a computer generated screen presenting the user with a scratch pad for entering a textual message.

FIG. 9 shows a computer generated screen indicating that a textual message written on the scratch pad has been saved.

FIG. 10 shows a computer generated screen prompting the operator to voice record the message written on the scratch pad.

FIG. 11 shows a computer generated screen informing the operator that voice recordation of the message is complete.

FIG. 12 shows a computer generated screen similar to the screen of FIG. 7, and indicating that the Example Message has now been recorded.

FIG. 13 shows a computer generated screen displayed in response to depressing the F6 key when viewing the screen of FIG. 12 indicating that the selected message is being played.

FIG. 14 shows a computer generated screen instructing the operator to return the telephone to the hook after a message has completed playing.

FIG. 15 shows a computer generated screen similar to that of FIG. 7 wherein the operator has depressed the F8 key to copy a message.

FIG. 16 shows a computer generated screen informing the operator that a new message at line 319 has been created.

FIG. 17 shows a computer generated screen similar to that of FIG. 4 indicating that the SITE SUPERVISOR Numbered List has been selected by the operator.

FIG. 18 shows a computer generated screen showing which Numbered Lists have been selected by the operator.

FIG. 19 shows a computer generated screen displayed in response to depression of the F1 key when viewing the screen of FIG. 18 and displaying a list of messages that may be changed.

FIG. 20 shows a computer generated screen displayed in response to depression of the F3 key when FIG. 17 is displayed prompting the operator to indicate which list entry is to be deleted.

FIG. 21 shows a computer generated screen similar to that of the screen FIG. 20 wherein the SITE SUPERVISOR Numbered List has been deleted.

FIG. 22 shows a computer generated screen similar to the screen of FIG. 17 wherein the operator has depressed the F7 key to change the list priority.

FIG. 23 shows a computer generated screen prompting the operator to enter the new priority for the Numbered List selected in FIG. 22.

FIG. 24 shows a computer generated screen similar to that of FIG. 22 wherein the priority of FIRE BRIGADE has been changed from 1 to 2.

FIG. 25 shows a computer generated screen illustrating a sample screen for selecting a Geographical Zone.

FIG. 26 shows a computer generated screen similar to the screen of FIG. 25 wherein the F7 key has been depressed and the operator is prompted to enter the Zone to be changed.

FIG. 27 shows a computer generated screen presenting zone information for a particular calling session.

FIG. 28 shows a computer generated screen informing the operator of the messages to be sent during a particular calling session.

FIG. 29 shows a computer generated screen showing the call generation results in response to depression of the F9 key while at the prompt in FIG. 28.

FIG. 30 shows a computer generated screen resulting from the depression of the F9 key while viewing the screen of FIG. 29 and showing the activity of the calling session.

FIG. 31 shows a computer generated screen prompting the operator to enter a password to begin or continue the calling session.

FIG. 32 shows a computer generated screen indicating the total number of calls queued as well as the designated number of the particular calling session.

FIG. 33 shows a computer generated screen showing the Main Menu will the Stop Calls line highlighted.

FIG. 34 shows a computer generated screen listing the calling session currently in progress, and resulting from selection of the Stop Calls function in FIG. 33.

FIG. 35 shows a computer generated screen showing the status of a calling session selected in FIG. 34 to be canceled.

FIG. 36 shows a computer generated screen like that of FIG. 34, but wherein calling session 17 has been canceled.

FIG. 38 shows a computer generated screen resulting from selection of the Calling Log function in FIG. 37, and prompting the operator to select one of the displayed Calling Log function options.

FIG. 39 shows a computer generated screen displayed in response to the depression of the F1 key while FIG. 38 is displayed and showing the current status of the calling session selected.

FIG. 40 shows a computer generated screen similar to the screen of FIG. 38 in which calling session 6 has been selected to be displayed or printed.

FIG. 41 shows a computer generated screen resulting from the depression of F2 while viewing FIG. 40 which displays the report for calling session 6.

FIG. 42 shows a computer generated screen resulting from the depression of the F4 key while viewing FIG. 40 and which prompts the operator to begin printing calling session 6.

FIG. 43 shows a computer generated screen like that of FIG. 42 informing the operator that printing of the report is in progress in response to depression of the F1 key while viewing FIG. 42.

FIG. 44 shows a computer generated screen resulting from selection of the Change Criteria option from the Geo/List menu of FIG. 2.

FIG. 45 shows a computer generated screen like the screen of FIG. 44 wherein the operator has tabbed to the Criteria # Description column.

FIG. 46 shows a computer generated screen displayed in response to depression of the F1 key while viewing FIG. 45 and showing the calling session selected.

FIG. 47 shows a computer generated screen like that of FIG. 45 and warning the operator that criteria changes will result in permanent changes to the database.

FIG. 48 shows a computer generated screen displayed in response to depressing Enter while viewing the screen of FIG. 47.

FIG. 50 shows a data record containing representative data fields used in the database according to the present invention.

SUMMARY OF THE INVENTION

Accordingly, the system of the present invention includes a database comprising phone numbers and one or more data fields associated with each phone number. Phone numbers (callees) in the database may be selected based on the data fields associated therewith. A recorded voice message is transmitted to callees through a plurality of outgoing phone lines, and callees are prompted to enter one of several TOUCH TONE codes, which is recorded. The database record for the callee is automatically updated based on the TOUCH TONE response code, so that the updated field may be used to select whether to send a future call to the callee.

DETAILED DESCRIPTION

Figure 1:
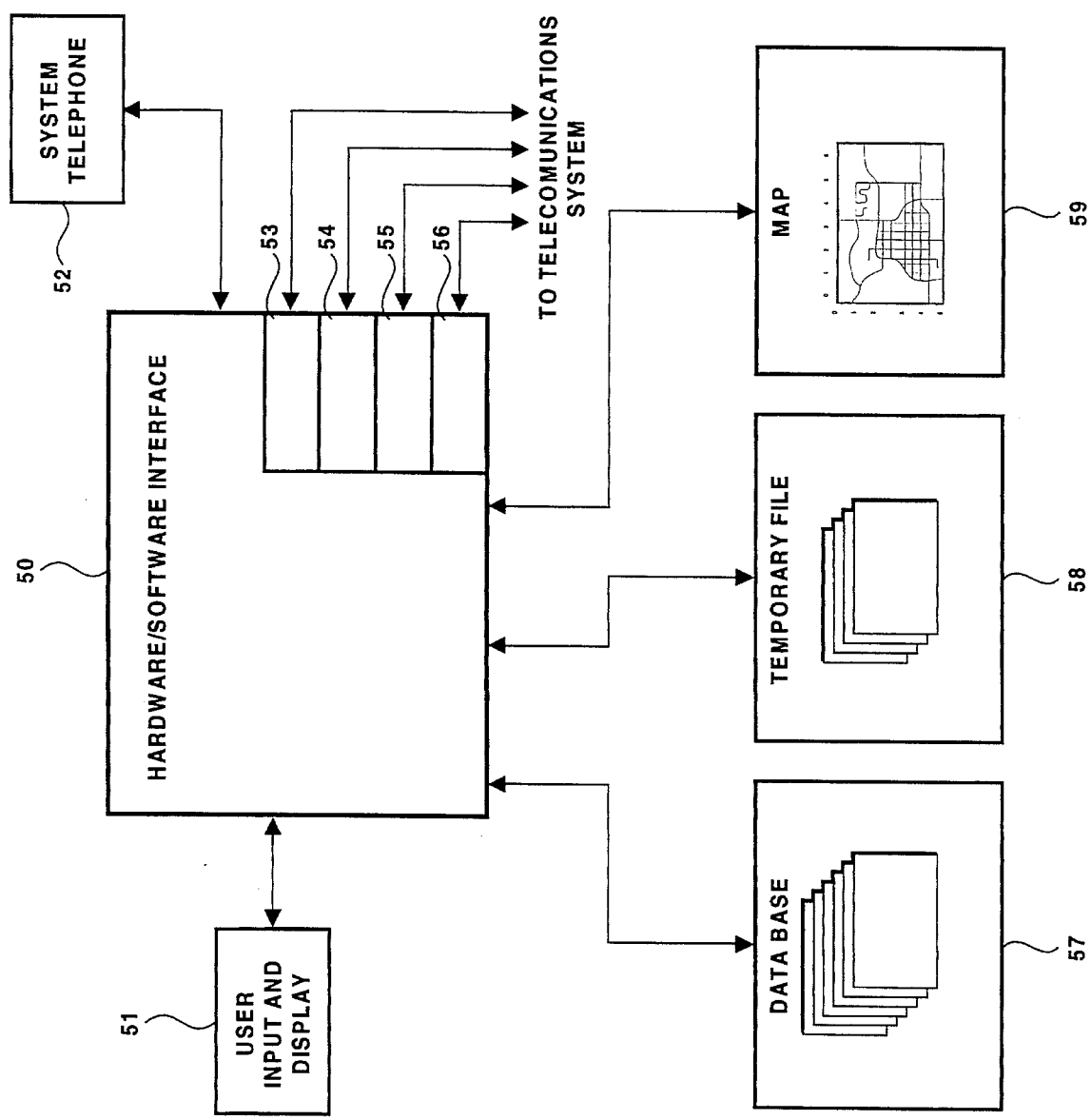
FIG. 1 shows a block diagram of one embodiment of the automated phone calling system of the present invention.

Referring now to FIG. 1, there is shown a block diagram of one embodiment of the automated phone calling system of the present invention. In this embodiment, the automated phone calling system includes hardware/software interface 50, user input and display 51, system or "local" telephone 52, telecommunications interfaces 53–56, database 57, temporary file 58, and map 59. The system may comprise a computer having an ISA, or other, bus and a plurality of plug-in phone cards as telecommunications interfaces 53–56. Database 57, temporary file 58, and map 59 may reside on magnetic media, such as a hard disc, or for the map, CD ROM, for example. Map 59 may also be a physical hard copy of a map having grid coordinates written thereon, rather than residing on magnetic media. When a hard copy map is employed, the operator will be required to input desired coordinates by keyboard, for example, rather than selecting the coordinates by other means, such as graphical means, on the computer. User input and display 51 may comprise a keyboard and monitor and/or printer connected to the personal computer.

User input and display 51 is in bidirectional communication with hardware/software interface 50. In this manner, the operator may provide input to hardware/software interface 50, hardware/software interface 50 may make inquires of the operator, and reports created by hardware/software interface 50 may be presented to the operator.

"Local" telephone 52 is also in bidirectional communication with hardware/software interface 50. As described herein, "local" telephone 52 is used by hardware/software interface 50 to record voice messages used by the system and to play recorded voice messages to the operator for verification purposes. In this embodiment, "local" telephone 52 comprises a TOUCH TONE telephone having a telephone access number which is known by hardware/software interface. The TOUCH TONE capability is utilized on "local" telephone 52 to provide the operator with the capability to respond to inquires by hardware/software interface 50. It will be appreciated that other means well known in the art may be used for recording and playing messages and providing responses to inquires of hardware/software system 50. For example, interactive microphone and speaker accessories for personal computers are available which could be utilized in lieu of "local" telephone 52. An advantage is present, however, in using a TOUCH TONE telephone for voice recordation and verification. Specifically, the operator and software use the same mechanisms for these functions as is used by the system in contacting callees, playing the voice message to the callee, and recording the answers of callees.

Database 57 contains telephone numbers for potential callees as well as several other data fields associated with that telephone number. Representative record layouts for database 57 are shown in the Appendix, which is incorporated herein by reference, and in FIG. 50. Because the system of the present invention is able to access callees based on the selection of a Numbered List of callees or on the Geographical Zone of callees in the embodiment of the system described below, these additional data fields may comprise the identifiers of the Numbered Lists to which that telephone number (callee) belongs as well as an indication of the geographical location of the telephone number.

As is described in further detail herein, database 57 is in bidirectional communication with hardware/software interface 50. Not only is hardware/software system 50 able to read the information stored in database 57, data fields in database 57 may be modified by hardware/software interface 50. The ability of the system to modify database 57 is not limited to configuration, set-up, or modification of database 57 by an operator interfacing with hardware/software interface 50 through user interface input and display 51. Rather, database 57 may be updated based on responses received from callees interacting with the system via telecommunications interfaces 53–56. In this manner, the callee may have control over future calls it may receive from the system.

For example, if a callee's record in database 57 contains data field(s) representative of the acceptable times at which the callee may be contacted and hardware/software interface 50 is programmed to only initiate calls to the callee during the specified hours, the system may permit the callee to indicate a different time from that stored in database 57. By updating the appropriate data fields in database 57, the callee has had an influence over future calls it may receive from the system.

Temporary file 58 is used by hardware/software interface 50 to store temporary information required for initiating calling sessions. Such temporary information will be better understood by materials presented herein as to the operation of the automated phone calling system of the present invention.

It will be appreciated by those of skill in the art that database 57 and temporary file 58 are likely to be stored on non-permanent, i.e., writable, media such as hard disk, diskette, or magnetic tape. Map 59, however, is more apt to be unchanged over long periods of time. Therefore, though non-permanent media may be used for storage of map 59, permanent media, such as CD ROM, may be desirable.

Telecommunications interfaces 53–56 are bidirectionally connected to a telecommunications network. Calls are made to callees through telecommunications interfaces 53–56 to the telecommunications network. Also, telecommunications interfaces 53–56 accept input, such as TOUCH TONE input, provided by callees in response to inquiries made by the system.

Hardware/software interface 50 provides a multiplicity of functions which are described in greater detail herein. Briefly, hardware/software interface 50 provides a means for selecting one or more subsets of telephone numbers stored in database 57 based on data fields associated with the telephone numbers. Hardware/software interface 50 also provides a means for recording a voice message provided through "local" telephone 52, and provides a means for initiating telephone calls to callees through telecommunications interfaces 53–56. In addition, hardware/software interface 50 is capable of prompting the callee for entry of a TOUCH TONE response code and recording a TOUCH TONE response code entered by a callee. Further, hardware/software interface 50 is capable of updating at least one data field in database 57 for a callee based on the TOUCH TONE response of that callee.

Establishing, Initiating, Stopping and Logging a Call Session

To provide an understanding of the operation of the present invention, immediately following herein is a description of one embodiment of a software interface program operating in accordance with the present invention. Software source code and Record Layouts for this embodiment are presented in the Appendix hereto. Record Layouts for this embodiment are also presented in FIG. 50. Referring now to FIG. 2, there is shown a Main Menu screen presented to the user in the database interface software. On the Main Menu, there are several functions provided to the user. Specifically, the functions of Geo/List Calling, Bulletin Board, Scheduled Calling, System Maint. (maintenance), and Exit are provided. The discussion immediately following focuses on the functions made available under the Geo/List Calling Main Menu option. In particular, the Make Calls, Stop Calls, and Calling Log functions are discussed in detail. The Make Calls function under the Geo/List Calling Main Menu option allows the operator to select callees for a particular calling session and to initiate a calling session. Stop Calls allows the operator to stop calls in the process of being made, and Calling Log allows the operator to obtain a log of calls made.

Figure 3:
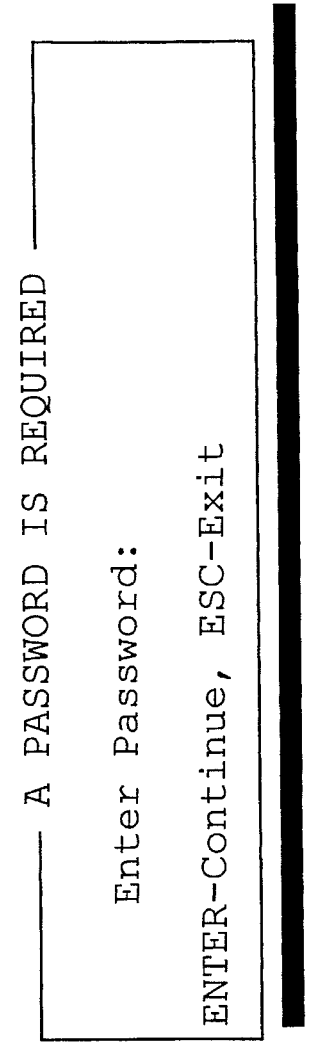
FIG. 3 shows a computer generated screen prompting the user for entry of a password required to make calls with the system.

To initiate a calling session, the operator highlights the Make Calls selection and presses the ENTER key. If a password is required for the particular selection made, as would most likely be required for initiating calls, the screen illustrated in FIG. 3 is displayed. In response to the prompt of the screen of FIG. 3, the operator is required to input a valid password to continue to initiate calls, for example. If the operator depresses the ESC (escape) key, the software will return to the previous screen of FIG. 2.

Throughout the operation of the software described herein, the ESC key may be depressed to return to the previous screen. Upon depression of the ESC key, the current action will be cancelled without making any changes to the database. If the operator resides lower in the hierarchy of the software, continued depression of the ESC key will eventually take the operator to the Main Menu shown in FIG. 2.

Referring now to FIG. 4, there is shown a screen displayed to select the callees for a calling session. At this point, the operator is allowed to select two methods for selecting callees. The operator may select up to ten Numbered Lists of telephone numbers to be called, or by depressing the F9 key when the screen of FIG. 4 is displayed, the operator may select a Geographical Zone representative of a group of callees by geographical location and other optional criteria, to be called. The selection of Geographical Zone is described in further detail herein in association with FIGS. 25–27.

A Numbered List is simply a list of specific people to be called, such as members of a local volunteer fire department. These people may typically share a common responsibility or task. To select a Numbered List, the operator simply uses the arrow keys to highlight the appropriate list (the double greater than sign (">>") indicates the particular entry to be selected) and then depresses the F1 key to initiate selection of the list. In the screen of FIG. 4, the SITE SUPERVISOR Numbered List has been selected by the operator. The operator may also use the page up (PGUP) and page down (PGDN) keys to view lists on a different page. By default, the entries are in a list number order. The operator may view the entries in the description order by depressing the F6 key. FIG. 5, for example, shows the description order number list for the screen shown in FIG. 4.

If the F1 key is depressed in response to the displays of FIG. 4 or FIG. 5 with the cursor set at the field SITE SUPERVISOR, the screen in FIG. 6 results. The default message for this list, i.e., for the SITE SUPERVISOR Numbered List, is already highlighted. If this message is appropriate, the operator can select it by depressing the F1 key. If not, the operator has three other choices. The operator may select another message by using the arrow, PGUP, and PGDN keys to highlight another message. The operator may also modify an existing message or create a new one.

To create or modify the description for a message, the operator first highlights the appropriate message line to be executed or modified and presses the F2 key. In the screen of FIG. 7, the cursor is highlighting the EXAMPLE MESSAGE. Therefore, depression of the F2 indicates that the description EXAMPLE MESSAGE is to be created or modified. After modifying the description of the message, depression of the ENTER key indicates that the entry of a new description is complete.

If the F3 key is depressed while on the screen of FIG. 7, a scratch pad screen, such as that illustrated in FIG. 8, is displayed. The screen of FIG. 8 allows the operator to finalize the textual message before actually recording the message. It will be appreciated that it is much easier and more efficient to record a message by reading a script, rather than reciting the message from memory. Therefore, the scratch pad provides up to 15 lines of 75 characters for each message. The operator may leave blank lines on the scratch pad screen of FIG. 8 for improved readability. To insert a blank line, the operator simply places the cursor at the line where a blank line is to be inserted and presses the F3 key. The remaining lines on the screen will move down one line and the highlighted line will be blank. If the 15th line exists, the system will provide the operator with an audible tone, without adding a blank line. The operator may correct the situation if indeed additional information is to be added to the message by respacing or rewording the text of the first 15 lines.

The operator may also delete a line of text by depressing the F4 key. This will remove the remaining lines up one line and make the 15th line blank. Throughout creation of the message, the operator may press the ESC key to ignore any modifications or deletions immediately made prior to such depression.

The operator may save the changes made to the message on the scratch pad of FIG. 8. Upon depression of the F2 key while at the screen of FIG. 8, a message window, as illustrated in FIG. 9, appears to assure the operator that changes have been saved. At this point, the textual message is now recorded. The operator may depress the ENTER key to return to the previous screen of FIG. 8. FIG. 10 shows the scratch pad screen of FIG. 8 after a textual message has been saved.

At this point, the operator may wish to voice record the textual message composed. Depression of the F4 key initiates the recording process. Upon depression of the F4 key, the system telephones the phone "local" to the phone 52 in the embodiment of FIG. 1. The operator should answer the telephone. From this point, recording the message is very similar to leaving the message on an answering machine. A voice prompts the operator to record the message at the completion of a tone. The operator may then read the message at the bottom part of the screen displayed on FIG. 10. Once the voice message is recorded, the operator may press the 3 key on the telephone pad or wait for the response message. The system will then respond with "Thank you for your time" to indicate the recording is complete. A message is displayed on the screen, as illustrated in FIG. 11, to show that the recording is complete. The message length is also displayed in seconds. To return the previous screen, the operator simply depresses the ENTER key.

In addition to entering a recorded message, the software interface system allows the operator to require that the callee respond to the telephone call. For example, the operator may invoke an option to require the callee to depress the 5 key on the telephone pad as a response that the callee has received the message. Such a response by the callee, or lack of response, will be recorded for reporting service purposes in the database. For the operator to add the option to require such a response, the operator should depress the F5 key at the screen of FIG. 12. Toggling the F5 key causes the YES/NO response listed on the right hand side of the screen for the particular message highlighted to toggle between YES and NO.

The final step in modifying the created main message is for the operator to listen to the message recorded. This gives the operator first hand experience of what the callee will hear and be asked to do. To listen to the message recorded, the operator depresses the F6 key when on the screen of FIG. 12. The screen of FIG. 13 is then displayed showing the textual script of the message. The system then telephones the phone connected to the system. The operator simply needs to answer the telephone. At that point, the recorded voice message will be played and, if requested, the operator, like a callee, will be asked to make a response by depressing the 5 key on the telephone.

Once the message has completed playing, a message is added to the screen of FIG. 13 to show that the operator should return the telephone to the hook and depress ENTER. This is illustrated in FIG. 14. By depressing ENTER, the operator will be returned to the screen of FIG. 7.

The operator may also delete a message, and the accompanying textual message stored. To delete a message, the operator simply should highlight the appropriate message and depress the F7 key while viewing the screen of FIG. 7. The message line will now be blank.

The operator may also copy a message from one message line to another. To copy a message, simply highlight the message to be copied and depress the F8 key while viewing the screen of FIG. 7. A window pops up, as shown in FIG. 15, prompting the operator for the destination message line number highlighted. In this example, message number 308 is being copied to message line 319. Depression of the ESC key allows the operator to avoid copying the message. If the correct destination number has been input, the operator simply depresses the ENTER key. The presence of a new message at line 319 is illustrated in FIG. 16. Note that the message length for this message is 0 and the valid message flag is NO. When a message is copied from one line to another, the operator must rerecord the voice message. The copy function only copies the description and the textual message, but not the voice message itself.

The screen shown in FIG. 17, is similar to that of FIG. 4, with the exception of the fact that the Numbered List SITE SUPERVISOR has been selected and is so indicated under the Entry List at the type of the screen selected. Once the operator has selected the necessary list or lists according to the procedure described herein, the operator may alter each selection. The operator may also change the message to be used or alter the priority of the calls for that list. Such flexibility eliminates having to delete and reselect a Numbered List. If the operator need not modify the individual Numbered List, depression of the F9 key allows the operator to continue to select Geographical Zone to be called.

FIG. 18 shows that four Numbered Lists have been selected, namely SITE SUPERVISOR, KEY STAFF MEMBERS, FIRE BRIGADE, and DAILY TEST CALL. To change a message for any one of the lists, the operator simply depresses the F2 key. A pop-up window appears, as shown in FIG. 18, and prompts the operator for the number of the list entry to be changed. After entering the number, the operator may change the message for the Numbered List. As before, depression of the ESC key allows the operator to exit the changed message prompt and make no changes to the entry.

If the operator opts to change a message for an entry by depressing the F1 key at the CHANGE MESSAGE prompt shown in FIG. 18, the screen of FIG. 19 is displayed. The options presented as when creating or modifying a message (see FIG. 7) are available for modifying a message. In fact, a similar procedure as described in association with FIGS. 7–14 is used to change an entry list message.

When the screen of FIG. 17 is displayed, the operator may also delete a Numbered List from the calling session by depressing the F3 key. Depression of the F3 key displays the screen illustrated in FIG. 20 having a pop-up prompt asking the operator to enter the number to be deleted. The operator may enter a number to be deleted and then depress the F1 key to delete the entry, or press the ESC to exit. If, the entry to be deleted is entry 1 in that of FIG. 20, i.e. SITE SUPERVISOR, and the F1 key is depressed, the screen illustrated in FIG. 21 is displayed. Note that the list number one for SITE SUPERVISOR as shown in FIG. 20 is not displayed in FIG. 21. It is important to note that deleting a Numbered List from a calling session does not delete the Numbered List from the system. Deletion of an entry is simply a way of unselecting a selected list for the particular calling session.

Returning to FIG. 17, it is also possible to change the calling priority of a selected list for this calling session only. Depression of the F7 key allows one to change the list priority. A pop-up window, such as that shown in FIG. 22, is displayed to prompt the operator for the number of the entry to change. Consistent with other operations, to change the priority, the entry number is entered and the F1 key is depressed. Depression of the ESC key allows the operator to return without making a change to the list priority. If the F1 key is depressed, as illustrated in FIG. 23, the operator will be prompted to enter the new priority, i.e., priority 1, 2 or 3, for the Numbered List and to depress the F1 key to update the priority, or press the ESC key to return to the previous screen. The operator may also depress the F2 key to change this message. The options discussed before when creating and modifying a message are available when the F2 key is depressed to change the message.

After changing the priority of the selected list, the screen of FIG. 24 is displayed. Comparing the screen of FIG. 22 to the screen of FIG. 24, the list number 8, FIRE BRIGADE, was changed to a priority of 2. Note that the changing of the priority of a selected list does not change the default calling priority for that Numbered List. It only affects the list priority for the particular calling session.

Once the operator has completed selecting the Numbered List to call and the priorities associated therewith, depression of the F9 key while at the screen of FIG. 7 allows the operator to select Geographical Zones. Therefore, both Numbered Lists and Geographical Zones may be selected for a particular calling session. In one embodiment of the invention, a Geographic Zone includes a subset of all potential callees in a predetermined geographic area. The criteria for selecting a particular subset may be specified by flagging fields associated with each callee.

FIG. 25 shows a sample screen for selecting Geographical Zone (Geo). Up to 10 specific Geo Zones may be selected by the operator. The operator need not enter all Numbered Lists before selecting Geographical Zone, and vice versa. The software allows selection of Numbered Lists as well as selection of Geo Zones. The operator may switch to the other type of call designation by depression of the F8 or F9 key, appropriately, when in either the select Zones or select Numbered Lists screens.

Figure 49:
FIG. 49 shows a geographic area map which may be used to specify callees to whom to place a call to transmit a prerecorded message.

A Geo Zone is a name for a group of callees in the database that meet specified criteria. In one embodiment, a Geo Zone may be established by specifying coordinates associated with a map and specifying criteria associated with each record in the phone callee database. For example, as shown in FIG. 49, the top or X axis is red and contains horizontal coordinates 0–6, while the side or Y axis is green and specifies vertical coordinates 0–5. A Geo Zone may be specified as shown in FIG. 27 by specifying a upper left and lower right corners of a rectangle. For example, in FIG. 49, the coordinates for a northwest quadrant of the map would be Red: 0, Green: 0; and Red: 3, Green: 2. The coordinates for a Geo Zone which initially qualifies all callees in the database to be included (subject to subsequently specifying selection criteria) would be Red: 0, Green: 0; and Red 6, Green 5.

In one embodiment, the phone number database stores geographic information for each callee (phone number) by longitude and latitude, and each such longitude and latitude may be unique for each callee database record. The longitude and latitude may be initially established by visiting each address and obtaining the longitude and latitude from a commercially available global positioning system satellite receiver. Alternatively, the longitude and latitude could be obtained by inputting a database of the streets and addresses for the geographic area of interest into a computer, along with a reference longitude and latitude and scaling information, and automatically associating a longitude and latitude for each address. However, the latter alternative will likely require a manual confirmation of each automatically assigned preliminary longitude and latitude due to the difficulty in perfecting a software program for generating such information automatically. However, the invention in its broadest scope does not require geographic information for each callee to be generated automatically, or to be stored in a longitude—latitude format.

In one embodiment of the invention, once a geographic area is defined, callees within the area may be added by specifying criteria to create the formal Geo Zone. For example, a field may be associated with each phone number (callee) record indicating whether the phone number is for a business or a residence. Assuming that every phone number is either a business or a residence, selecting both these criteria would result in every callee in the geographic area being included in the Geo Zone. Other examples of filter fields that may be associated with callee record include whether the callee has previously indicated a desire to participate in the automated calling system, the preferred time of day to place an automated call, whether children reside at the callee's address, or whether the callee has previously expressed a desire to be informed of public zoning hearing for land near the callees location. Most important to the present invention, a criteria may be based on a TOUCH TONE keypad response the callee has made during a prior automated calling session that included the callee. In this sense, the term Geo Zone is a somewhat of a misnomer because callees within a Geo Zone may be selected based on criteria in addition to their geographic location.

When a Geo Zone is selected, the system will identify all callees residing in that area and call them with the message chosen. At the bottom of the screen shown in FIG. 25 is a list of available Geo Zones to select. The selection of Geo Zones is accomplished in a manner similar to that used for Numbered Lists. The operator may use the PGUP and PGDN keys to display additional pages, and may use the arrow keys to move among the displayed list of Geo Zones. The operator may change the order of display of the Geo Zones by toggling the F6 key which will alternately display Geo Zone number order and the description order for Geo Zones. In the screen of FIG. 25, the F1 key was depressed to select Zone 1, NORTH-WEST OF PLANT, and the default message for the zone NORTH-WEST OF PLANT was chosen.

The selection process for selecting Geo Zones is essentially identical to the selection of Numbered Lists described herein above. Once the appropriate Zones have been selected, the message may be changed for a particular calling session. The Zone may be deleted from the calling session, or the operator may change the Zone to be called. The functions "change messages" and "delete entry" presented in FIG. 25 are essentially identical to the counterparts for selecting Numbered Lists.

To change a Geo Zone entry, the operator should depress the F7 key while residing at FIG. 25. The pop-up window illustrated in FIG. 26 prompting the operator to enter the Zone to be changed is displayed. Depression of the ESC key will not change the Zone whereas depression of the F1 key will change the Zone entry made.

If the F1 key is depressed while viewing the screen of FIG. 26, the screen illustrated in FIG. 27 is shown. The screen presents information to allow the operator to change the Geo Zone for this particular calling session only. The operator may change the message to be used, the unlisted flag, the boundaries of the Zone itself, and the criteria for including people (callees) in the Zone. In the embodiment shown in FIG. 27, there are 39 calling criteria for each phone number record which may be used. However, only the first three have been defined. In addition, as shown by lines 1 and 2 in FIG. 27, the user has specified that both business and residential callees should be included, as indicated by the "I" following the 1 and the 2. If every callee is defined to be either a business or residence, this will select every callee in the specified geographic area. Obviously, caution should be exercised in changing these parameters as it can make quite an impact on the calling session. If the operator is certain of the changes entered, the F1 key may be depressed to update the Zone's parameters for the calling session. Otherwise, depression of the ESC key allows the operator to leave this screen without changing the selected Zone's parameters. Again, changing the Zone's parameters for the calling session does not change the default parameters for this Zone. Such changes only affect the Zone's parameters for this particular calling session.

Once the necessary Zones have been selected, the operator may depress the F9 key to accept all Numbered Lists and Geo Zones entered. Upon depression of the F9 (accept) key, the screen illustrated in FIG. 28 will be displayed. This screen displays all messages to be used in the calling session. The presentation of the screen provides the operator with an opportunity to modify and/or change the messages for the calling session. If the operator is satisfied with the messages displayed in FIG. 28, depression of the F9 key allows the operator to continue. Otherwise, depression of the ESC key allows the operator to return to the select Geo Zone screens illustrated in FIG. 25.

Depression of the F9 key at the prompt in FIG. 28, results in display of the call generation result screen of FIG. 29. The call generation screen displays the Lists and/or Zones to be called, the respective messages to be used for each List and/or Zone, and the number of calls to be made for each List/Zone. If this information is correct, depression of the F9 key allows the operator to continue to the next screen and accept all data for the calling session. Again, depressing the ESC key returns the operator to the select Geo Zones screens.

Depression of the F9 screen from FIG. 29 results in the display of the screen of FIG. 30. At this screen, the operator may actually begin the calling session. The operator may change the calling level (useful for "grabbing" more lines), or the number of call retries to be made in reaching the callees. If everything is as satisfactory, the operator simply depresses the F1 key to process the calling session. At this point, passwords may be required. If so, the pop-up screen illustrated in FIG. 31 is displayed. As in the password screen of FIG. 3, the operator simply enters the password and depresses the ENTER key to continue. No calls will be initiated unless the proper password is entered.

FIG. 32 shows a screen indicating the total number of calls queued, as well as the designated number of the particular calling session. The number of the particular calling session is used to identify the calling session for all future operations. Thus, the operator should note the number. At this point, the database system is in the act of calling the callees selected by Numbered Lists and/or Geo Zones.

When instructed to call the callees in the Geo Zone, the software of one embodiment copies information from database 57 to temporary file 58. File 58 contains essential information regarding each call, as shown in the record layouts in the appendix. Accordingly, information such as whether an attempt to call the callee has been made, the date and time of each attempted call, and any keystroke responses to questions may be recorded in temporary file 58.

It is possible for the operator to ascertain the progress of a particular calling session. To do so requires either going to the start call—stop call menu or using the calling log as described herein. Recall that at the Main Menu shown in FIG. 2, an option provided to the operator under the Geo/List Calling menu is Stop Calls. This option is selected by simply highlighting the Stop Calls line (see FIG. 33) and pressing the ENTER key. Upon selection of the Stop Calls function, the screen illustrated in FIG. 34 is shown. Information is provided to allow the operator to select a particular calling session to complete or to cancel. This feature may be useful, for example, whenever a situation or crisis has resolved itself before all callees have been called. The information displayed in FIG. 34 is also useful for viewing the summary level progress of a particular calling session. The total number of calls, the number of completed calls, and the percentage of completion for a given calling session is displayed in FIG. 34. The arrow keys as well as the PGUP and PGDN may be used to display the desired calling session and to check its progress. To complete a finished calling session, i.e., a session which is 100% completed as indicated on the screen, depress the FI key. Depression of the F1 key updates the reporting files and marks the session as called.

To cancel a calling session in progress, the operator also depresses the F1 key. Depression of the F1 key in this instance first completes all calls that are immediately being made, not calls that are yet to be made. This assures that callees with whom connection may have been made will not be disconnected. Secondly, it cancels all calls that have not yet been made and marks the session as called. In the example that follows, calling session number 17 was selected with the F1 key. The intention here is to cancel the session before it is queued into the system. Note that calling session number 17 is second to the completion of session 16.

After depressing the F1 key in FIG. 34, the screen shown in FIG. 35 is displayed. This screen shows the status after the calling session has been cancelled. Note that the total number of calls, the total number of calls completed, and the percentage of completion are displayed. After this screen has been viewed by the operator, depression of the ENTER key returns the operator to a screen similar to that shown in FIG. 34, namely, the screen of FIG. 36 is displayed. Because calling session 17 has been cancelled, it is no longer displayed in the list of calling sessions.

Figure 37:
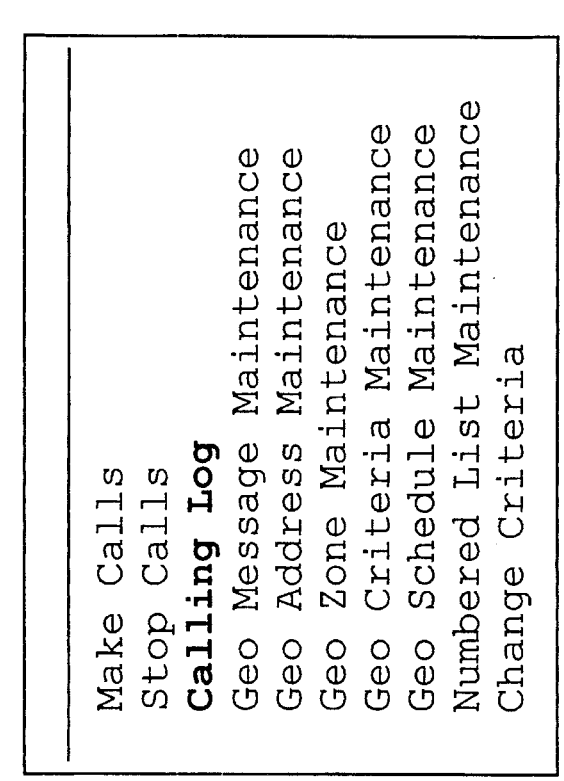
FIG. 37 shows a computer generated screen showing the Main Menu with the Calling Log line highlighted.

In the Main Menu, a third option under the Geo/List Calling Main Menu item is Calling Log (see FIG. 37). Calling Log allows the user to either display or to print a report of the log called during a specific calling session. The option can be used both when a calling session is in progress as well as after it has been completed. The data used for reporting is generally not completely up-to-date until the session has been both completed and stopped. It may take some period of time from the completion of the last call to bring the data up-to-date.

If the Calling Log function of the Geo/List Calling Main Menu item is selected, the screen illustrated in FIG. 38 is displayed. The prompt screen of FIG. 38 allows the user to select a particular session to display or print. Note that the calling session number, the date, and the time are all displayed for the operators convenience. The last session will be the default session to be displayed. To see a list of sessions from which to select, the operator should depress the F1 key. Depression of the F1 key displays the screen shown in FIG. 39. This screen shows the calling session selection list. Certain descriptive information is displayed to help the operator select a calling session to display or print. The arrow, PGUP and PGDN keys may be used to move within the list of calling sessions. If the operator desires not to select a calling session, the ESC key may be depressed. The ability to list calling sessions may be helpful when the operator only wants to review the descriptive information for a particular calling session. To select a calling session for reporting, the F1 key is depressed. In the example screen of FIG. 39, calling session number 6 is chosen.

Upon depression of the F1 key in FIG. 39 with session number 6 chosen, the screen of FIG. 38 is updated to be the screen of FIG. 40 showing session number 6 as the calling session to be displayed or printed. To display the report results, the operator depresses the F2 key. To print the report, the F4 key should be depressed.

Upon depression of the F2 key to display the report of session 6, the screen in FIG. 41 is displayed. The calling log provides the operator with detailed information for each call of a particular calling session. This report provides feedback of how successful the calling session was or is. If callees did not receive the message, or if they did not give the required response, it will be clearly visible on the screen display of FIG. 41. At that point, the operator may choose to validate a particular callee's telephone number, or contact them personally. As in the displays of many of the lists presented throughout the software system, the PGDN and PGUP keys may be used to display different pages of the report.

When the operator has completed reviewing the report, depression of the ESC key returns to the previous screen, i.e. the screen of FIG. 40. If while viewing the screen of FIG. 40 the operator depresses the F4 key to print the results, a pop-up window as illustrated in FIG. 42 is provided to the operator. In the log print-out, the operator has a few options, namely, whether to provide Geo Zone and List detail; whether to include all calls, delivered calls, or non-delivered calls; and whether to include the specific responses received from the callees. Once the appropriate information has been entered, the ESC key allows the operator to exit without printing the report, while depression of the F2 key prints the report for the calling session selected. While printing, a prompt will be shown showing that printing is in progress, as illustrated in FIG. 43.

Selection of Geographical Zones

It will be appreciated by those of skill in the art that selection of the Geographical Zones according to the embodiment set forth in the foregoing description may be based on a variety of criteria. In the embodiment presented, X and Y coordinates are provided in database 57 for each telephone number and the X and Y coordinates are unique for each telephone number located at a different address. As a result, there is no limitation to the size of the geographical area to be contacted by the system of the present invention. The geographical area may range from the very small to the very large.

In the embodiment described above, each Geo Zone is defined by identifying two opposing corners of a rectangular area. For each telephone number to have unique X,Y coordinates necessitates that a very small grid (resolution) be employed. Therefore, it is impractical to select the area by listing blocks of geographical areas. The selection of opposing corners eliminates the need to list a series of blocks as is done in the prior art and also permits the selection of very small geographical areas not accessible within prior art systems.

A number of means may be used to assist the user in determining the boundaries of the geographical zone to which calls are to be initiated. For example, a hard copy map may be provided, or a computer based mapping system may be used. Regardless of the means, for automated phone calling systems of the present invention whose messages must be transmitted in a time critical manner, the means should be conducive to quick determination of the geographical boundaries.

Updating the System's Database

Returning now to FIG. 1, the general operation of the automated phone calling system of the present invention is discussed herein with particular emphasis on ability to allow callees to respond to inquiries that will affect their reception of future calls by the system. As described above, the operator sets up the calling session through user input and display 51. In one embodiment, temporary information is stored in temporary file 58 upon completion of the set up operation and initiation of a call session. Temporary file 58 contains the data records for callees selected for a call session. In this manner, the necessary fields from each selected record of database 57 are copied to temporary file 58 so that database 57 is not corrupted in the event of an unforeseen event, such as a power outage. Further, though automatic updating of database 57 is possible with the automated phone calling system of the present invention, there may be instances in which it is desirable to require that the responses of the callees be viewed by an operator prior to permanently updating the contents of database 57.

It will be appreciated that it is plausible to provide an automated phone calling system according to the present invention which does not use temporary file 58. However, as previously stated, use of temporary file 58 may be advantageous in reducing the possibility that database 57 becomes corrupted and may also be used as a buffer for verifying the responses of a callee prior to permanently changing database 57.

Returning to the operation of the system of the present invention, hardware/software interface 50 initiates calls to each of the callees over telecommunications interfaces 53–56. Calls are queued according to and depending upon the number of callees to be contacted and the number of telecommunications lines provided by telecommunications interfaces 53–56. For each call initiated, hardware/software interface 50 monitors the telecommunications line for connection with the callee and for receipt of a voice signal which hardware/software interface 50 assumes to indicate that a person has answered the telephone call it initiated. At this point, the message to be provided the callee is retrieved and transmitted over the appropriate telecommunications interface 53–56.

If the message is not one which requires input from the callee, hardware/software interface monitors the appropriate telecommunications line to ascertain whether the complete message was provided to the callee. In this manner, should it be desired that the callee be recalled in the event of an interruption of communication, hardware/software interface 50 may store a store/no store flag for use in retrying to provide the message to that callee.

If the message transmitted anticipates that the callee will provide TOUCH TONE input in response to an inquiry made of the callee, hardware/software interface 50 monitors the telecommunications line for a response and records the TOUCH TONE response made. If appropriate, hardware/software interface 50 modifies the appropriate data field of temporary file 58 for later permanent modification in database 57. Alternatively, hardware/software interface 50 may directly modify the appropriate data field in database 57. If temporary file 58 is used to record the modification of a data field, database 57 may be automatically updated upon completion of the call, automatically updated upon completion of the call session, or updated upon approval of the operator, for example.

If additional inquiries are to be made of the callee by the system, hardware/software interface 50 continues with the recorded message(s) to be provided to the callee. Once all messages and responses to inquiries are received, hardware/software interface 50 provides a sign-off message, such as, "Thank you for your time," and disconnects telecommunications with that callee.

It will be appreciated by those of skill in the art that other telecommunications features may be incorporated into the automated phone calling system of the present invention. For example, the system may be instructed to retry communication with a callee who did not answer within a specified number of rings. Further, a time increment may be established for retrying to contact that callee. It is also possible that the queuing of calls over telecommunications interfaces 53–56 may be prioritized.

It will also be appreciated that numerous data fields may be stored in database 57 to accommodate the provision of messages. As described above wherein the priority of the Numbered List(s) and/or Geo Zone(s) to be called may be prioritized, each record of database 57 may also include a data field which indicates individual priorities for callees. For example, perhaps all hospitals, schools, and other institutions are to be contacted first in the event of a emergency, such as a chemical spill, in the area. Various telecommunications features and optional database fields are contemplated to be within the scope of the invention.

Future calls made by the automated phone calling system of the present invention will therefore be impacted by the information stored in database 57. Depending on the particular application of the system, this feature may be critical to the success of the system. Individuals and businesses alike are often the recipient of unwanted calls such as unwanted telephone solicitation which occurs at all hours of the day and night. The provision of "control" by the callee may therefore be particularly advantageous when the system is not employed in what might be termed a vital public-serving function—one which the public would generally agree requires that all callees should and must be notified, as in the presence of a tornado, for example.

Several types of data fields may be used to impact future calls received by a callee. As mentioned above, one or more data fields in database 57 may be used to designate appropriate calling times for each callee. In addition, if the automated phone calling system of the present invention is to be used to provide a plurality of message types to callees, a data field may be utilized to indicate whether the callee is to receive a particular message. For example, if the system of the present invention is employed by a law enforcement agency to alert its public about suspected or actual crime in the callee's geographical area, certain callees may only be interested in receiving certain types of messages. For example, a callee having young children may wish to be apprised of a pattern of stolen children's bicycles whereas an older individual or a callee having no children may not wish to be notified of such information. The interactive capability of the automated phone calling system of the present invention gives the callee control over the receipt of such calls.

Upon installation of the system, it may be desirable to communicate with all potential callees to allow each callee to configure the system for that callee for all future calls. Such configuration may include calling times, the invocation of a password so that the callee is certain that a particular individuals or set of individuals receive messages from the system (a callee may desire such a feature to prevent messages from being heard or intercepted by children, for example), or limiting the types of messages the callee will receive.

A calling session to multiple callees may be interrupted by the operator or may terminate when a sufficient number of attempts to each callee has been made. In either case, temporary file 58 may include fields containing TOUCH TONE keypad responses of callees to whom calls were successfully placed. This information may be used to update criteria for callees in the database. In particular, when the Change Criteria option is selected from the Geo/List menu of FIG. 2, the Change Criteria as a result of a Calling Session screen of FIG. 44 is displayed. In this embodiment, one of 10 different TOUCH TONE responses may have been depressed by callees. The user may, for each response, tab to the # column and enter one of the callee database criteria (one of 39 in one embodiment). The system will display the criteria description associated with the criteria in the Description column, as shown in FIG. 45. The operator may then tab to the New Value column and specify a New Value for the criteria if the callee depressed the specified response key. For example, in FIG. 45, the operator has specified that if response 1 was depressed, that criteria 3 (neighborhood watch) should be changed to a "*", and if response 3 was depressed, that criteria 1 (business) should be changed to "S."

After the calling session on which the updates will be based has been selected, F1 may be depressed to allow the operator to enter the responses. (This may be necessary, for example, because different calling sessions may be implemented with the system.) The desired calling session is selected by depressing the F1 key as shown in FIG. 46. The system will then return to the prior screen, FIG. 45, whereupon the operator may depress the F2 key to save the changes. Because updating the criteria will result in permanent changes to database 57, a warning message is displayed as shown in FIG. 47 giving the operator an opportunity to reconsider. By pressing enter, the system updates database 57 by replacing the specified criteria fields with the indicated values. As shown in FIG. 48, during this process, the screen may display a running count of the number of records read from the temporary file and the number of database records updated by the system. Using the procedures described above in the discussion of FIG. 27, the updated criteria may then be used to select callees for future automated calls. It will be appreciated by those of skill in the art that a system that does not require operator intervention to update a database criteria field based on a user's TOUCH TONE keypad response is also within the scope and spirit of the invention. Further, the system may be designed to record multiple TOUCH TONE keypad responses of a callee and record them in the temporary file for updated multiple callee criteria in the database. The term "dial code" as used herein and in the claims is intended to refer to both TOUCH TONE (DTMF, or dual tone multiple frequency) and rotary pulse codes.

APPENDIX OF UPDATING SOURCE CODE

```
 IDENTIFICATION DIVISION.
****************************************************************
* PROGRAM NAME: M1mnt18
****************************************************************
 PROGRAM-ID. M1mnt18.
 AUTHOR.
 DATE-WRITTEN.
*
 ENVIRONMENT DIVISION.
 CONFIGURATION SECTION.
 SOURCE-COMPUTER. IBM-PC-DOS.
 OBJECT-COMPUTER. IBM-PC-DOS.
*
 INPUT-OUTPUT SECTION.
 FILE-CONTROL.
*
 COPY "m1data"   OF "slcopy".
 COPY "m1flags"  OF "slcopy".
 COPY "m1inst"   OF "slcopy".
 COPY "m1logcl"  OF "slcopy".
 COPY "m1logses" OF "slcopy".
*
 DATA DIVISION.
 FILE SECTION.
*
 COPY "m1data"   OF "fdcopy".
 COPY "m1flags"  OF "fdcopy".
 COPY "m1inst"   OF "fdcopy".
 COPY "m1logcl"  OF "fdcopy".
 COPY "m1logses" OF "fdcopy".
*
****************************************************************
 WORKING-STORAGE SECTION.
****************************************************************
*
 COPY "accept"   OF "wscopy".
 COPY "m1datawk" OF "wscopy".
 COPY "openvar"  OF "wscopy".
 COPY "slzone"   OF "wscopy".
 COPY "workitm"  OF "wscopy".
 COPY "ws"       OF "wscopy".
*
 01  CALL-COUNT                  PIC 9(09) VALUE ZEROS.
 01  CHANGE-COUNT                PIC 9(09) VALUE ZEROS.
 01  CUR-ROW                     PIC 99.
 01  LAST-KEY1                   PIC 9999.
 01  LAST-LINE                   PIC 9999.
 01  READ-COUNT                  PIC 9(09) VALUE ZEROS.
```

```
        01  WINDOW-PLUS              PIC 99.
        01  WK1                      PIC 99.
        01  WK-LINES                 PIC 99.
        01  WK-MESSAGE               PIC X(35) VALUE SPACES.
        01  WK-STATUS                PIC X.
       *
        01  CALL-CRITERIA-ARRAY.
            03  CRIT-DESC            OCCURS 39 TIMES PIC X(20).
       *
        01  CHANGED-SW               PIC X VALUE SPACE.
            88  KEY-CHANGED                VALUE "Y".
            88  KEY-SAME                   VALUE "N".
       *
        01  CRITERIA-TO-CHANGE.
            03  CRITERION-ARRAY      OCCURS 10 TIMES.
                05  CRITERION-NUMBER PIC 99.
                05  CRITERION-VALUE  PIC X.
       *
        01  DIRECTION-SW             PIC X VALUE SPACE.
            88  FORWRD                     VALUE "F".
            88  BACKWRD                    VALUE "B".
       *
        01  LS-RECORD-WK.
            03  LS-KEY2-WK.
                05  LS-STATUS-WK     PIC X.
key             05  LS-SESSION-WK    PIC 9999.
            03  LS-DATE-WK           PIC 9(07).
            03  LS-TIME-WK           PIC 9(08).
            03  LS-ZONES-WK          PIC X(1690).
            03  LS-STATS-WK          PIC X(126).
            03  LS-CALLING-LEVEL-WK  PIC 9.
            03  LS-RETRIES-WK        PIC 999.
       *
        01  SEARCH-DESCRIPTION       PIC X(15).
        01  SEARCH-KEY               PIC 9.
        01  SEARCH-DATA-ARRAY.
            03  SEARCH-ARRAY OCCURS 25 TIMES.
                05  SA-KEY           PIC 9(11).
       *
        01  STATUS-MSG.
            03  FILLER               PIC X(16) VALUE "Calling".
            03  FILLER               PIC X(16) VALUE "Never Started".
            03  FILLER           PIC X(16) VALUE "Called, See Log".
            03  FILLER               PIC X(16) VALUE "Called".
            03  FILLER               PIC X(16) VALUE "Suspended".
            03  FILLER               PIC X(16) VALUE "Never Started".
        01  STATUS-MSG-ARRAY REDEFINES STATUS-MSG.
            03  STATUS-MSG-AR        OCCURS 6 TIMES PIC X(16).
       *
        01  TITLE-BUFF.
```

```
       03  TITLE-TEXT               PIC X(16) VALUE "Calling Session ".
       03  TITLE-SESS-NO             PIC ZZZ9.
*
*******************************************************************
 PROCEDURE DIVISION.
*******************************************************************
*
 COPY "declar" OF "prcopy".
*
 MAINLINE SECTION.
 000-START.
     PERFORM 1000-OPEN-FILES     THRU 1000-EXIT.
     PERFORM 1200-INITIAL-SETUP  THRU 1200-EXIT.
     PERFORM 100-MAINLINE        THRU 100-EXIT.
     PERFORM 1800-CLOSE-FILES    THRU 1800-EXIT.
     EXIT PROGRAM.
     STOP RUN.
*
*******************************************************************
*    100  MAINLINE                                                 *
*******************************************************************
*
 100-MAINLINE.
     MOVE SPACES TO SELECTION LINE23-MSG ACC-RETURN.
     MOVE " Change Criteria as a Result of a Calling Session"
       TO TITLE-BAR.

100-ACCEPT-SELECTION.
     MOVE LS-SESSION-WK TO TITLE-SESS-NO.
     DISPLAY TITLE-BAR COLOR RED-BAR LINE 2 POS 1 SIZE 80.
     MOVE 20 TO WINDOW-1-LINES.
     MOVE 74 TO WINDOW-1-SIZE.
     DISPLAY WINDOW LINE 04 POS 3
        SIZE WINDOW-1-SIZE LINES WINDOW-1-LINES
        COLOR WINDOW1-COLOR BOXED SHADOW NO WRAP
        POP-UP AREA IS WINDOW-1-SAVE-AREA NO SCROLL
        CENTERED TITLE IS TITLE-BUFF.
     MOVE 1 TO CURRENT-WINDOW.
     MOVE ZERO TO LS-SESSION.

100-DISP-DATA.
     MOVE 999 TO ACC-RETURN.
     PERFORM 2000-DISP-DATA THRU 2000-EXIT.

100-ACCEPT-DATA.
     PERFORM 2100-ACCEPT-DATA THRU 2100-EXIT.
     IF ESCAPE-KEY
       CLOSE WINDOW WINDOW-1-SAVE-AREA
       GO TO 100-EXIT.
     IF F1
```

```
        PERFORM 400-SELECT-RECORD THRU 400-EXIT
        INITIALIZE CRITERIA-TO-CHANGE
        CLOSE WINDOW WINDOW-1-SAVE-AREA
        GO TO 100-ACCEPT-SELECTION.

PERFORM 2500-VALIDATE-SCREEN1 THRU 2500-EXIT.
    IF THERE-ARE-SCREEN-ERRORS GO TO 100-ACCEPT-DATA.

IF F2
       PERFORM 800-CONTINUE-PROMPT THRU 800-CONTINUE-EXIT
       IF LET-PASS
          PERFORM 500-WRITE-NEW-CRITERION THRU 500-EXIT
          DISPLAY SPACES LINE 17 SIZE WINDOW-1-SIZE.

GO TO 100-ACCEPT-DATA.
100-EXIT.
    EXIT.
*
*******************************************************************
* 400   SELECT RECORD WINDOW                                      *
*******************************************************************
*
400-SELECT-RECORD.
    MOVE 2 TO CURRENT-WINDOW.
    MOVE YES TO FIRST-TIME-SW.
    MOVE NON TO ERR-SW.
    MOVE 15 TO WINDOW-2-LINES.
    MOVE 75 TO WINDOW-2-SIZE.
    COMPUTE WK-LINES = WINDOW-2-LINES - 3.
    COMPUTE WINDOW-PLUS = WK-LINES + 1.
    MOVE 1 TO CUR-ROW.
    MOVE "Session Number" TO SEARCH-DESCRIPTION.
    IF FIRST-TIME MOVE 1 TO SEARCH-KEY.

DISPLAY WINDOW LINE 7 POS 4 SIZE 75 LINES WINDOW-2-LINES
       COLOR WINDOW2-COLOR POP-UP IS WINDOW-2-SAVE-AREA
       BOXED SHADOW TITLE IS "Select Session" NO SCROLL NO WRAP.
    DISPLAY
       LINE SIZE 74  LINE 2 POS 01 COLOR BLACK-BAR
       "Session"     LINE 2 POS 03 COLOR BLACK-BAR
       "Date"        LINE 2 POS 12 COLOR BLACK-BAR
       "Time"        LINE 2 POS 20 COLOR BLACK-BAR
       "Status"      LINE 2 POS 30 COLOR BLACK-BAR
       "% Completed" LINE 2 POS 45 COLOR BLACK-BAR
       "Calls"       LINE 2 POS 58 COLOR BLACK-BAR
       "Complete"    LINE 2 POS 68 COLOR BLACK-BAR
       "F1-Select Record, Arrows, Page Down, Page Up, Esc-Exit"
                     LINE 15 POS 1 COLOR INSTRUCTION-COLOR.

MOVE "F" TO DIRECTION-SW.
```

```
        MOVE ZERO TO LAST-LINE.
        MOVE LS-SESSION-WK TO LAST-KEY1.

400-NEXT-SCREEN.
        PERFORM 401-SCAN-FILE  THRU 401-EXIT.
        PERFORM 402-DISP-ARRAY THRU 402-EXIT.
        MOVE NON TO FIRST-TIME-SW.

400-GET-KEY.
        PERFORM 480-SET-CUR-POINTER.
        MOVE NON TO CHANGED-SW.
        IF SEARCH-KEY = 1
           CALL ADA USING 04, LS-SESSION, "D", 0, 01, 12,
                          ACC-RETURN, ACC-COLOR, DISP-COLOR
           IF LS-SESSION NOT= ZERO MOVE YES TO CHANGED-SW.

* CLOSE WINDOW
        IF ESCAPE-KEY GO TO 400-CLOSE-WINDOW.

* SELECT RECORD UNDER POINTER AND CLOSE WINDOW
        IF F1
           MOVE CUR-ROW TO WK1
           IF SA-KEY(WK1) NOT = ZERO
              MOVE SA-KEY(WK1) TO LS-SESSION
              MOVE NON TO USE-LOCKING-SW
              PERFORM 900-READ-LS-FILE
              MOVE LS-RECORD TO LS-RECORD-WK
              GO TO 400-CLOSE-WINDOW
           ELSE
              DISPLAY "" BEEP
              GO TO 400-GET-KEY.

* LOAD NEXT SCREEN OF RECORDS
        IF PG-DOWN
           MOVE 1 TO CUR-ROW
           MOVE "F" TO DIRECTION-SW
           IF SEARCH-KEY = 1
              IF KEY-CHANGED
                 MOVE LS-SESSION TO LAST-KEY1
                 MOVE ZEROS TO LS-SESSION
              END-IF
           END-IF
           GO TO 400-NEXT-SCREEN.

* READ PREVIOUS SCREEN OF RECORDS
        IF PG-UP
           MOVE 1 TO CUR-ROW
           MOVE "B" TO DIRECTION-SW
           IF SEARCH-KEY = 1
              IF KEY-CHANGED
```

```
            MOVE LS-SESSION TO LAST-KEY1
            MOVE ZERO TO LAST-LINE
          END-IF
       END-IF
       GO TO 400-NEXT-SCREEN.

* MOVE RECORD POINTER ON SCREEN UP 1 LINE
     IF UP-KEY
        DISPLAY SPACES LINE CUR-ROW + 2 POS 1
        SUBTRACT 1 FROM CUR-ROW.

* MOVE RECORD POINTER ON SCREEN DOWN 1 LINE
     IF DOWN-KEY
        DISPLAY SPACES LINE CUR-ROW + 2 POS 1
        ADD 1 TO CUR-ROW.

GO TO 400-GET-KEY.

* EXIT 400 WITH WINDOW CLOSE
 400-CLOSE-WINDOW.
     CLOSE WINDOW WINDOW-2-SAVE-AREA.

400-EXIT.
     EXIT.
*
 401-SCAN-FILE.
     MOVE ZEROS TO SEARCH-DATA-ARRAY.
     DISPLAY SPACES            LINE 1 POS 12 SIZE 20
             "Start at: "      LINE 1 POS 1 COLOR PROMPT-COLOR
             "Sort by: "       LINE 1 POS 41 COLOR PROMPT-COLOR
             SEARCH-DESCRIPTION LINE 1 POS 50 COLOR ACC-COLOR.
     IF FORWRD
        PERFORM 420-FILL-TABLE-FORWARD THRU 420-EXIT
     ELSE
        PERFORM 430-FILL-TABLE-BACKWARD THRU 430-EXIT.
 401-EXIT.
     EXIT.

* DISPLAY LINES IN WINDOW
 402-DISP-ARRAY.
     MOVE 2 TO SUB2.
     PERFORM 403-DISP-LINE THRU 403-EXIT VARYING SUB FROM 1 BY 1
        UNTIL SUB > WK-LINES.
 402-EXIT.
     EXIT.
*
 403-DISP-LINE.
     ADD 1 TO SUB2.
     DISPLAY SPACES LINE SUB2 POS 1 SIZE 75 COLOR TBL-COLOR.
     IF SA-KEY (SUB) = ZERO
```

```
        MOVE ZERO TO LS-SESSION
        GO TO 403-EXIT.

MOVE SA-KEY  (SUB) TO LS-SESSION.
    MOVE NON TO USE-LOCKING-SW.
    PERFORM 900-READ-LS-FILE.

MOVE LS-STATS TO SL-STATS.

MOVE LS-DATE TO STRD-DATE.
    MOVE "S" TO DATE-CONVERT-SW.
    CALL DATECONV USING GREG-DATE STRD-DATE DATE-CONVERT-SW.
    MOVE GREG-DATE TO MDY-DATE.
    MOVE MDY-YY TO DISP-YY.
    MOVE MDY-MM TO DISP-MM.
    MOVE MDY-DD TO DISP-DD.

MOVE LS-TIME TO TIME-IN.
    MOVE TIME-HH TO DISP-HH.
    MOVE TIME-MM TO DISP-MT.

MOVE SA-KEY (SUB) TO DISP-AMT4.

MOVE LS-STATUS TO WK-STATUS.
    PERFORM 800-LOAD-STATUS-MSG.

MOVE ZERO TO CALL-COUNT.
    PERFORM VARYING T-INT FROM 1 BY 1 UNTIL T-INT > 10
       ADD SL-STAT-ACCEPTS(T-INT) TO CALL-COUNT
       ADD SL-STAT-LISTS(T-INT)   TO CALL-COUNT
    END-PERFORM.

COMPUTE DISP-AMT3 = (SL-STAT-REC-COMPLETE * 100)/ CALL-COUNT.

DISPLAY DISP-AMT4  LINE SUB2 POS 04 COLOR TBL-COLOR
            DISP-DATE  LINE SUB2 POS 10 COLOR TBL-COLOR
            DISP-TIME  LINE SUB2 POS 20 COLOR TBL-COLOR
            WK-MESSAGE LINE SUB2 POS 30 COLOR TBL-COLOR
            DISP-AMT3  LINE SUB2 POS 50 COLOR TBL-COLOR.

MOVE CALL-COUNT TO DISP-AMT9.
    DISPLAY DISP-AMT9 LINE SUB2 POS 53 COLOR TBL-COLOR.

MOVE SL-STAT-REC-COMPLETE TO DISP-AMT9.
    DISPLAY DISP-AMT9 LINE SUB2 POS 65 COLOR TBL-COLOR.

MOVE ZERO TO LS-SESSION.
403-EXIT.
    EXIT.
```

```
* LOAD SEARCH TABLE WITH READ NEXT
 420-FILL-TABLE-FORWARD.
     IF SEARCH-KEY = 1
       MOVE LAST-KEY1 TO LS-SESSION
       START LS-FILE KEY NOT > LS-SESSION
          INVALID KEY GO TO 420-EXIT.

PERFORM VARYING SUB FROM  1 BY 1 UNTIL SUB > WINDOW-PLUS
       MOVE NON TO USE-LOCKING-SW
       PERFORM 900-READ-PREVIOUS-LS-FILE
       IF EOF-REACHED
          MOVE 99 TO SUB
       ELSE
          MOVE LS-SESSION TO SA-KEY(SUB), LAST-KEY1
          MOVE ZERO TO LS-SESSION
          MOVE SUB TO LAST-LINE
       END-IF
     END-PERFORM.
 420-EXIT.
     EXIT.

* LOAD SEARCH TABLE WITH READ PREVIOUS
 430-FILL-TABLE-BACKWARD.
     IF SEARCH-KEY = 1
       MOVE LAST-KEY1 TO LS-SESSION
       START LS-FILE KEY NOT < LS-SESSION
          INVALID KEY GO TO 430-EXIT.

COMPUTE SUB = LAST-LINE + 9.
     PERFORM VARYING SUB FROM SUB BY -1 UNTIL SUB < 1
       MOVE NON TO USE-LOCKING-SW
       PERFORM 900-READ-NEXT-LS-FILE
       IF EOF-REACHED
          MOVE 0 TO SUB
          MOVE HIGH-VALUES TO LAST-KEY1
       ELSE
          MOVE LS-SESSION TO LAST-KEY1
       END-IF
     END-PERFORM.
     PERFORM 420-FILL-TABLE-FORWARD THRU 420-EXIT.
 430-EXIT.
     EXIT.
*
 480-SET-CUR-POINTER.
     IF CUR-ROW > WK-LINES MOVE 1 TO CUR-ROW.
     IF CUR-ROW < 1 MOVE WK-LINES TO CUR-ROW.
     DISPLAY ">" LINE CUR-ROW + 2 POS 1 COLOR ERROR-COLOR.
*
****************************************************************
*  500   WRITE NEW CRITERION                                    *
```

```
*****************************************************************
*
 500-WRITE-NEW-CRITERION.
     MOVE ZEROS TO READ-COUNT, CHANGE-COUNT.
     DISPLAY "Calls Read:"   LINE 17 POS 14 COLOR PROMPT-COLOR
             "Changes Made:" LINE 17 POS 37 COLOR PROMPT-COLOR.

MOVE LS-SESSION-WK TO LC-SESSION.
     PERFORM 900-START-LC-FILE-ALTKEY1.
     IF EOF-REACHED
       MOVE "36NO CALLS WERE FOUND FOR THIS SESSION"
         TO LINE24-MSGA
       PERFORM 999-DISP-ERROR
       GO TO 500-EXIT.

500-LOOP.
     PERFORM 900-READ-NEXT-LC-FILE.
     IF EOF-REACHED
       IF CHANGE-COUNT > ZERO
         MOVE "CRITERION CHANGED" TO COMPLETION-MSG
       ELSE
         MOVE "NO RECORDS QUALIFIED TO CHANGE" TO COMPLETION-MSG
       END-IF
       PERFORM 998-COMPLETION-WINDOW
       GO TO 500-EXIT.

ADD 1 TO READ-COUNT.
     MOVE READ-COUNT TO DISP-AMT9.
     DISPLAY DISP-AMT9 LINE 17 POS 26.

IF LC-STATUS NOT= "C" AND NOT= "R" GO TO 500-LOOP.

MOVE LC-ADDRESS-KEY TO CF-KEY.
     PERFORM 900-READ-CF-FILE.
     IF RECORD-NOT-FOUND
       GO TO 500-LOOP
     ELSE
       MOVE CF-RECORD TO CF-RECORD-WK.

EVALUATE TRUE
       WHEN LC-LAST-STATUS = "01" AND CRITERION-NUMBER (01) > ZERO
         MOVE 1 TO SUB
       WHEN LC-LAST-STATUS = "02" AND CRITERION-NUMBER (02) > ZERO
         MOVE 2 TO SUB
       WHEN LC-LAST-STATUS = "03" AND CRITERION-NUMBER (03) > ZERO
         MOVE 3 TO SUB
       WHEN LC-LAST-STATUS = "04" AND CRITERION-NUMBER (04) > ZERO
         MOVE 4 TO SUB
       WHEN LC-LAST-STATUS = "05" AND CRITERION-NUMBER (05) > ZERO
         MOVE 5 TO SUB
```

```
              WHEN LC-LAST-STATUS = "06" AND CRITERION-NUMBER (06) > ZERO
                 MOVE 6 TO SUB
              WHEN LC-LAST-STATUS = "07" AND CRITERION-NUMBER (07) > ZERO
                 MOVE 7 TO SUB
              WHEN LC-LAST-STATUS = "08" AND CRITERION-NUMBER (08) > ZERO
                 MOVE 8 TO SUB
              WHEN LC-LAST-STATUS = "09" AND CRITERION-NUMBER (09) > ZERO
                 MOVE 9 TO SUB
              WHEN LC-LAST-STATUS = "00" AND CRITERION-NUMBER (10) > ZERO
                 MOVE 10 TO SUB
              WHEN OTHER
                 GO TO 500-LOOP
           END-EVALUATE.

MOVE CRITERION-NUMBER (SUB) TO SUB1.
           EVALUATE TRUE
              WHEN CRITERION-VALUE (SUB) = " "
                 CONTINUE
              WHEN CRITERION-VALUE (SUB) = "S"
                 MOVE " " TO CF-FLAG-WK (SUB1)
              WHEN CRITERION-VALUE (SUB) = "*"
                 MOVE "*" TO CF-FLAG-WK (SUB1)
           END-EVALUATE.

ADD 1 TO CHANGE-COUNT.
           MOVE CHANGE-COUNT TO DISP-AMT9.
           DISPLAY DISP-AMT9 LINE 17 POS 51.

MOVE CF-RECORD-WK TO CF-RECORD.
           PERFORM 900-REWRITE-CF-FILE.

GO TO 500-LOOP.
       500-EXIT.
           EXIT.
      *
      *****************************************************************
      * 800      STANDARD AND COMMON ROUTINES.                         *
      *****************************************************************
      *
       800-LOAD-STATUS-MSG.
           EVALUATE TRUE
              WHEN WK-STATUS = " "
                 MOVE STATUS-MSG-AR(1) TO WK-MESSAGE
              WHEN WK-STATUS = "Q"
                 MOVE STATUS-MSG-AR(2) TO WK-MESSAGE
              WHEN WK-STATUS = "C"
                 MOVE STATUS-MSG-AR(3) TO WK-MESSAGE
              WHEN WK-STATUS = "R"
                 MOVE STATUS-MSG-AR(4) TO WK-MESSAGE
              WHEN WK-STATUS = "S"
```

```
            MOVE STATUS-MSG-AR(5) TO WK-MESSAGE
         WHEN WK-STATUS = "N"
            MOVE STATUS-MSG-AR(6) TO WK-MESSAGE
      END-EVALUATE.
*
 800-DISPLAY-CRITERION-NAME.
      IF JUST-DISPLAY GO TO 800-DISPLAY-EXIT.

COMPUTE SUB = (CRT-CURR-FIELD + 1) /2.
      IF CRITERION-NUMBER (SUB) = SPACES
         GO TO 800-DISPLAY-EXIT.
      IF CRITERION-NUMBER (SUB) < 1 OR > 39
         GO TO 800-DISPLAY-EXIT.

MOVE CRITERION-NUMBER (SUB) TO SUB1.
      DISPLAY CRIT-DESC (SUB1)
         LINE SUB + 5 POS 24 COLOR PROMPT-COLOR.

800-DISPLAY-EXIT.
      EXIT.
*
 800-CONTINUE-PROMPT.
      DISPLAY WINDOW LINE 10 POS 20 SIZE 40 LINES 7
                  NO SCROLL NO WRAP BOXED SHADOW COLOR 4357
                  POP-UP AREA IS WINDOW-5-SAVE-AREA
                  CENTERED TITLE IS "> WARNING <".
      DISPLAY
         "Once the Criteria Have "  LINE 2 POS 03 COLOR 4353
         "Been Changed"             LINE 2 POS 26 COLOR 4353
         "the Original Values are"  LINE 3 POS 03 COLOR 4353
         "GONE FOREVER"             LINE 3 POS 27 COLOR 4359
         "."                        LINE 3 POS 39 COLOR 4353
         "Be Sure You Want to "     LINE 4 POS 03 COLOR 4353
         "Save These"               LINE 4 POS 23 COLOR 4353
         "Changes"                  LINE 5 POS 03 COLOR 4353
         "BEFORE"                   LINE 5 POS 11 COLOR 4359
         "You Continue."            LINE 5 POS 18 COLOR 4353
         "ENTER-Continue, ESC-Exit" LINE 7 POS 02 COLOR 4353.
 800-CONTINUE-LOOP.
      MOVE SPACES TO ANS-X.
      CALL ADA USING 01, ANS-X, "A", 0, 07, 26,
                  ACC-RETURN, 03336, 03336.
      EVALUATE TRUE
         WHEN ESCAPE-KEY
            MOVE NON TO PASSWORD-FLAG
         WHEN C-RETURN
            MOVE YES TO PASSWORD-FLAG
         WHEN OTHER
            GO TO 800-CONTINUE-LOOP
      END-EVALUATE.
```

```
        CLOSE WINDOW WINDOW-5-SAVE-AREA.
 800-CONTINUE-EXIT.
     EXIT.
*
 COPY "fldctrl"  OF "prcopy".
*
********************************************************************
* 900      READ/WRITE/DELETE/REWRITE   FILE I/O STATEMENT           *
********************************************************************
*
 COPY "readci"   OF "prcopy".
 COPY "readls"   OF "prcopy".
 COPY "readca"   OF "prcopy".
 COPY "readcf"   OF "prcopy".
 COPY "reritecf" OF "prcopy".
 COPY "nextlc"   OF "prcopy".
 COPY "nextls"   OF "prcopy".
 COPY "strtlca1" OF "prcopy".
 COPY "prevls"   OF "prcopy".
     IF ERR-SW = YES
        PERFORM 998-BLANK-LINE24.
*
 COPY "errdisp" OF "prcopy".
*
********************************************************************
* 1000       OPEN/SETUP/EOJ/CLOSE ROUTINES.                         *
********************************************************************
*
 1000-OPEN-FILES.
     MOVE SPACES TO ERROR-SW.
     OPEN INPUT CA-FILE, CI-FILE, LC-FILE, LS-FILE.
     OPEN I-O CF-FILE.
     IF ERROR-SW NOT= SPACES
       MOVE "mlmnt18" TO DS-PROGRAM
       MOVE "1000-OPEN-FILES" TO DS-PARAGRAPH
       MOVE "File open Error" TO DS-MESSAGE
       MOVE FILESTAT TO DS-FILE-STAT
       CALL "disaster" USING DISASTER.
 1000-EXIT.
     EXIT.
*
 1200-INITIAL-SETUP.
     INITIALIZE LINE23-MSG, LINE24-MSG, CRITERIA-TO-CHANGE.

ACCEPT YMD-DATE FROM DATE.
     MOVE YMD-YY TO MDY-YY.
     MOVE YMD-MM TO MDY-MM.
     MOVE YMD-DD TO MDY-DD.
     MOVE MDY-DATE TO GREG-DATE.
```

```
        MOVE "G" TO DATE-CONVERT-SW.
        CALL DATECONV USING GREG-DATE STRD-DATE DATE-CONVERT-SW.

MOVE 1 TO CI-KEY.
        PERFORM 900-READ-CI-FILE.
        IF RECORD-NOT-FOUND
           MOVE "mlmnt18" TO DS-PROGRAM
           MOVE "1200-INIT-SETUP" TO DS-PARAGRAPH
           MOVE ZERO TO DS-FILE-STAT
           MOVE "Mlinst.Dat" TO DS-FILE-NAME
           MOVE "Installed Parameters Not Found" TO DS-MESSAGE
           CALL "disaster" USING DISASTER.

*Find last Session
        MOVE HIGH-VALUES TO LS-SESSION.
        START LS-FILE KEY < LS-SESSION
           INVALID KEY MOVE LOW-VALUES TO LS-SESSION.
        PERFORM 900-READ-NEXT-LS-FILE
        IF RECORD-NOT-FOUND
           MOVE ZERO TO LS-SESSION-WK
        ELSE
           MOVE LS-SESSION TO LS-SESSION-WK.

* Load call criteria into work array.
        INITIALIZE CALL-CRITERIA-ARRAY.
        PERFORM VARYING SUB FROM 1 BY 1 UNTIL SUB > 39
           MOVE SUB TO CA-KEY
           PERFORM 900-READ-CA-FILE
           IF RECORD-FOUND
              MOVE CA-DESCRIPTION TO CRIT-DESC(SUB)
           END-IF
        END-PERFORM.
  1200-EXIT.
        EXIT.
*
  1800-CLOSE-FILES.
        CLOSE WINDOW WINDOW-1-SAVE-AREA.
        CLOSE CA-FILE, CF-FILE, CI-FILE, LC-FILE, LS-FILE.
  1800-EXIT.
        EXIT.
*
 *******************************************************************
 *  2000   DATA ENTRY SCREEN                                       *
 *******************************************************************
*
  2000-DISP-DATA.
        DISPLAY OMITTED ERASE SCREEN.
        DISPLAY
           LINE SIZE 72         LINE 04 POS 02 COLOR BLACK-BAR
           "Criteria:"          LINE 02 POS 21 COLOR PROMPT-COLOR
```

```
            "Response Key"         LINE 03 POS 02 COLOR PROMPT-COLOR
            "#  Description"       LINE 03 POS 21 COLOR PROMPT-COLOR
            "New Value (*/S/ )"    LINE 03 POS 50 COLOR PROMPT-COLOR
            /"1"/                  LINE 06 POS 06 COLOR PROMPT-COLOR
            /"2"/                  LINE 07 POS 06 COLOR PROMPT-COLOR
            /"3"/                  LINE 08 POS 06 COLOR PROMPT-COLOR
            /"4"/                  LINE 09 POS 06 COLOR PROMPT-COLOR
            /"5"/                  LINE 10 POS 06 COLOR PROMPT-COLOR
            /"6"/                  LINE 11 POS 06 COLOR PROMPT-COLOR
            /"7"/                  LINE 12 POS 06 COLOR PROMPT-COLOR
            /"8"/                  LINE 13 POS 06 COLOR PROMPT-COLOR
            /"9"/                  LINE 14 POS 06 COLOR PROMPT-COLOR
            /"0"/                  LINE 15 POS 06 COLOR PROMPT-COLOR
            "F1-Display Sessions, F2-Save Changes, Esc-Exit."
                                   LINE 19 POS 02 COLOR INSTRUCTION-COLOR.
       MOVE 1 TO CRT-START-FIELD.
       MOVE ZERO TO CRT-ERR-FIELD.
       MOVE 999  TO ACC-RETURN.
       PERFORM 2100-ACCEPT-DATA THRU 2100-EXIT.
       MOVE ZERO TO ACC-RETURN.
   2000-EXIT.
       EXIT.
  *
   2100-ACCEPT-DATA.
       MOVE SPACES TO EXIT-SCREEN-SW.
       MOVE 20 TO CRT-FIELDS.
       MOVE CRT-START-FIELD TO CRT-CURR-FIELD.
       IF CRT-ERR-FIELD NOT= ZERO
          MOVE CRT-ERR-FIELD TO CRT-CURR-FIELD.
       PERFORM 999-DISP-ERROR.
  *
   2100-ACCEPT-LOOP.
       IF CRT-CURR-FIELD = 1
          CALL ADA USING 02, CRITERION-NUMBER (1), "N", 0, 06, 20,
                     ACC-RETURN, ACC-COLOR, DISP-COLOR
          PERFORM 800-DISPLAY-CRITERION-NAME THRU 800-DISPLAY-EXIT
          PERFORM 890-FIELD-CONTROL.
       IF CRT-CURR-FIELD = 2
          CALL ADA USING 02, CRITERION-VALUE (1), "N", 0, 06, 54,
                     ACC-RETURN, ACC-COLOR, DISP-COLOR
          PERFORM 890-FIELD-CONTROL.
       IF CRT-CURR-FIELD = 3
          CALL ADA USING 02, CRITERION-NUMBER (2), "N", 0, 07, 20,
                     ACC-RETURN, ACC-COLOR, DISP-COLOR
          PERFORM 800-DISPLAY-CRITERION-NAME THRU 800-DISPLAY-EXIT
          PERFORM 890-FIELD-CONTROL.
       IF CRT-CURR-FIELD = 4
          CALL ADA USING 02, CRITERION-VALUE (2), "N", 0, 07, 54,
                     ACC-RETURN, ACC-COLOR, DISP-COLOR
          PERFORM 890-FIELD-CONTROL.
```

```
IF CRT-CURR-FIELD = 5
   CALL ADA USING 02, CRITERION-NUMBER (3), "N", 0, 08, 20,
               ACC-RETURN, ACC-COLOR, DISP-COLOR
   PERFORM 800-DISPLAY-CRITERION-NAME THRU 800-DISPLAY-EXIT
   PERFORM 890-FIELD-CONTROL.
IF CRT-CURR-FIELD = 6
   CALL ADA USING 02, CRITERION-VALUE (3), "N", 0, 08, 54,
               ACC-RETURN, ACC-COLOR, DISP-COLOR
   PERFORM 890-FIELD-CONTROL.
IF CRT-CURR-FIELD = 7
   CALL ADA USING 02, CRITERION-NUMBER (4), "N", 0, 09, 20,
               ACC-RETURN, ACC-COLOR, DISP-COLOR
   PERFORM 800-DISPLAY-CRITERION-NAME THRU 800-DISPLAY-EXIT
   PERFORM 890-FIELD-CONTROL.
IF CRT-CURR-FIELD = 8
   CALL ADA USING 02, CRITERION-VALUE (4), "N", 0, 09, 54,
               ACC-RETURN, ACC-COLOR, DISP-COLOR
   PERFORM 890-FIELD-CONTROL.
IF CRT-CURR-FIELD = 9
   CALL ADA USING 02, CRITERION-NUMBER (5), "N", 0, 10, 20,
               ACC-RETURN, ACC-COLOR, DISP-COLOR
   PERFORM 800-DISPLAY-CRITERION-NAME THRU 800-DISPLAY-EXIT
   PERFORM 890-FIELD-CONTROL.
IF CRT-CURR-FIELD = 10
   CALL ADA USING 02, CRITERION-VALUE (5), "N", 0, 10, 54,
               ACC-RETURN, ACC-COLOR, DISP-COLOR
   PERFORM 890-FIELD-CONTROL.
IF CRT-CURR-FIELD = 11
   CALL ADA USING 02, CRITERION-NUMBER (6), "N", 0, 11, 20,
               ACC-RETURN, ACC-COLOR, DISP-COLOR
   PERFORM 800-DISPLAY-CRITERION-NAME THRU 800-DISPLAY-EXIT
   PERFORM 890-FIELD-CONTROL.
IF CRT-CURR-FIELD = 12
   CALL ADA USING 02, CRITERION-VALUE (6), "N", 0, 11, 54,
               ACC-RETURN, ACC-COLOR, DISP-COLOR
   PERFORM 890-FIELD-CONTROL.
IF CRT-CURR-FIELD = 13
   CALL ADA USING 02, CRITERION-NUMBER (7), "N", 0, 12, 20,
               ACC-RETURN, ACC-COLOR, DISP-COLOR
   PERFORM 800-DISPLAY-CRITERION-NAME THRU 800-DISPLAY-EXIT
   PERFORM 890-FIELD-CONTROL.
IF CRT-CURR-FIELD = 14
   CALL ADA USING 02, CRITERION-VALUE (7), "N", 0, 12, 54,
               ACC-RETURN, ACC-COLOR, DISP-COLOR
   PERFORM 890-FIELD-CONTROL.
IF CRT-CURR-FIELD = 15
   CALL ADA USING 02, CRITERION-NUMBER (8), "N", 0, 13, 20,
               ACC-RETURN, ACC-COLOR, DISP-COLOR
   PERFORM 800-DISPLAY-CRITERION-NAME THRU 800-DISPLAY-EXIT
   PERFORM 890-FIELD-CONTROL.
```

```
        IF CRT-CURR-FIELD = 16
           CALL ADA USING 02, CRITERION-VALUE (8), "N", 0, 13, 54,
                   ACC-RETURN, ACC-COLOR, DISP-COLOR
           PERFORM 890-FIELD-CONTROL.
        IF CRT-CURR-FIELD = 17
           CALL ADA USING 02, CRITERION-NUMBER (9), "N", 0, 14, 20,
                   ACC-RETURN, ACC-COLOR, DISP-COLOR
           PERFORM 800-DISPLAY-CRITERION-NAME THRU 800-DISPLAY-EXIT
           PERFORM 890-FIELD-CONTROL.
        IF CRT-CURR-FIELD = 18
           CALL ADA USING 02, CRITERION-VALUE (9), "N", 0, 14, 54,
                   ACC-RETURN, ACC-COLOR, DISP-COLOR
           PERFORM 890-FIELD-CONTROL.
        IF CRT-CURR-FIELD = 19
           CALL ADA USING 02, CRITERION-NUMBER (10), "N", 0, 15, 20,
                   ACC-RETURN, ACC-COLOR, DISP-COLOR
           PERFORM 800-DISPLAY-CRITERION-NAME THRU 800-DISPLAY-EXIT
           PERFORM 890-FIELD-CONTROL.
        IF CRT-CURR-FIELD = 20
           CALL ADA USING 02, CRITERION-VALUE (10), "N", 0, 15, 54,
                   ACC-RETURN, ACC-COLOR, DISP-COLOR
           PERFORM 890-FIELD-CONTROL.

IF NOT EXIT-SCREEN AND NOT JUST-DISPLAY
           GO TO 2100-ACCEPT-LOOP.
    2100-EXIT.
        EXIT.
   *
    2500-VALIDATE-SCREEN1.
        MOVE YES TO THERE-ARE-SCREEN-ERRORS-SW.
        MOVE SPACES TO LINE24-MSG
        MOVE YES TO ERROR-SW.

PERFORM VARYING SUB FROM 1 BY 1 UNTIL SUB > 10
           IF CRITERION-NUMBER (SUB) NOT= ZERO
             MOVE NON TO ERROR-SW
           END-IF
           IF CRITERION-NUMBER (SUB) > 39
              MOVE "36THE VALID CRITERION ARE FROM 1 TO 39"
                 TO LINE24-MSGA
              COMPUTE CRT-ERR-FIELD = (SUB * 2) - 1
              GO TO 2500-EXIT
           END-IF
           IF CRITERION-VALUE (SUB) NOT= "*" AND NOT= "S" AND NOT=" "
              MOVE '38THE VALID VALUES ARE "*", "S", AND " "'
                 TO LINE24-MSGA
              COMPUTE CRT-ERR-FIELD = (SUB * 2)
              GO TO 2500-EXIT
           END-IF
        END-PERFORM.
```

```
       IF ERROR-SW = YES
          MOVE "31THERE ARE NO CHANGES TO BE MADE" TO LINE24-MSGA
          MOVE 1 TO CRT-ERR-FIELD
       ELSE
          MOVE NON TO THERE-ARE-SCREEN-ERRORS-SW.

2500-EXIT.
       EXIT.
```

RECORD LAYOUTS

FDCOPY:
```
    * ALARM FILE
      FD AL-FILE
          LABEL RECORDS ARE OMITTED
          RECORD CONTAINS 98 CHARACTERS
          DATA RECORD IS AL-RECORD.
    *
      01 AL-RECORD.
          03  AL-KEY            PIC 9(3).
          03  AL-DESCRIPTION    PIC X(30).
          03  AL-MESSAGE        PIC 9(3).
          03  AL-STATUS         PIC X.
              88 AL-CLEAR       VALUE SPACES.
          03  AL-STAT-DATE      PIC 9(7).
          03  AL-STAT-TIME      PIC 9(4).
          03  AL-BOX-ARRAY.
              05 AL-BOX         PIC 9(5) OCCURS 10 TIMES.

* ALARM MESSAGE FILE
      FD AM-FILE
          LABEL RECORDS ARE OMITTED
          RECORD CONTAINS 101 CHARACTERS
          DATA RECORD IS AM-RECORD.
    *
      01 AM-RECORD.
          03  AM-KEY            PIC 9(3).
          03  AM-DESCRIPTION    PIC X(30).
          03  AM-OFFSET         PIC 9(7) COMP-N.
          03  AM-VALID-MESSAGE  PIC X.
          03  AM-MESSAGE-FILE   PIC X(30).
          03  FILLER            PIC X(30).

FD AG-FILE
          LABEL RECORDS ARE OMITTED
          RECORD CONTAINS 150 CHARACTERS
          DATA RECORD IS AG-RECORD.

01 AG-RECORD             PIC X(150).

FD CL-FILE
          LABEL RECORDS ARE OMITTED
          RECORD CONTAINS 1980 CHARACTERS
          DATA RECORD IS CL-REC.
    *
      01 CL-REC.
          03  CL-CALL-CONFIG                PIC X(1980).
```

```
        * CALLING DATABASE FILE
          FD  CF-FILE
              LABEL RECORDS ARE OMITTED
              RECORD CONTAINS 311 CHARACTERS
              DATA RECORD IS CF-RECORD.
        *
          01  CF-RECORD.
KEY           03  CF-KEY.
                  05  CF-STATE              PIC XX.
                  05  CF-COUNTY             PIC 9(3).
                  05  CF-SEQUENCE           PIC 9(7).
        * DO NOT ADD ANY RECORD TYPE THAT ARE LESS THEN "^L"
        * IT WILL SCREW UP RANGES ON CF-KEY.
        * TYPE "^L"  LIST
              03  CF-LIST-KEY REDEFINES CF-KEY.
                  05  CF-LIST-RECORD        PIC XX.
                  05  CF-LIST-NUMBER        PIC 9(3).
                  05  CF-LIST-SEQUENCE      PIC 9(7).

* TYPE "^O" OK
              03  CF-OK-KEY REDEFINES CF-KEY.
                  05  CF-OK-RECORD          PIC XX.
                  05  CF-OK-SEQUENCE        PIC 9(7).
                  05  FILLER                PIC X(3).

* TYPE "^R" RESPONDER
              03  CF-RESP-KEY REDEFINES CF-KEY.
                  05  CF-RESP-RECORD        PIC XX.
                  05  CF-RESP-SEQUENCE      PIC 9(7).
                  05  FILLER                PIC X(3).

* ----------------------------------------------------------------
        * THE FOLLOWING FIELDS ARE MOSTLY COMMON TO ALL RECORD TYPES
        * ----------------------------------------------------------------
              03  CF-LAST-CALL.
                  05  CF-DATE               PIC S9(7) COMP-3.
                  05  CF-TIME               PIC 9(4).
                  05  CF-TIME-DISP REDEFINES CF-TIME.
                      07  CF-TIME-HRS       PIC 99.
                      07  CF-TIME-MINS      PIC 99.
                  05  FILLER                PIC 99.
              03  CF-LAST-CALL-STATUS       PIC 99 COMP-N.
              03  CF-CURRENT-STATUS         PIC X.
              03  CF-DAY-NIGHT-SCHED        PIC 99.
              03  CF-DTMF-LAST-RESPONSE     PIC 99 COMP-N.
ALT3          03  CF-PHONE-NUMBER           PIC 9(13).
              03  CF-BOX REDEFINES CF-PHONE-NUMBER.
                  05  CF-BOX-DEF            PIC X.
                  05  CF-BOX-NUMBER         PIC 9(5).
                  05  FILLER                PIC X(6).
```

```
            03  CF-PHONE REDEFINES CF-PHONE-NUMBER.
                05   FILLER                PIC 9(3).
                05   CF-AREA-CODE          PIC 9(3).
                05   CF-EXCHANGE           PIC 9(3).
                05   CF-LOCAL-NUMBER       PIC 9(4).
            03  CF-FAX-NUMBER              PIC 9(13).
            03  CF-FAX REDEFINES CF-FAX-NUMBER.
                05   FILLER                PIC 9(3).
                05   CF-FX-AREA-CODE       PIC 9(3).
                05   CF-FX-EXCHANGE        PIC 9(3).
                05   CF-FX-LOCAL-NUMBER    PIC 9(4).
            03  CF-ADDRESS.
ALT2            05   CF-NAME               PIC X(25).
                05   CF-ADDR1              PIC X(25).
                05   CF-ADDR2              PIC X(25).
                05   CF-CITY               PIC X(15).
                05   CF-ZIP                PIC 9(5).
                05   FILLER                PIC X(4).
            03  CF-CHANGE-ID               PIC X(5).
            03  CF-LAST-CHANGE-DATE        PIC S9(7) COMP-3.
            03  CF-DELIVERED-CHECK-SUM     PIC 9(3).
       *
       *
            03  CF-DATA                    PIC X(123).
       *
       * ------------------------------------------------------------
       * THE FOLLOWING FIELDS ARE "GEO" TYPE
       * ------------------------------------------------------------
            03  CF-GEO-DATA   REDEFINES CF-DATA.
       * RED IS THE HORIZONTAL COMPONENT - GIVES LONGITUDE - LEFT & RIGHT
       * GREEN IS THE VERTICAL COMPONENT - GIVES LATITUDE  - UP & DOWN
                05   CF-COORDINATES.
                   08   CF-LONG            PIC S999V9(6).
                   08   CF-LAT             PIC S999V9(6).
                05   CF-FLAGS              PIC X(99).
                05   CF-FLAG REDEFINES CF-FLAGS   PIC X OCCURS 99 TIMES.
                05   CF-DAY-PRIORITY       PIC 9.
                05   CF-NIGHT-PRIORITY     PIC 9.
                05   CF-UNLISTED           PIC X.
                05   CF-BUSINESS           PIC X.
       *
       * ------------------------------------------------------------
       * THE FOLLOWING FIELDS ARE "LIST" TYPE
       * ------------------------------------------------------------
            03  CF-LIST-DATA   REDEFINES CF-DATA.
                05 CF-LIST-STATE           PIC XX.
                05 CF-LIST-COMMENT1        PIC X(25).
                05 CF-LIST-COMMENT2        PIC X(25).
       *
       * ------------------------------------------------------------
```

```
* THE FOLLOWING FIELDS ARE "OK" TYPE
* ----------------------------------------------------------
*
   03  CF-OK-DATA   REDEFINES CF-DATA.
      05 CF-OK-COMMENT1              PIC X(25).
      05 CF-OK-COMMENT2              PIC X(25).
*
      05 CF-OK-PHONE1                PIC X(10).
      05 CF-OK-PHONE1-NUM REDEFINES  CF-OK-PHONE1.
         07 CF-OK-AREA-CODE1         PIC 999.
         07 CF-OK-EXCHANGE1          PIC 999.
         07 CF-OK-LOCAL1             PIC 9(4).
*
      05 CF-OK-PHONE2                PIC X(10).
      05 CF-OK-PHONE2-NUM REDEFINES  CF-OK-PHONE2.
         07 CF-OK-AREA-CODE2         PIC 999.
         07 CF-OK-EXCHANGE2          PIC 999.
         07 CF-OK-LOCAL2             PIC 9(4).
*
      05 CF-OK-TIME1                 PIC 9(4).
      05 CF-OK-TIME1-DISP REDEFINES  CF-OK-TIME1.
         07 CF-OK-TIME1-HRS          PIC 99.
         07 CF-OK-TIME1-MINS         PIC 99.
*
      05 CF-OK-TIME2                 PIC 9(4).
      05 CF-OK-TIME2-DISP REDEFINES  CF-OK-TIME2.
         07 CF-OK-TIME2-HRS          PIC 99.
         07 CF-OK-TIME2-MINS         PIC 99.
*
      05 CF-OK-TIME3                 PIC 9(4).
      05 CF-OK-TIME3-DISP REDEFINES  CF-OK-TIME3.
         07 CF-OK-TIME3-HRS          PIC 99.
         07 CF-OK-TIME3-MINS         PIC 99.
*
      05 CF-OK-RETRIES               PIC 9.
      05 CF-OK-ALARM                 PIC X.
      05 CF-OK-MESSAGE-NUMBER        PIC 9999.
      05 CF-OK-CALLED1               PIC X.
      05 CF-OK-CALLED2               PIC X.
      05 CF-OK-CALLED3               PIC X.
      05 CF-OK-STATE                 PIC XX.
*
* ----------------------------------------------------------
* THE FOLLOWING FIELDS ARE "RESPONDER" TYPE
* ----------------------------------------------------------
   03  CF-RESP-DATA REDEFINES CF-DATA.
      05   CF-RESP-FLAGS             PIC X(99).
      05   CF-RESP-FLAG REDEFINES CF-RESP-FLAGS
                                     PIC X OCCURS 99 TIMES.
*      " " Not applicale
```

```
*         "P" Primary Response
*         "S" secondary Response
    03    CF-RESP-ROTATION            PIC X.
*
    03    CF-RESP-AVAILABLE           PIC X.
*         " " Available
*         "I" Trying to Find
*         "A" Assigned
    03    CF-RESP-ACTIVE-SCENARIO     PIC 9(3).
    03    CF-RESP-ACTIVE-SESSION      PIC 9(5).
    03    CF-RESP-TIME                PIC 9(4).
    03    CF-RESP-DATE                PIC 9(7).
    03    CF-RESP-ARRIV               PIC 9(3).
* CALLING DATABASE LOG FILE
 FD   DL-FILE
      LABEL RECORDS ARE OMITTED
      RECORD CONTAINS 558 CHARACTERS
      DATA RECORD IS DL-RECORD.
*
 01   DL-RECORD.
    03    DL-DATE                     PIC S9(7) COMP-3.
    03    DL-TIME                     PIC 9(6).
    03    DL-PREVIOUS.
      05  FILLER                      PIC X(269).
      05  DL-PREVIOUS-CHANGE-ID       PIC X(5).
    03    DL-CURRENT.
      05  FILLER                      PIC X(269).
      05  DL-CURRENT-CHANGE-ID        PIC X(5).

* CALLING ATRIBUTES FILE
 FD   CA-FILE
      LABEL RECORDS ARE OMITTED
      RECORD CONTAINS 22 CHARACTERS
      DATA RECORD IS CA-RECORD.
*
 01   CA-RECORD.
    03    CA-KEY                      PIC 99.
    03    CA-DESCRIPTION              PIC X(20).

* PERSONAL-INFORMATION FILE
 FD   PI-FILE
      LABEL RECORDS ARE OMITTED
      RECORD CONTAINS 1512 CHARACTERS
      DATA RECORD IS PI-RECORD.
*
 01   PI-RECORD.
    03    PI-KEY                      PIC X(12).
    03    PI-INFO                     PIC X(1500).
```

```
        03  PI-ARRAY REDEFINES PI-INFO.
            05 PI-LINES         PIC X(75) OCCURS 20 TIMES.

*   KEY IS CF-KEY OF DATA IS TIED TO A m1data.dat record
    *   KEY IS "SMxxxxxxxxxx" when key is tied to System message
description
    * CALLING INSTALLATION PARAMETERS FILE
       FD  CI-FILE
           LABEL RECORDS ARE OMITTED
           RECORD CONTAINS 277 CHARACTERS
           DATA RECORD IS CI-RECORD.
    *
       01  CI-RECORD.
           03  CI-KEY                   PIC 99.
           03  CI-DATA.
               04  CI-INSTALLATION-NAME     PIC X(30).
               04  CI-SERIAL-NUMBER         PIC 9(6).
    * ZERO COORIDINATES FOR NORTH AMERICA SHOULD BE TAKE AT
    * LOWER RIGHT OF MAP i.e LOSTEST LONG AND LAT NUMBERS FOR REGION
               04  CI-ZERO-COORDINATES.
                   05 CI-ZERO-LONG         PIC S999V9(6).
                   05 CI-ZERO-LAT          PIC S999V9(6).
               04  CI-LONG-FACTOR           PIC S999V9(6).
               04  CI-LAT-FACTOR            PIC S999V9(6).
               04  CI-MAX-GRID-REFERENCE.
                   05 CI-MAX-RED-REF       PIC 99V99.
                   05 CI-MAX-GREEN-REF     PIC 99V99.
               04  CI-VALID-STATES          PIC X(10).
               04  CI-VALID-STATE REDEFINES CI-VALID-STATES PIC X(2)
                       OCCURS 5 TIMES.
               04  CI-DB-CHANGE-ID          PIC X(5).
               04  CI-LAST-SESSION          PIC 9(4).
               04  CI-LAST-SEQ              PIC 9(7).
               04  CI-CALL-RETRY-INTERVAL   PIC 9(2).
               04  CI-CHECK-DATE            PIC X.
               04  CI-SESSION-SUMMARY       PIC X.
               04  CI-VALIDATE-MESSAGES     PIC X.
               04  CI-CALL-LEVEL            PIC 9.
               04  CI-CALL-TRIES            PIC 99.
               04  CI-MAIN-PASSWORD         PIC X(7).
               04  CI-CALL-PASSWORD         PIC X(7).
               04  CI-ADMINISTRATORS-PASSWORD PIC X(7).
               04  CI-PASSWORD OCCURS 10 TIMES PIC X(7).
               04  CI-FIRST-SCREEN          PIC X.
               04  CI-LAST-LOG-DATE         PIC S9(7) COMP-3.
               04  CI-OK-RETRIES            PIC 99.
               04  CI-OK-INTERVAL           PIC 99.
               04  CI-OK-FLAG               PIC X.
               04  filler                   PIC X.
               04  CI-OK-LEAD-MSG           PIC 9(4).
```

```
              04  CI-SYS-PHONE-NO           PIC X(7).
              04  CI-MULTI-PLAY-NO          PIC 9.
              04  CI-JANITOR-TIME           PIC 9(4).
              04  CI-LAST-JANITOR-DATE      PIC S9(7) COMP-3.
              04  CI-REC-SYS-MSG-PASSCODE   PIC X(10).
              04  filler                    PIC X(29).
          03 CI-HELP-DATA REDEFINES CI-DATA.
              04  CI-HELP-LINE     OCCURS 7 TIMES PIC X(27).
              04  FILLER                    PIC X(86).
      *  NUMBERED LIST HEADER FILE
          FD  LT-FILE
              LABEL RECORDS ARE OMITTED
              RECORD CONTAINS 28 CHARACTERS
              DATA RECORD IS LT-RECORD.
      *
          01  LT-RECORD.
              03  LT-KEY                    PIC 999.
              03  LT-DESCRIPTION            PIC X(20).
              03  LT-PRIORITY               PIC 9.
              03  LT-MESSAGE-NUMBER         PIC 9(4).

*  Call Log File
          FD  LC-FILE
              LABEL RECORDS ARE OMITTED
              RECORD CONTAINS 76 CHARACTERS
              DATA RECORD IS LC-RECORD.
      *
          01  LC-RECORD.
ALT1          03  LC-KEY2.
                  05  LC-SESSION            PIC 9(4).
KEY               05  LC-SEQ                PIC 9(7).
ALT 2         03  LC-PRIORITY-KEY.
                  05  LC-STATUS             PIC X.
      *   Status " " = in Queue
      *          "Q" = Ready to be Queued
      *          "C" = Cancelled after Queued
      *          "R" = Resolved after Queued
      *          "S" = Suspend
      *          "N" = Canceled before Queued
      *          "O" = RUOK CALL
                  05  LC-PRIORITY           PIC 9.
      *   Priority 1 = Highest 9 = Lowest 03  LC-INCHAN-SW              PIC X.
              03  LC-ADDRESS-KEY            PIC X(12).
              03  LC-PHONE-NUMBER           PIC X(13).
      *           05  LC-PHONE-AREA-CODE    PIC 9(3).
      *           05  LC-PHONE-EXCHANGE     PIC 9(3).
      *           05  LC-PHONE-SUFFIX       PIC 9(4).
              03  LC-SCHEDULE               PIC 9.
```

```
            03 LC-MESSAGE                  PIC 9999.
            03 LC-OFFSET                   PIC 9(8) COMP-N.
      * FROM DAEMON RECORD
            03 LC-TRIES                    PIC 99.
            03 LC-LAST-TERM                PIC 99.
            03 LC-LAST-DTMF                PIC 99.
            03 LC-LAST-STATUS REDEFINES LC-LAST-DTMF PIC XX.
            03 LC-QUED.
               05 LC-QUED-DATE             PIC 9(7) COMP-3.
               05 LC-QUED-TIME             PIC 9(4).
            03 LC-DELIVERED.
               05 LC-DELIVERED-DATE        PIC 9(7) COMP-3.
               05 LC-DELIVERED-TIME        PIC 9(4).

FD  LS-FILE
            LABEL RECORDS ARE OMITTED
            RECORD CONTAINS 2196 CHARACTERS
            DATA RECORD IS LS-RECORD.
        *
        01  LS-RECORD.
alt         03 LS-KEY2.
               05 LS-STATUS                PIC X.
      * Status " " = in Que
      *        "Q" = Ready to be Queued
      *        "C" = Cancelled after Queued
      *        "R" = Resolved after queued
      *        "S" = Suspend
      *        "N" = Canceled before queued
      *        "W" = Waiting for Cancel, state between " " in que and "C".
key            05 LS-SESSION               PIC 9(4).
            03 LS-DATE                     PIC 9(7).
            03 LS-TIME                     PIC 9(8).
            03 LS-ZONES                    PIC X(1980).
            03 LS-STATS                    PIC X(192).
            03 LS-CALLING-LEVEL            PIC 9.
            03 LS-RETRIES                  PIC 9(3).

* Menu Line File
        FD  ML-FILE
            LABEL RECORDS ARE OMITTED
            RECORD CONTAINS 81 CHARACTERS
            DATA RECORD IS ML-RECORD.
        *
        01  ML-RECORD.
            03  ML-KEY                     PIC 9(3).
      *     Key settings 1 to MAX-CHAN are reserved as entry points for menu.
            03  ML-DESCRIPTION             PIC X(30).
            03  ML-DEFAULT-MESSAGE         PIC 9(4).
            03  ML-OPTIONS-ONLY-MESSAGE    PIC 9(4).
```

```
       03  ML-ARRAY.
           05  ML-DTMF OCCURS 8 TIMES.
               07  ML-ACTION-CODE      PIC X.
*          S=Sysmsg#, M=MenuLine, H=Hangup, B=Box, R=Record Sys Msg
*          N=No-Op
               07  ML-MENU-MSG-NUMBER  PIC 9(4).
*    By Default # = Exit To First level
*                0 = Exit to Previous Selections
*                9 = Play Current Message Again

* MAILBOX FILE
 FD  BX-FILE
     LABEL RECORDS ARE OMITTED
     RECORD CONTAINS 629 CHARACTERS
     DATA RECORD IS BX-RECORD.
*
 01  BX-RECORD.
     03  BX-KEY              PIC 9(5).
     03  BX-NAME             PIC X(30).
     03  BX-NAME-OFFSET      PIC 9(9).
     03  BX-PHONE-NUMBERS.
         05 BX-PHONE         PIC 9(10) OCCURS 4 TIMES.
         05 BX-PHONE-TYPE    PIC 9(10) OCCURS 4 TIMES.
     03 BX-PHONES REDEFINES BX-PHONE-NUMBERS.
         05 BX-AREA          PIC 999   OCCURS 4 TIMES.
         05 BX-EXCHANGE      PIC 999   OCCURS 4 TIMES.
         05 BX-LOCAL         PIC 9(4)  OCCURS 4 TIMES.
         05 BX-TYPE          PIC 9(10) OCCURS 4 TIMES.
     03  BX-MENU-NUMBER      PIC 9(5).
     03  FILLER              PIC X(500).
* CALLING MESSAGE HEADER RECORD FILE
 FD  CH-FILE
     LABEL RECORDS ARE OMITTED
     RECORD CONTAINS 64 CHARACTERS
     DATA RECORD IS CH-RECORD.
*
 01  CH-RECORD.
     03  CH-KEY                  PIC 9(4).
     03  CH-PUBLISHED-NUMBER     PIC 9(4).
     03  CH-EXPIRATION-DATE      PIC S9(7) COMP-3.
     03  CH-DESCRIPTION          PIC X(30).
     03  CH-DATE                 PIC 9(7).
     03  CH-TIME                 PIC 9(8).
     03  CH-SECONDS              PIC 9(3)V99.
     03  CH-VALID-MESSAGE-SW     PIC X.
     03  CH-REQUIRED-RESPONSE-SW PIC X.

* Tiger States/County File
 FD  PF-FILE
     LABEL RECORDS ARE OMITTED
```

```
          RECORD CONTAINS 55 CHARACTERS
          DATA RECORD IS PF-RECORD.
*
 01   PF-RECORD.
      03   PF-KEY1.
           05 PF-AREA-CODE         PIC 9(3).
           05 PF-EXCHANGE          PIC 9(3).
      03   PF-KEY1-X REDEFINES PF-KEY1 PIC 9(6).
      03   PF-LONG-DISTANCE-SW    PIC X.
           88 PF-LONG-DISTANCE    VALUE "Y".
      03   PF-INCLUDE-AREA-CODE   PIC X.
      03   PF-CENTRIX             PIC X.
      03   PF-FILLER              PIC X(9).

* M1PURG01 EXECUTION LOGGING FILE
 FD   PL-FILE
      LABEL RECORDS ARE OMITTED
      RECORD CONTAINS 21 CHARACTERS
      DATA RECORD IS PL-RECORD.
*
 01   PL-RECORD.
      03   PL-DATE                PIC S9(7) COMP-3.
      03   PL-TIME.
        05   PL-HOUR              PIC 9(02).
        05   PL-MINUTE            PIC 9(02).
      03   PL-STATUS              PIC X(01).
      03   PL-FROM-DATE           PIC S9(07) COMP-3.
      03   PL-TO-DATE             PIC S9(07) COMP-3.
      03   PL-RECORDS-DELETED     PIC S9(07) COMP-3.

* PL-DATE is in integer format. (from A.D.)
* PL-TIME is in military format.
* PL-STATUS is either "S"tarted or "C"ompleted.
* PL-FROM-DATE is in integer format.
* PL-TO-DATE is in integer format.
* PL-RECORDS-DELETED is the deletion count.

* SELECTION STATISTICS SUMMARY REPORTING FILE
 FD   RL-SUMM-FILE
      LABEL RECORDS ARE OMITTED
      RECORD CONTAINS 81 CHARACTERS
      DATA RECORD IS RL-SUMM-RECORD.
*
 01   RL-SUMM-RECORD.
      03   RL-SUMM-DATE           PIC S9(07) COMP-3.
      03   RL-SUMM-KEY.
        05 RL-SUMM-ACTION-CODE       PIC X(01).
        05 RL-SUMM-ACTION-CODE-MSG   PIC 9(04).
      03   RL-SUMM-HOURLY-COUNT  OCCURS 24 PIC S9(05) COMP-3.
```

```
      * RL-DATE is in integer format. (from A.D.)
      * RL-ACTION-CODE       (refer to the menu line file, M1MENULN,)
      * RL-ACTION-CODE-MSG (for further information on these.      )
      * RL-TIME is in military format.

* ROTATION SCHEDULE FILE
        FD  RT-FILE
            LABEL RECORDS ARE OMITTED
            RECORD CONTAINS 231 CHARACTERS
            DATA RECORD IS RT-RECORD.
      *
        01  RT-RECORD.
            03  RT-KEY              PIC X.
            03  RT-DESCRIPTION      PIC X(30).
            03  RT-TIME-ARRAY.
                05  RT-START        PIC 9(5) OCCURS 20 TIMES.
                05  RT-END          PIC 9(5) OCCURS 20 TIMES.

* ROSTER POSITION FILE
        FD  RP-FILE
            LABEL RECORDS ARE OMITTED
            RECORD CONTAINS 283 CHARACTERS
            DATA RECORD IS RP-RECORD.
      *
        01  RP-RECORD.
            03  RP-KEY              PIC 9(3).
            03  RP-DESCRIPTION      PIC X(30).
            03  RP-NARRATIVE.
                05  RP-NARRATIVE-LINES  PIC X(50) OCCURS 5 TIMES.
      * SCENARIO FILE
        FD  SC-FILE
            LABEL RECORDS ARE OMITTED
            RECORD CONTAINS 2736 CHARACTERS
            DATA RECORD IS SC-RECORD.
      *
        01  SC-RECORD.
KEY         03  SC-KEY              PIC 9(3).
            03  SC-DESCRIPTION      PIC X(30).
ALT 1       03  SC-SESSION          PIC 9(4).
            03  SC-MAINTAINER       PIC X(7).
      *
            03  SC-STAGE-INTERVAL   PIC 9(3).
            03  SC-OB-PERCENT       PIC 99.
            03  SC-MESSAGE-NUMBER   PIC 9(5).
      *
            03  SC-ACTIVATION-STATUS    PIC X.
            03  SC-ACTIVATION-DATE      PIC 9(4).
            03  SC-ACTIVATION-TIME      PIC 9(4).
      *
            03  SC-DEFINITION-ARRAY.
```

```
       05 SC-DEF-X    OCCURS 99 TIMES.
          08 SC-DEF-TYPE               PIC X.
*                     1 = POSITION
*                     2 = LIST TO CALL.
*                     3 = GEO ZONE TO CALL.

08 SC-DEF-MESSAGE-NUMBER     PIC 9(5).
          08 SC-CALL-TYPE              PIC X.
*                     S = STATION-TO-STATION.
*                     P = PERSON-TO-PERSON.
*                     F = FAX TO STATION.
          08 SC-TRANSACTION-TYPE       PIC X.
*                     C = CALL-IN
*                    " "= NONE
          08 SC-POSITION-NUMBER        PIC 9(3).
          08 SC-POSITION-QTY           PIC 9(3).
          08 SC-POSITION-QTY-FILLED    PIC 9(3).
          08 SC-LIST                   PIC 9(3).
          08 SC-ZONE                   PIC 9(3).
          08 FILLER                    PIC X(4).
* CALLING SCHEDULE PARAMETERS FILE
  FD   CS-FILE
       LABEL RECORDS ARE OMITTED
       RECORD CONTAINS 40 CHARACTERS
       DATA RECORD IS CS-RECORD.
*
  01   CS-RECORD.
     03   CS-KEY                   PIC 99.
     03   CS-DESCRIPTION           PIC X(30).
     03   CS-DAYTIME-START         PIC 9(4).
     03   CS-DAYTIME REDEFINES CS-DAYTIME-START.
        05 CS-DAYTIME-HRS          PIC 9(2).
        05 CS-DAYTIME-MIN          PIC 9(2).
     03   CS-NIGHTTIME-START       PIC 9(4).
     03   CS-NIGHTTIME REDEFINES CS-NIGHTTIME-START.
        05 CS-NIGHTTIME-HRS        PIC 9(2).
        05 CS-NIGHTTIME-MIN        PIC 9(2).

* Tiger States/County File
  FD   ST-FILE
       LABEL RECORDS ARE OMITTED
       RECORD CONTAINS 55 CHARACTERS
       DATA RECORD IS ST-RECORD.
*
  01   ST-RECORD.
     03   ST-TIGER-KEY.
        05   ST-STATE-CODE     PIC 9(2).
        05   ST-COUNTY         PIC 9(3).
     03   ST-STATE-KEY.
```

```
        05  ST-STATE-PREFIX         PIC XX.
        05  ST-COUNTY2              PIC 9(3).
     03 ST-STATE-NAME               PIC X(15).
     03 ST-COUNTY-NAME              PIC X(30).

* SELECTION STATISTICS TRANSACTION LOGGING FILE
  FD  TL-FILE
      LABEL RECORDS ARE OMITTED
      RECORD CONTAINS 18 CHARACTERS
      DATA RECORD IS TL-RECORD.
*
  01  TL-RECORD.
     03  TL-DATE                    PIC S9(7) COMP-3.
     03  TL-TIME.
        05  TL-HOUR                 PIC 9(02).
        05  TL-MINUTE               PIC 9(02).
     03  TL-MENU-NO                 PIC 9(03).
     03  TL-TPAD-KEY                PIC X(01).
     03  TL-ACTION-CODE             PIC X(01).
     03  TL-ACTION-CODE-MSG         PIC 9(04).
     03  TL-POSTING-FLAG            PIC X(01).
        88  TL-IS-POSTED            VALUE "Y".

* TL-DATE is in integer format. (from A.D.)
* TL-TIME is in military format.
* TL-MENU-NO is the menu number.
* TL-TPAD-KEY is the touch-pad key pressed.
* TL-ACTION-CODE      (refer to the menu line file, M1MENULN,)
* TL-ACTION-CODE-MSG (for further information on these.      )
* TL-POSTING-FLAG "Y" signifies that an entry exists in the
*                     indexed reporting file, "M1tlogrp".

* SELECTION STATISTICS REPORTING FILE
  FD  RL-FILE
      LABEL RECORDS ARE OMITTED
      RECORD CONTAINS 82 CHARACTERS
      DATA RECORD IS RL-RECORD.
*
  01  RL-RECORD.
     03  RL-KEY.
        05  RL-DATE                 PIC S9(07) COMP-3.
        05  RL-ACTION-CODE          PIC X(01).
        05  RL-ACTION-CODE-MSG      PIC 9(04).
     03  RL-HOURLY-COUNT OCCURS 24  PIC S9(05) COMP-3.
     03  RL-PURGE-FLAG              PIC X(01).
        88  PURGE-THE-RL-ENTRY      VALUE "Y".

* RL-DATE is in integer format. (from A.D.)
* RL-ACTION-CODE      (refer to the menu line file, M1MENULN,)
* RL-ACTION-CODE-MSG (for further information on these.      )
```

```
* RL-TIME is in military format.
* RL-PURGE-FLAG "Y" signifies that it will not be copied to
*                  the new file when "clearing" this file.

* TRANSACTION FILE
 FD  TR-FILE
     LABEL RECORDS ARE OMITTED
     RECORD CONTAINS 116 CHARACTERS
     DATA RECORD IS TR-RECORD.
*
 01  TR-RECORD.
     03  TR-KEY                       PIC 9(7) COMP-3.
     03  TR-OFFSET                    PIC 9(8) COMP-3.
     03  TR-UPDATE                    PIC X.
     03  TR-TRANS-TYPE                PIC X COMP-N.
     03  TR-RETRIES                   PIC 9(2).
     03  TR-BADTRIES                  PIC 9(2).
     03  TR-TNUM-X.
         05  TR-TNUM  OCCURS 38 TIMES PIC X.
     03  TR-LC-KEY.
         05  TR-LC-SESSION            PIC 9(4).
         05  TR-LC-SEQ                PIC 9(7).
     03  TR-SCHEDULE                  PIC 9.
     03  TR-DATA                      PIC X(50).

* Trans Types
* 1 = Record Message
* 2 = Warning
* 3 = RUOK 1

* Tr-Update
* " "  Call Hasn't Been Processed
* "I"  In Process
* "U"  Update Required, Call is Complete
* "P"  Purge the Record
* "S"  Suspended Call

* CALLING ZONE FILE
 FD  CZ-FILE
     LABEL RECORDS ARE OMITTED
     RECORD CONTAINS 170 CHARACTERS
     DATA RECORD IS CZ-RECORD.
*
 01  CZ-RECORD.
     03  CZ-KEY                       PIC 9(3).
     03  CZ-DESCRIPTION               PIC X(30).
* RED IS THE HORIZONTAL COMPONENT - GIVES LONGITUDE - LEFT & RIGHT
* GREEN IS THE VERTICAL COMPONENT - GIVES LATITUDE - UP & DOWN
     03  CZ-UPPER-LEFT-COORD.
         05  CZ-UL-RED                PIC 99V99.
```

```
        05  CZ-UL-GREEN              PIC 99V99.
    03  CZ-LOWER-RIGHT-COORD.
        05  CZ-LR-RED                PIC 99V99.
        05  CZ-LR-GREEN              PIC 99V99.
    03  CZ-FLAGS                     PIC X(99).
    03  CZ-FLAG REDEFINES CZ-FLAGS PIC X OCCURS 99 TIMES.
    03  CZ-INCLUDE-UNLISTED          PIC X.
    03  CZ-SELECTED-RECORDS          PIC 9(7).
    03  CZ-MESSAGE-NUMBER            PIC 9(4).
    03  CZ-PRIORITY                  PIC 9.
    03  FILLER                       PIC X(8).

* TRANSACTION FILE
 FD  NEW-TR-FILE
     LABEL RECORDS ARE OMITTED
     RECORD CONTAINS 116 CHARACTERS
     DATA RECORD IS NEW-TR-RECORD.
*
 01  NEW-TR-RECORD.
    03  NEW-TR-KEY                   PIC 9(7) COMP-3.
    03  NEW-TR-OFFSET                PIC 9(8) COMP-3.
    03  NEW-TR-UPDATE                PIC X.
    03  NEW-TR-TRANS-TYPE            PIC X COMP-N.
    03  NEW-TR-RETRIES               PIC 9(2).
    03  NEW-TR-BADTRIES              PIC 9(2).
    03  NEW-TR-TNUM-X.
        05  NEW-TR-TNUM  OCCURS 38 TIMES PIC X.
    03  NEW-TR-LC-KEY.
        05  NEW-TR-LC-SESSION        PIC 9(4).
        05  NEW-TR-LC-SEQ            PIC 9(7).
    03  NEW-TR-SCHEDULE              PIC 9.
    03  NEW-TR-DATA                  PIC X(50).

* Trans Types
* 1 = Record Message
* 2 = Warning
* 3 = RUOK 1

* Tr-Update
* " "  Call Hasn't Been Processed
* "I"  In Process
* "U"  Update Required, Call is Complete
* "P"  Purge the Record
* "S"  Suspended Call FD  PRINTER
     LABEL RECORDS ARE OMITTED
     RECORD CONTAINS 144 CHARACTERS
     DATA RECORD IS PRINTER-REC.
*
```

```
01  PRINTER-REC.
    03  PRINTER-80                  PIC X(80).
    03  FILLER                      PIC X(64).

PRCOPY:
    DECLARATIVES.
    EXTEND-ERROR-SECTION SECTION.
        USE AFTER ERROR PROCEDURE ON EXTEND.
    EXTEND-ERROR-S.
        MOVE FILESTAT TO DISASTER-CODE.
        MOVE 1 TO ERROR-SW.
    I-O-ERROR-SECTION SECTION.
        USE AFTER ERROR PROCEDURE ON I-O.
    I-O-ERROR-S.
        MOVE FILESTAT TO DISASTER-CODE.
        MOVE 1 TO ERROR-SW.
    INPUT-ERROR-SECTION SECTION.
        USE AFTER ERROR PROCEDURE ON INPUT.
    INPUT-ERROR-S.
        MOVE FILESTAT TO DISASTER-CODE.
        MOVE 1 TO ERROR-SW.
    OUTPUT-ERROR-SECTION SECTION.
        USE AFTER ERROR PROCEDURE ON OUTPUT.
    OUTPUT-ERROR-S.
        MOVE SPACES TO EXT-FILESTAT.
        CALL "C$RERR" USING EXT-FILESTAT.
        MOVE FILESTAT TO DISASTER-CODE.
        MOVE 1 TO ERROR-SW.
    END DECLARATIVES.
*
  996-SET-ERR-LINE.
      IF WINDOW1
          MOVE WINDOW-1-LINES TO ERR-WK.
      IF WINDOW2
          MOVE WINDOW-2-LINES TO ERR-WK.
      IF WINDOW3
          MOVE WINDOW-3-LINES TO ERR-WK.
      IF WINDOW4
          MOVE WINDOW-4-LINES TO ERR-WK.
      IF WINDOW5
          MOVE WINDOW-5-LINES TO ERR-WK.
*
  998-COMPLETION-WINDOW.
        IF NOT WRITE-ERROR
            DISPLAY WINDOW LINE 6 POS 3 SIZE 32 LINES 2
                COLOR 168 POP-UP IS COMP-WINDOW-SAVE-AREA
                BOXED SHADOW NO SCROLL NO WRAP
            DISPLAY COMPLETION-MSG LINE 1 POS 2 COLOR 168
                "Press Return" LINE 2 POS 2 COLOR ERROR-COLOR
```

```
            MOVE SPACES TO ANSWER
            CALL ADA USING 01 ANSWER "A" 0 02 14
                ACC-RETURN ERROR-COLOR ERROR-COLOR
            CLOSE WINDOW COMP-WINDOW-SAVE-AREA.
*
 998-BLANK-LINE24.
      PERFORM 996-SET-ERR-LINE.
      DISPLAY SPACES LINE ERR-WK POSITION 1
          SIZE 80.
      MOVE NON TO ERR-SW.
*
 998-DELETE-WINDOW.
           DISPLAY WINDOW LINE 6 POS 3 SIZE 35 LINES 2
               COLOR 168 POP-UP IS WINDOW-2-SAVE-AREA
               BOXED SHADOW NO WRAP NO SCROLL.
 998-RETRY.
           DISPLAY "Delete - Are You Sure?" LINE 1 POS 1 COLOR 168
                "Press Return to Delete, Esc-Exit" LINE 2 POS 1
                   COLOR ERROR-COLOR
       MOVE SPACES TO ANSWER
       CALL ADA USING 01 ANSWER "A" 0 02 33
           ACC-RETURN ERROR-COLOR ERROR-COLOR
       IF NOT C-RETURN AND NOT ESCAPE-KEY
           GO TO 998-RETRY.
       IF CR-RET
          MOVE YES TO ERR-SW
          CLOSE WINDOW WINDOW-2-SAVE-AREA.
       IF ESCAPE-KEY
          MOVE NON TO ERR-SW
          CLOSE WINDOW WINDOW-2-SAVE-AREA.
 998-EXIT.
      EXIT.
*
 999-DISP-ERROR.
      PERFORM 996-SET-ERR-LINE.
      DISPLAY SPACES LINE ERR-WK POSITION 1
          SIZE 70.
      IF LINE24-MSG NOT = SPACES
          DISPLAY LINE24-MSG BEEP LINE ERR-WK
              POSITION 1  COLOR ERROR-COLOR
              SIZE ERR-SIZE
          MOVE SPACES TO LINE24-MSGA
          MOVE YES TO ERR-SW
          MOVE 2 TO SLP-WAIT
          CALL "TIMED-DISPATCH"
             USING SLP-WAIT, SLP-COBOL-KEY, SLP-RETURN
          DISPLAY SPACES LINE ERR-WK POSITION 1 SIZE 80.
*
 890-FIELD-CONTROL.
      MOVE CRT-CURR-FIELD TO CRT-PRIOR-FIELD.
```

```
        ADD 1 TO CRT-CURR-FIELD.
        IF C-UP ADD -2 TO CRT-CURR-FIELD.
        IF (CRT-CURR-FIELD > CRT-FIELDS) OR
           (CRT-CURR-FIELD < CRT-START-FIELD)
           MOVE CRT-START-FIELD TO CRT-CURR-FIELD.
        IF (C-UP) AND (CRT-CURR-FIELD < CRT-START-FIELD)
           MOVE CRT-START-FIELD TO CRT-CURR-FIELD.
        MOVE NON TO EXIT-SCREEN-SW.
        IF C-TAB MOVE 0 TO CRT-CURR-FIELD.
        IF FKEY
           MOVE 0 TO CRT-CURR-FIELD
           MOVE YES TO EXIT-SCREEN-SW.
   890-EXIT.
        EXIT.
*

900-READ-NEXT-LC-FILE.

CALL "DISPATCH".

MOVE NON TO EOF-REACHED-SW.

IF USE-LOCKING

READ LC-FILE NEXT RECORD

AT END MOVE YES TO EOF-REACHED-SW

ELSE

READ LC-FILE NEXT RECORD WITH NO LOCK

AT END MOVE YES TO EOF-REACHED-SW.

MOVE "Y" TO USE-LOCKING-SW.

*

900-READ-NEXT-LS-FILE.

CALL "DISPATCH".

MOVE NON TO EOF-REACHED-SW.

IF USE-LOCKING
```

```
        READ LS-FILE NEXT RECORD
           AT END MOVE YES TO EOF-REACHED-SW
        ELSE
           READ LS-FILE NEXT RECORD WITH NO LOCK
              AT END MOVE YES TO EOF-REACHED-SW.
        MOVE "Y" TO USE-LOCKING-SW.

*
 900-READ-PREVIOUS-LS-FILE.
        CALL "DISPATCH".
        MOVE NON TO EOF-REACHED-SW.
        IF USE-LOCKING
           READ LS-FILE PREVIOUS RECORD
              AT END MOVE YES TO EOF-REACHED-SW
        ELSE
           READ LS-FILE PREVIOUS RECORD WITH NO LOCK
              AT END MOVE YES TO EOF-REACHED-SW.
        MOVE "Y" TO USE-LOCKING-SW.

*
 900-READ-CA-FILE.
        CALL "DISPATCH".
        MOVE YES TO RECORD-FOUND-SW.
        IF USE-LOCKING
           READ CA-FILE RECORD
```

```
        INVALID KEY MOVE NON TO RECORD-FOUND-SW
    ELSE
        READ CA-FILE RECORD WITH NO LOCK
            INVALID KEY MOVE NON TO RECORD-FOUND-SW.
    MOVE "Y" TO USE-LOCKING-SW.

*

900-READ-CF-FILE.

CALL "DISPATCH".

MOVE YES TO RECORD-FOUND-SW.

IF USE-LOCKING
        READ CF-FILE RECORD
            INVALID KEY MOVE NON TO RECORD-FOUND-SW
    ELSE
        READ CF-FILE RECORD WITH NO LOCK
            INVALID KEY MOVE NON TO RECORD-FOUND-SW.
    MOVE "Y" TO USE-LOCKING-SW.

*

900-READ-CI-FILE.

CALL "DISPATCH".

MOVE YES TO RECORD-FOUND-SW.

IF USE-LOCKING
        READ CI-FILE RECORD
            INVALID KEY MOVE NON TO RECORD-FOUND-SW
```

```
        ELSE
            READ CI-FILE RECORD WITH NO LOCK
                INVALID KEY MOVE NON TO RECORD-FOUND-SW.
        MOVE "Y" TO USE-LOCKING-SW.

*
    900-READ-LS-FILE.

CALL "DISPATCH".

MOVE YES TO RECORD-FOUND-SW.

IF USE-LOCKING
            READ LS-FILE RECORD
                INVALID KEY MOVE NON TO RECORD-FOUND-SW
        ELSE
            READ LS-FILE RECORD WITH NO LOCK
                INVALID KEY MOVE NON TO RECORD-FOUND-SW.
        MOVE "Y" TO USE-LOCKING-SW.

*
    900-REWRITE-CF-FILE.

CALL "DISPATCH".

MOVE NON TO KEY-ALREADY-ON-FILE-SW.

REWRITE CF-RECORD
            INVALID KEY MOVE YES TO KEY-ALREADY-ON-FILE-SW.

*
```

```
900-START-LC-FILE-ALTKEY1.

CALL "DISPATCH".

MOVE NON TO EOF-REACHED-SW.

START LC-FILE KEY >= LC-SESSION

INVALID KEY MOVE YES TO EOF-REACHED-SW.
```

SLCOPY:
```
        SELECT CF-FILE
                ASSIGN TO RANDOM "m1data.dat"
                ORGANIZATION IS INDEXED
                ACCESS MODE  IS DYNAMIC
                RECORD KEY   IS CF-KEY
                ALTERNATE KEY IS CF-NAME WITH DUPLICATES
                ALTERNATE KEY IS CF-PHONE-NUMBER WITH DUPLICATES
                FILE STATUS  IS FILESTAT.

SELECT CA-FILE
                ASSIGN TO RANDOM "m1flags.dat"
                ORGANIZATION IS INDEXED
                ACCESS MODE  IS DYNAMIC
                RECORD KEY   IS CA-KEY
                ALTERNATE RECORD IS CA-DESCRIPTION
                FILE STATUS  IS FILESTAT.

SELECT CI-FILE
                ASSIGN TO RANDOM "m1inst.dat"
                ORGANIZATION IS INDEXED
                ACCESS MODE  IS DYNAMIC
                RECORD KEY   IS CI-KEY
                FILE STATUS  IS FILESTAT.

SELECT LC-FILE
                ASSIGN TO RANDOM "m1logcl.dat"
                ORGANIZATION IS INDEXED
                ACCESS MODE  IS DYNAMIC
                RECORD KEY   IS LC-SEQ
                ALTERNATE KEY IS LC-KEY2
                ALTERNATE KEY IS LC-PRIORITY-KEY WITH DUPLICATES
                FILE STATUS  IS FILESTAT.
```

```
            SELECT LS-FILE
                    ASSIGN TO RANDOM "m1logses.dat"
                    ORGANIZATION IS INDEXED
                    ACCESS MODE  IS DYNAMIC
                    RECORD KEY   IS LS-SESSION
                    ALTERNATE KEY LS-KEY2
                    FILE STATUS  IS FILESTAT.

WSCOPY:
        *
        *      ACCEPT STATMENT VARIABLES
        *
             01  CRT-FIELDS          PIC S999 COMP-3.
             01  CRT-START-FIELD     PIC S999 COMP-3.
             01  CRT-CURR-FIELD      PIC S999 COMP-3.
             01  CRT-PRIOR-FIELD     PIC S999 COMP-3.
             01  CRT-ERR-FIELD       PIC S999 COMP-3.
             01  ADA                 PIC X(14) VALUE "ada.o".
             01  X                   PIC X     VALUE "X".
        *
             01  EXIT-SCREEN-SW      PIC X VALUE " ".
                88  EXIT-SCREEN            VALUE "Y".
        *
             01  CF-RECORD-WK.
KEY          03  CF-KEY-WK.
                  05  CF-STATE-WK           PIC XX.
                  05  CF-COUNTY-WK          PIC 9(3).
                  05  CF-SEQUENCE-WK        PIC 9(7).
        * DO NOT ADD ANY RECORD TYPE THAT ARE LESS THEN "^L"
        * IT WILL SCREW UP RANGES ON CF-KEY.
        * TYPE "^L"  LIST
             03  CF-LIST-KEY-WK REDEFINES CF-KEY-WK.
                  05  CF-LIST-RECORD-WK     PIC XX.
                  05  CF-LIST-NUMBER-WK     PIC 9(3).
                  05  CF-LIST-SEQUENCE-WK   PIC 9(7).

* TYPE "^O" OK
             03  CF-OK-KEY-WK REDEFINES CF-KEY-WK.
                  05  CF-OK-RECORD-WK       PIC XX.
                  05  CF-OK-SEQUENCE-WK     PIC 9(7).
                  05  FILLER-WK             PIC X(3).

* TYPE "^R" RESPONDER
             03  CF-RESP-KEY-WK REDEFINES CF-KEY-WK.
                  05  CF-RESP-RECORD-WK     PIC XX.
                  05  CF-RESP-SEQUENCE-WK   PIC 9(7).
                  05  FILLER                PIC X(3).

* -----------------------------------------------------------
```

```
       * THE FOLLOWING FIELDS ARE MOSTLY COMMON TO ALL RECORD TYPES
       * ---------------------------------------------------------------
             03   CF-LAST-CALL-WK.
                  05   CF-DATE-WK                PIC S9(7) COMP-3.
                  05   CF-TIME-WK                PIC 9(4).
                  05   CF-TIME-DISP-WK REDEFINES CF-TIME-WK.
                       07   CF-TIME-HRS-WK       PIC 99.
                       07   CF-TIME-MINS-WK      PIC 99.
                  05   FILLER                    PIC 99.
             03   CF-LAST-CALL-STATUS-WK         PIC 99 COMP-N.
             03   CF-CURRENT-STATUS-WK           PIC X.
             03   CF-DAY-NIGHT-SCHED-WK          PIC 99.
             03   CF-DTMF-LAST-RESPONSE-WK       PIC 99 COMP-N.
ALT3         03   CF-PHONE-NUMBER-WK             PIC 9(13).
             03   CF-BOX-WK REDEFINES CF-PHONE-NUMBER-WK.
                  05   CF-BOX-DEF-WK             PIC X.
                  05   CF-BOX-NUMBER-WK          PIC 9(5).
                  05   FILLER                    PIC X(6).
             03   CF-PHONE-WK REDEFINES CF-PHONE-NUMBER-WK.
                  05   FILLER                    PIC 9(3).
                  05   CF-AREA-CODE-WK           PIC 9(3).
                  05   CF-EXCHANGE-WK            PIC 9(3).
                  05   CF-LOCAL-NUMBER-WK        PIC 9(4).
             03   CF-FAX-NUMBER-WK               PIC 9(13).
             03   CF-FAX-WK REDEFINES CF-FAX-NUMBER-WK.
                  05   FILLER                    PIC 9(3).
                  05   CF-FX-AREA-CODE-WK        PIC 9(3).
                  05   CF-FX-EXCHANGE-WK         PIC 9(3).
                  05   CF-FX-LOCAL-NUMBER-WK     PIC 9(4).
             03   CF-ADDRESS-WK.
ALT2              05   CF-NAME-WK                PIC X(25).
                  05   CF-ADDR1-WK               PIC X(25).
                  05   CF-ADDR2-WK               PIC X(25).
                  05   CF-CITY-WK                PIC X(15).
                  05   CF-ZIP-WK                 PIC 9(5).
                  05   FILLER                    PIC X(4).
             03   CF-CHANGE-ID-WK                PIC X(5).
             03   CF-LAST-CHANGE-DATE-WK         PIC S9(7) COMP-3.
             03   CF-DELIVERED-CHECK-SUM-WK      PIC 9(3).
       *
       *
             03   CF-DATA-WK                     PIC X(123).
       *
       * ---------------------------------------------------------------
       * THE FOLLOWING FIELDS ARE "GEO" TYPE
       * ---------------------------------------------------------------
             03   CF-GEO-DATA-WK   REDEFINES CF-DATA-WK.
       * RED IS THE HORIZONTAL COMPONENT - GIVES LONGITUDE - LEFT & RIGHT
       * GREEN IS THE VERTICAL COMPONENT - GIVES LATITUDE  - UP & DOWN
                  05   CF-COORDINATES-WK.
```

```
       08   CF-LONG-WK                       PIC S999V9(6).
       08   CF-LAT-WK                        PIC S999V9(6).
    05   CF-FLAGS-WK                         PIC X(99).
    05   CF-FLAG-WK REDEFINES CF-FLAGS-WK    PIC X OCCURS 99 TIMES.
    05   CF-DAY-PRIORITY-WK                  PIC 9.
    05   CF-NIGHT-PRIORITY-WK                PIC 9.
    05   CF-UNLISTED-WK                      PIC X.
    05   CF-BUSINESS-WK                      PIC X.
*
* ------------------------------------------------------------
* THE FOLLOWING FIELDS ARE "LIST" TYPE
* ------------------------------------------------------------
    03   CF-LIST-DATA-WK   REDEFINES CF-DATA-WK.
      05 CF-LIST-STATE-WK                    PIC XX.
      05 CF-LIST-COMMENT1-WK                 PIC X(25).
      05 CF-LIST-COMMENT2-WK                 PIC X(25).
*
* ------------------------------------------------------------
* THE FOLLOWING FIELDS ARE "OK" TYPE
* ------------------------------------------------------------
*
    03   CF-OK-DATA-WK   REDEFINES CF-DATA-WK.
      05 CF-OK-COMMENT1-WK                   PIC X(25).
      05 CF-OK-COMMENT2-WK                   PIC X(25).
*
      05 CF-OK-PHONE1-WK                     PIC X(10).
      05 CF-OK-PHONE1-NUM-WK REDEFINES       CF-OK-PHONE1-WK.
         07 CF-OK-AREA-CODE1-WK              PIC 999.
         07 CF-OK-EXCHANGE1-WK               PIC 999.
         07 CF-OK-LOCAL1-WK                  PIC 9(4).
*
      05 CF-OK-PHONE2-WK                     PIC X(10).
      05 CF-OK-PHONE2-NUM-WK REDEFINES       CF-OK-PHONE2-WK.
         07 CF-OK-AREA-CODE2-WK              PIC 999.
         07 CF-OK-EXCHANGE2-WK               PIC 999.
         07 CF-OK-LOCAL2-WK                  PIC 9(4).
*
      05 CF-OK-TIME1-WK                      PIC 9(4).
      05 CF-OK-TIME1-DISP-WK REDEFINES       CF-OK-TIME1-WK.
         07 CF-OK-TIME1-HRS-WK               PIC 99.
         07 CF-OK-TIME1-MINS-WK              PIC 99.
*
      05 CF-OK-TIME2-WK                      PIC 9(4).
      05 CF-OK-TIME2-DISP-WK REDEFINES       CF-OK-TIME2-WK.
         07 CF-OK-TIME2-HRS-WK               PIC 99.
         07 CF-OK-TIME2-MINS-WK              PIC 99.
*
      05 CF-OK-TIME3-WK                      PIC 9(4).
      05 CF-OK-TIME3-DISP-WK REDEFINES       CF-OK-TIME3-WK.
         07 CF-OK-TIME3-HRS-WK               PIC 99.
```

```
        07  CF-OK-TIME3-MINS-WK              PIC 99.
*
    05  CF-OK-RETRIES-WK                     PIC 9.
    05  CF-OK-ALARM-WK                       PIC X.
    05  CF-OK-MESSAGE-NUMBER-WK              PIC 9(4).
    05  CF-OK-CALLED1-WK                     PIC X.
    05  CF-OK-CALLED2-WK                     PIC X.
    05  CF-OK-CALLED3-WK                     PIC X.
    05  CF-OK-STATE-WK                       PIC XX.
*
* ----------------------------------------------------------------
* THE FOLLOWING FIELDS ARE "RESPONDER" TYPE
* ----------------------------------------------------------------
    03  CF-RESP-DATA-WK REDEFINES CF-DATA-WK.
        05  CF-RESP-FLAGS-WK         PIC X(99).
        05  CF-RESP-FLAG-WK REDEFINES CF-RESP-FLAGS-WK
                                     PIC X OCCURS 99 TIMES.
*       " " Not applicale
*       "P" Primary Response
*       "S" secondary Response
    03  CF-RESP-ROTATION-WK                  PIC X.
*
    03  CF-RESP-AVAILABLE-WK                 PIC X.
*       " " Available
*       "I" Trying to Find
*       "A" Assigned
    03  CF-RESP-ACTIVE-SCENARIO-WK           PIC 9(3).
    03  CF-RESP-ACTIVE-SESSION-WK            PIC 9(5).
    03  CF-RESP-TIME-WK                      PIC 9(4).
    03  CF-RESP-DATE-WK                      PIC 9(7).
    03  CF-RESP-ARRIV-WK                     PIC 9(3).

01  OPEN-VARIABLES.
    03  OPEN-ERROR-SW                        PIC X.
        88  FILE-LOCKED                      VALUE "L".
        88  FILE-IO-ERROR                    VALUE "E".
        88  FILE-BUSY                        VALUE "B".
    03  OPEN-FILES-SW                        PIC X.
    03  CLOSE-FILES-SW                       PIC X.
    03  OPEN-FILE-NUM                        PIC 99.
    03  OPEN-FILE-NAME                       PIC X(30).
    03  OPEN-SWITCHES OCCURS 75 TIMES.
        05  OPENED-FILE-SW                   PIC X.

01  SL-CALL-CONFIG.
    03  SL-ZONES                             PIC X(1690).
    03  SL-ZONE-X OCCURS 10 TIMES REDEFINES SL-ZONES.
        05  SL-ZONE-REC.
            06  SL-ZONE                      PIC 999.
            06  SL-DESCRIPTION               PIC X(30).
```

```
       06 SL-UPPER-LEFT-COORD.
           07   SL-UL-RED               PIC 99V99.
           07   SL-UL-GREEN             PIC 99V99.
       06 SL-LOWER-RIGHT-COORD.
           07   SL-LR-RED               PIC 99V99.
           07   SL-LR-GREEN             PIC 99V99.
       06 SL-FLAGS                      PIC X(99).
       06 SL-FLAG REDEFINES SL-FLAGS    PIC X OCCURS 99 TIMES.
       06 SL-INCLUDE-UNLISTED           PIC X.
       06 FILLER                        PIC 9(7).
       06 SL-MESSAGE-NUMBER             PIC 9(4).
       06 SL-ZONE-PRIORITY              PIC 9.
       06 FILLER                        PIC X(8).
   03 SL-MOD-FLAG  OCCURS 10 TIMES  PIC X.
* Size 240
   03 SL-LISTS                          PIC X(280).
   03 SL-LIST-X OCCURS 10 TIMES REDEFINES SL-LISTS.
       05 SL-LIST-REC.
           06 SL-LIST                   PIC 999.
           06 SL-LIST-DESCRIPTION       PIC X(20).
           06 SL-LIST-PRIORITY          PIC 9.
           06 SL-LIST-MESSAGE           PIC 9(4).
*
01 SL-STATS.
   03 SL-STAT-REC-CNT                   PIC 9(6).
   03 SL-STAT-REC-COMPLETE              PIC 9(6).
   03 SL-STAT-ACCEPTS    OCCURS 10 TIMES PIC 9(6).
   03 SL-STAT-REJECTS    OCCURS 10 TIMES PIC 9(6).
   03 SL-STAT-LISTS      OCCURS 10 TIMES PIC 9(6).

*  COMMON PROGRAM CONSTANTS AND VARIABLES
01  YES                  PIC X VALUE "Y".
01  NON                  PIC X VALUE "N".
01  ANSWER               PIC X(30).
01  DISASTER-ENTRY       PIC XX.
01  SUB                  PIC S9(5) COMP-3.
01  SUB1                 PIC S9(5) COMP-3.
01  SUB2                 PIC S9(5) COMP-3.
01  SUB3                 PIC S9(5) COMP-3.
01  LN-CNT               PIC S999 COMP-3 VALUE ZERO.
01  LN-CNTRL             PIC S999 COMP-3 VALUE 1.
01  PASSWORD-COMPARE     PIC X(7).
01  PASSWORD-FLAG        PIC X VALUE "N".
    88  DO-NOT-PASS            VALUE "N".
    88  LET-PASS               VALUE "Y".
01  PASSWORD-WK          PIC X(7).
01  PAGE-CNT             PIC S9(5) COMP-3 VALUE ZERO.
01  ALL-DASH-LINE        PIC X(80) VALUE ALL "-".
01  ASTERIK              PIC X  VALUE "*".
01  SELECTION            PIC X  VALUE SPACES.
```

```
01  ERROR-SW                    PIC X.
01  FILESTAT                    PIC XX VALUE SPACES.
01  EXT-FILESTAT                PIC X(06) VALUE SPACES.
01  TBL-CNT                     PIC S999.
01  TBL-SUB                     PIC S999 COMP-3.
01  SCR-POS                     PIC 99.
01  SCR-LN                      PIC 99.
01  SCR-LN2                     PIC 99.
01  OPEN-IND                    PIC X    VALUE SPACES.
01  LINE23-MSG                  PIC X(79).
01  ERR-SW                      PIC X.
01  WK-COMPANY-IND                  PIC X.
    88  DOW-CHEMICAL            VALUE "1".
*
01  DISPLAY-TRANSACTION-MODE    PIC X(7).
*
01  DISP-AMT1                   PIC 9.
01  DISP-AMT2                   PIC Z9.
01  DISP-AMT3                   PIC ZZ9.
01  DISP-AMT32                  PIC ZZ9.99.
01  DISP-AMT32S                 PIC ZZ9.99-.
01  DISP-AMT4                   PIC ZZZ9.
01  DISP-AMT5                   PIC ZZZZ9.
01  DISP-AMT52                  PIC ZZZZ9.99.
01  DISP-AMT52S                 PIC ZZZZ9.99-.
01  DISP-AMT6                   PIC ZZZZZ9.
01  DISP-AMT7                   PIC ZZZZZZ9.
01  DISP-AMT8                   PIC ZZZZZZZ9.
01  DISP-AMT9                   PIC ZZZZZZZZ9.
01  DISP-AMT72                  PIC ZZZZZZ9.99.
01  DISP-AMT72S                 PIC ZZZZZZ9.99-.
01  DISP-AMT74S                 PIC ZZZZZZ9.9999-.
01  DISP-DATE.
    03  DISP-MM                 PIC 99.
    03  FILLER                  PIC X VALUE "/".
    03  DISP-DD                 PIC 99.
    03  FILLER                  PIC X VALUE "/".
    03  DISP-YY                 PIC 99.
01  DISP-TIME.
    03  DISP-HH                 PIC Z9.
    03  FILLER                  PIC X VALUE ":".
    03  DISP-MT                 PIC 99.
*
01  WK-PHONE                    PIC 9(10).
01  WK-PHONE2 REDEFINES WK-PHONE.
    03  WK-PH1                  PIC 999.
    03  WK-PH2                  PIC 999.
    03  WK-PH3                  PIC 9999.
*
01  DISP-PHONE.
```

```
       03  D-PH1                         PIC 999.
       03  D-PHDASH1                     PIC X.
       03  D-PH2                         PIC 999.
       03  D-PHDASH2                     PIC X.
       03  D-PH3                         PIC 9999.
*
   01  LINE24-MSGA.
       03  ERR-SIZE            PIC 99.
       03  LINE24-MSG          PIC X(79).
*
   01  STANDARD-ERROR-MESSAGE-TABLE.
       03  FILLER PIC X(30) VALUE "17ENTRY NOT ON FILE         ".
       03  FILLER PIC X(30) VALUE "20ENTRY ALREADY EXISTS      ".
       03  FILLER PIC X(30) VALUE "17INVALID SELECTION         ".
       03  FILLER PIC X(30) VALUE "19NO ITEMS TO DISPLAY       ".
       03  FILLER PIC X(30) VALUE "14REPORT PRINTED            ".
       03  FILLER PIC X(30) VALUE "14END OF DISPLAY            ".
       03  FILLER PIC X(30) VALUE "18NO ITEMS TO REPORT        ".
       03  FILLER PIC X(30) VALUE "22PRINTER CURRENTLY BUSY    ".
       03  FILLER PIC X(30) VALUE "20PROCESSING COMPLETED      ".
       03  FILLER PIC X(30) VALUE "25NO RECORDS FOUND IN RANGE ".
   01  STANDARD-ERROR-MESSAGE-TABLE-R REDEFINES
           STANDARD-ERROR-MESSAGE-TABLE.
       03  STAND-ERR-MSG OCCURS 10 TIMES PIC X(30).
*
   01  DISASTER-MESSAGE.
       03  DISASTER-MSG        PIC X(66) VALUE SPACES.
       03  FILLER              PIC X(7)  VALUE "  CODE=".
       03  DISASTER-CODE       PIC XX.
*
   01  PROCESS-MSG PIC X(39)
             VALUE "Please Wait Processing In Progress ....".
*
   01  BUSY-MSG1  PIC X(22) VALUE "WAITING ON BUSY RECORD".
   01  BUSY-MSG2  PIC X(22) VALUE "RECORD CURRENTLY BUSY ".
*
*  TIME ITEMS WORK
   01  TIME-IN              PIC 9(8).
   01  TIME-IN-R REDEFINES TIME-IN.
       03  TIME-HM.
           05  TIME-HH         PIC 99.
           05  TIME-MM         PIC 99.
       03  TIME-SS             PIC 99.
       03  TIME-HS             PIC 99.
   01  TIME-AM-PM              PIC XX.
*
*  DATE ITEMS WORK
   01  YMD-DATE                PIC 9(6).
   01  YMD-DATE-R REDEFINES YMD-DATE.
       03  YMD-YY              PIC 99.
```

```
       03  YMD-MM            PIC 99.
       03  YMD-DD            PIC 99.
*
   01  MDY-DATE              PIC 9(6).
   01  MDY-DATE-R REDEFINES MDY-DATE.
       03  MDY-MM            PIC 99.
       03  MDY-DD            PIC 99.
       03  MDY-YY            PIC 99.
*
*
   01  DATECONV              PIC X(10) VALUE "dateconv".
   01  GREG-DATE             PIC 9(6).
   01  STRD-DATE             PIC S9(7)   COMP-3.
   01  DATE-CONVERT-SW       PIC X  VALUE SPACES.
       88  INVALID-DATE      VALUE "I".
       88  CONVERT-GREG      VALUE "G".
       88  CONVERT-STRD      VALUE "S".
*
   01  STYLE-OPTION-SW       PIC X.
       88  STYLE-OPT     VALUE "Y".
*
   01  PN.
       03  PN-STYLE      PIC X(8).
       03  FILLER        PIC X.
       03  PN-COLOR      PIC X(5).
       03  FILLER        PIC X.
       03  PN-SIZE       PIC X(5).
*
   01  PN-STYLE-SAVE     PIC X(8).
   01  PN-POS            PIC 99.
   01  PN-LN             PIC 99.
   01  PN-ACC            PIC X.
       88  PN-EXIT       VALUE "9".
       88  PN-PFKEY      VALUE "1" "2" "3" "4" "5" "6" "7" "8" "9" "0".
   01  PN-NO-PROMPT      PIC X    VALUE SPACES.
*
   01  FIRST-TIME-SW        PIC X.
       88  FIRST-TIME       VALUE "Y".
*
   01  USE-LOCKING-SW                PIC X(01) VALUE "Y".
       88  USE-LOCKING                         VALUE "Y".
*
   01  RECORD-FOUND-SW               PIC X(01) VALUE SPACE.
       88  RECORD-FOUND                        VALUE "Y".
       88  RECORD-NOT-FOUND                    VALUE "N".
*
   01  EOF-REACHED-SW                PIC X(01) VALUE SPACE.
       88  EOF-REACHED                         VALUE "Y".
       88  EOF-NOT-REACHED                     VALUE "N".
*
```

```
01  END-DISPLAY-SW                PIC X.
   88  END-DISP                   VALUE "Y".
*
01  KEY-ALREADY-ON-FILE-SW        PIC X.
   88  KEY-ALREADY-ON-FILE        VALUE "Y".
*
01  THERE-ARE-SCREEN-ERRORS-SW    PIC X.
   88  THERE-ARE-SCREEN-ERRORS    VALUE "Y".
*
01  WRITE-ERROR-SW                PIC X.
    88 WRITE-ERROR                VALUE "Y".
*
01 PRINTER-LPP                    PIC 999.
01 PRINTER-DEF                    PIC X(20) VALUE "PRINTER".
01 PRINTER-SW                     PIC X.
   88 PRINTER-ON                  VALUE "Y".
*
01  CF-OK-DEF                     PIC XX VALUE "^O".
01  CF-LIST-DEF                   PIC XX VALUE "^L".
01  CF-RESP-DEF                   PIC XX VALUE "^R".
01  CF-END-DEP                    PIC XX VALUE "^X".
*
01  OK-STATUS                     PIC X VALUE "O".

* m1_setup variables.
01  BACKGROUND-FLAG               PIC X.
01  OK-TIMEOUT-FLAG               PIC X.
01  MAKE-CALLS-FLAG               PIC X.

* STANDARD COMBOS.
01 ACC-COLOR           PIC 9(5) VALUE 4167.
01 DISP-COLOR          PIC 9(5) VALUE 4135.
01 PROMPT-COLOR        PIC 9(5) VALUE 2120.
01 INSTRUCTION-COLOR   PIC 9(5) VALUE 4168.
* white on red blink = 16552
01 ERROR-COLOR         PIC 9(5) VALUE 4264.
01 TBL-COLOR           PIC 9(5) VALUE 4167.
01 SELECT-COLOR        PIC 9(5) VALUE 4163.
*
01 RED-BAR             PIC 9(5) VALUE 168.
01 BLACK-BAR           PIC 9(5) VALUE 4164.
*
01 WINDOW1-COLOR       PIC 9(5) VALUE 2120.
01 WINDOW2-COLOR       PIC 9(5) VALUE 2120.
*
01 NEXT-PROMPT         PIC 9(5) VALUE 4167.
01 TITLE-BAR           PIC X(80) VALUE SPACES.
*
01 MENU-RETURN         PIC X(3).
```

```
*
01  SCHEDULE-DEFAULTS.
    03  DEFAULT-DAY-START              PIC 9(4) VALUE 0700.
    03  DEFAULT-NIGHT-START            PIC 9(4) VALUE 0500.

01  CLR-LINE             PIC X(136) VALUE SPACES.
*   POP-UP SAVE AREAS.
01  WINDOW-1-SAVE-AREA                 PIC X(10).
01  WINDOW-2-SAVE-AREA                 PIC X(10).
01  WINDOW-3-SAVE-AREA                 PIC X(10).
01  WINDOW-4-SAVE-AREA                 PIC X(10).
01  WINDOW-5-SAVE-AREA                 PIC X(10).
01  HELP-WINDOW-SAVE-AREA              PIC X(10).
01  COMP-WINDOW-SAVE-AREA              PIC X(10).

01  WINDOW-1-LINES                     PIC 99.
01  WINDOW-1-LAST                      PIC 99.
01  WINDOW-1-SIZE                      PIC 999.
01  WINDOW-2-LINES                     PIC 99.
01  WINDOW-2-LAST                      PIC 99.
01  WINDOW-2-SIZE                      PIC 999.
01  WINDOW-3-LINES                     PIC 99.
01  WINDOW-3-LAST                      PIC 99.
01  WINDOW-3-SIZE                      PIC 999.
01  WINDOW-4-LINES                     PIC 99.
01  WINDOW-4-LAST                      PIC 99.
01  WINDOW-4-SIZE                      PIC 999.
01  WINDOW-5-LINES                     PIC 99.
01  WINDOW-5-LAST                      PIC 99.
01  WINDOW-5-SIZE                      PIC 999.
01  CURRENT-WINDOW                     PIC 9 VALUE ZERO.
    88  WINDOW1                                VALUE 1.
    88  WINDOW2                                VALUE 2.
    88  WINDOW3                                VALUE 3.
    88  WINDOW4                                VALUE 4.
    88  WINDOW5                                VALUE 5.
01  PRIOR-WINDOW                       PIC 9 VALUE ZERO.
01  HLP-KEY                            PIC 99.
01  HLP-CTR                            PIC 99.
01  ERR-WK                             PIC 99.
01  RECORD-MBOX-NUM                    PIC 999 VALUE 111.
01  COMPLETION-MSG                     PIC X(20).
*   f-key returns
01  ACC-RETURN                         PIC 9(3).
    88  LEFT-KEY                           VALUE 50.
    88  RIGHT-KEY                          VALUE 51.
    88  UP-KEY                             VALUE 52.
    88  DOWN-KEY                           VALUE 53.
    88  ESCAPE-KEY                         VALUE 27.
    88  TIMED-OUT                          VALUE 99.
```

```
88   CR-RET                           VALUE 13.
88   CR-TAB                           VALUE 9.
88   C-TAB                            VALUE 9.
88   C-RETURN                         VALUE 13.
88   C-UP                             VALUE 52.
88   C-DOWN                           VALUE 53.
88   FKEY                       VALUE 1 2 3 4 5 6 7
                                      8 9 10 11 12
                                      14 15 16 17 18
                                      19 20 68 67 27.
88   F1                               VALUE 1.
88   F2                               VALUE 2.
88   F3                               VALUE 3.
88   F4                               VALUE 4.
88   F5                               VALUE 5.
88   F6                               VALUE 6.
88   F7                               VALUE 7.
88   F8                               VALUE 8.
88   F9                               VALUE 9.
88   F10                              VALUE 10.
88   F11                              VALUE 11.
88   F12                              VALUE 12.
88   F13                              VALUE 13.
88   F14                              VALUE 14.
88   F15                              VALUE 15.
88   F16                              VALUE 16.
88   F17                              VALUE 17.
88   F18                              VALUE 18.
88   F19                              VALUE 19.
88   F20                              VALUE 20.
88   HELP-KEY                         VALUE 99.
88   PG-DOWN                          VALUE 68.
88   PG-UP                            VALUE 67.
88   JUST-DISPLAY                     VALUE 999.

01   DISASTER.
     03   DS-PROGRAM             PIC X(10).
     03   DS-PARAGRAPH           PIC X(30).
     03   DS-MESSAGE             PIC X(30).
     03   DS-FILE-STAT           PIC 9999.
     03   DS-FILE-NAME           PIC X(30).

01 ANS-X                         PIC X.
01 SLP-WAIT                      PIC 9(4) COMP-N.
01 SLP-COBOL-KEY                 PIC 9(8) COMP-N.
01 SLP-RETURN                    PIC X.
01 MAX-CHAN                      PIC 9(3) VALUE 24.
01 NOCH-COMMAND                  PIC 9(4) COMP-N.
01 NOCH-RETURN                   PIC 9(4) COMP-N.
```

```
* Temporary Usage Variables.  Their values should never be "carried"
* between paragraphs.  Paragraph specific use is suggested.
  01  T-X01                         PIC X(01).
  01  T-X10                         PIC X(10).
  01  T-Z04                         PIC Z(04).
  01  T-INT                         PIC 9(03).
  01  T-32BIT-COUNTER               PIC 9(08) COMP-N.
  01 TR-KEY-HOLD                    PIC 9(7) COMP-3.
*
* Variables Used for the "bitunmap" program.
  01  BIT-MAPPED-NUMBER             PIC 9(8) COMP-N.
  01  OPERATION-SW                  PIC X.
  01  STARTING-BIT                  PIC 9(2) COMP-1.
  01  LENGTH-IN-BITS                PIC 9(2) COMP-1.
  01  RESULTING-NUMBER              PIC 9(8) COMP-N.
```

What is claimed is:

1. An automated phone calling system for placing outgoing phone calls comprising:

a database comprising a plurality of phone numbers and one or more data fields associated with each of the plurality of phone numbers;

means for selecting a subset of phone numbers from the plurality of phones numbers of the database based on the selection of at least one of the data fields associated with at least one of the plurality of phone numbers, means for recording a voice message to be transmitted over at least one outgoing phone line, means for connection to the at least one outgoing phone line, the connection means operatively connected to the voice recording means, means for initiating at least one phone call to a callee via a callee phone number over the at least one outgoing phone line with the callee's phone number being one of the subset of phone numbers stored in the database as selected by the selecting means, means for prompting the callee by playing the voice message recorded with the voice recording means, after the outgoing phone call connection has been established, to enter one of a plurality of different dial codes, means for recording a dial code entered by the callee, and means for automatically updating at least one of the data fields in the database for the callee's phone number based on the recorded dial code, the at least one updated data field used by the selection means for selecting a future subset of phone numbers, the system thereby providing the callee with She ability to control future phone calls initiated by the system to the callee's phone number.

2. The system of claim 1 wherein each of the plurality Of phone numbers in the database has a geographic location associated therewith, and wherein at least one of the data fields associated with each of the plurality of phone numbers of the database comprises a representation of the geographic location.

3. The system of claim 2 wherein the data field representative geographic location associated with each of the plurality of phone numbers is indicative of the geographic relationship of the geographic location of the phone number to the geographic locations of the other phone numbers in the database, and wherein the selecting means comprises means for selecting based on the data field representative of geographic location associated with at least one of the plurality of phone numbers.

4. The system of claim 3 further comprising a geographic map including X and Y coordinate location information, wherein each of the data fields representative of the geographic location comprises X and Y coordinates corresponding to coordinates on the map, and wherein the selecting means includes memos for designating one or more X and Y coordinates corresponding to the coordinates of the map.

5. The system of claim 2, wherein the data field representative of the geographic location is unique for each phone number in the database located at a unique street address.

6. The system of claim 1 further comprising:

means for creating a data file comprising the selected subset of phone numbers, means for recording in said data file data representing the dial code entered by the callee, and wherein the automatically updating means accesses the data representing the dial code recorded in said data file to thereby update the at least one data field for the callee's phone number.

7. The system of claim 1 wherein the means for prompting the callee comprises meters for issuing multiple prompts to the callee and receiving multiple dial code responses during connection to the at least one outgoing phone line in response to the multiple prompts issued.

8. The system of claim 1 wherein the database and the means for automatically updating reside on a computer system, the computer system having a bus, and the connection means comprises a plurality of plug-in phone cards connected to the bus of the computer system, each card having means for receiving the at least one outgoing phone line.

9. The system of claim 1 wherein at least one of the data fields for each of the plurality of phone numbers comprises a preferred calling time period for the phone number to be called, and the system further comprising scheduling means for initiating the at least one phone call to be placed within the preferred calling time period for the phone number.

10. A method for automatically placing outgoing phone calls, comprising steps of:

providing a database having a plurality of phone numbers stored therein;

for each of the plurality of phone numbers in the database, placing an initial call to the phone number over at least one outgoing phone line, monitoring the at least one outgoing phone line for an answer by a callee to the initial call, playing a prerecorded message upon receipt of an answer, said prerecorded message including a prompt for the callee to enter one of a plurality of dial code responses, recording the dial code response entered by the callee, and automatically updating information in the database for the phone number based on the dial code response recorded;

selecting, based on the updated information in the database from the automatic updating step, a subset of phone numbers in the database; and placing a second phone call to each of the phone numbers in the selected subset of phone numbers.

11. The method of claim 10, wherein the database includes geographic location information for each of the plurality of phone numbers, the geographic location information corresponding to the geographic location of a telephone accessible by calling the phone number, wherein the geographic location information associated with each of the plurality of phone numbers is indicative of the geographic relationship of the geographic location of the telephone accessible by calling phone number to the geographic locations of telephones accessible by calling the other phone numbers in the database, and wherein the step of selecting a subset of phone numbers in the database includes making such selection based on a selected geographic location.

12. The method of claim 11, wherein the geographic location information for each phone number comprises coordinates corresponding to coordinates on a map, and wherein the step of selecting a subset of phone numbers based on geographic location information includes the step of entering coordinates corresponding to the map.

13. The method of claim 11, wherein the geographic location information is unique for each phone number in the database located at a unique street address.

14. The method of claim 10 wherein the database further comprises, for each of the plurality of phone numbers, a data field comprising a preferred calling time period for the phone number to be called, and further comprising, prior to the step of placing an initial call, the step of:

scheduling an initial call to be placed within the preferred calling time period for the phone number.

15. The method of claim 10 wherein the database further comprises, for each of the plurality of phone numbers, a data field comprising a preferred calling time period for the phone number to be called, and further comprising, prior to the step of placing a second phone call, the step of:

scheduling each second phone call to be placed within the preferred calling time period for the phone number.

16. In an automated phone calling system comprising a database including a plurality of phone numbers and one or more data fields associated with each of the plurality of phone numbers; means for selecting a subset of phone numbers from the plurality of phone numbers of the database based on the selection of at least one of the data fields associated with at least one of the plurality of phone numbers; means for recording a voice message to be transmitted over an outgoing phone line; means for connection to the at least one outgoing phone line, the connection means operatively connected to the voice recording means; means for initiating at least one phone call to a callee via a callee phone number over the at least one outgoing phone line with the callee's phone number being one of the subset of phone numbers stored in the database as selected by the selecting means; means for prompting the callee by playing the voice message recorded with the voice recording means after a connection to the at least one outgoing phone line has been established, to enter one of a plurality of different dial codes; and means for recording a dial code entered by the callee, the improvement comprising:

means for automatically updating at least one of the data fields in the database for the callee's phone number based on the recorded dial code, the at least one updated data field used by the selection means for selecting a future subset of phone numbers, the system thereby providing the callee with influencing selection of future calls initiated by the system and to the callee's phone number.

* * * * *